(12) United States Patent
Tsuruoka

(10) Patent No.: US 8,537,707 B2
(45) Date of Patent: Sep. 17, 2013

(54) APPARATUS, MODULE AND METHOD USED FOR WIRELESS COMMUNICATION

(75) Inventor: Tetsumei Tsuruoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 193 days.

(21) Appl. No.: 13/025,513

(22) Filed: Feb. 11, 2011

(65) Prior Publication Data

US 2011/0243002 A1    Oct. 6, 2011

(30) Foreign Application Priority Data

Mar. 31, 2010  (JP) .................................. 2010-084164

(51) Int. Cl.
*H04L 12/26* (2006.01)

(52) U.S. Cl.
USPC ......... 370/252; 370/338; 455/115.1; 455/423

(58) Field of Classification Search
USPC ........................... 370/252, 337, 338, 318, 331
See application file for complete search history.

(56) References Cited

U.S. PATENT DOCUMENTS

| | | | | |
|---|---|---|---|---|
| 6,169,884 B1* | 1/2001 | Funk | ............................. | 455/522 |
| 7,158,489 B1* | 1/2007 | Knuutila et al. | ............. | 370/318 |
| 7,580,397 B2 | 8/2009 | Arai et al. | | |
| 7,751,784 B2* | 7/2010 | Ouzillou et al. | ........... | 455/115.1 |
| 8,086,229 B2* | 12/2011 | Lindoff et al. | ................ | 455/423 |
| 2004/0085940 A1* | 5/2004 | Black et al. | .................... | 370/337 |
| 2004/0160901 A1* | 8/2004 | Raith | ............................. | 370/252 |
| 2008/0056195 A1* | 3/2008 | Lee et al. | ...................... | 370/331 |

FOREIGN PATENT DOCUMENTS

| | | |
|---|---|---|
| JP | 10-145865 | 5/1998 |
| JP | 2006-13594 | 1/2006 |
| JP | 2006-245862 | 9/2006 |
| JP | 2007-228483 | 9/2007 |
| JP | 2008-514108 | 5/2008 |
| JP | 2009-44309 | 2/2009 |
| JP | 2009-88684 | 4/2009 |
| WO | 2006/080676 | 8/2006 |

OTHER PUBLICATIONS

Office Action of JP Patent Application No. 2010-084164, dated Jun. 18, 2013. Translation of relevant part, p. 1, line 1 to line 9 and p. 2, line 32 to p. 3, line 8, of the Office Action.

* cited by examiner

*Primary Examiner* — Albert T Chou
(74) *Attorney, Agent, or Firm* — Katten Muchin Rosenman LLP

(57) ABSTRACT

A wireless communication terminal apparatus communicates with a wireless base station wirelessly. The wireless communication terminal apparatus includes a wireless communication unit and a control unit. The wireless communication unit communicates wirelessly. The control unit transmits a search request, in which search duration for searching a wireless base station is included, from the wireless communication unit to a wireless base station during connection, and when a search response is received in the wireless communication unit from the wireless base station during connection, suspends at least a transmitter in the transmitter and a receiver of the wireless communication unit in all or a part of the search duration.

13 Claims, 41 Drawing Sheets

FIG.14

CONNECTION MANAGEMENT TABLE

| SOURCE IP | PROTOCOL | SOURCE PORT | ADDRESS IP | ADDRESS PORT | STATE | FLUCTUATION TOLERANCE |
|---|---|---|---|---|---|---|
| 192.168.1.1 | TCP | 5001 | 10.25.161.10 | 80 | COMMUNICATING | LOW |
| ……… | TCP | ……… | ……… | ……… | ……… | MIDDLE |
| ……… | ……… | ……… | ……… | ……… | ……… | ……… |

140 142 144 146 148 150 152

136

APPLICATION TABLE

| PROTOCOL | PORT | UPPER PROTOCOL | FLUCTUATION TOLERANCE |
|---|---|---|---|
| TCP | 80 | * | MIDDLE |
| UDP | * | RTP | LOW |
|  |  |  |  |

APPARATUS, MODULE AND METHOD USED FOR WIRELESS COMMUNICATION

CROSS-REFERENCE TO RELATED APPLICATIONS

This application is based upon and claims the benefit of priority of the prior Japanese Patent Application No. 2010-084164, filed on Mar. 31, 2010, the entire contents of which are incorporated herein by reference.

FIELD

The embodiments discussed herein are related to technology such as communication control method using a process of searching for a wireless base station.

BACKGROUND

Broadband wireless service has been started now, and a wireless system that uses mobile wireless communication technology utilizing a relatively high frequency band such as a gigahertz-band (GHz-band) is put to practical use. In a wireless communication terminal apparatus used for such a wireless system, power conversion efficiency tends to decrease and a transmission part tends to generate more heat. For example, high transmitting power like +23 (dBm) in order to reliable mobile access in the outside or to get a larger coverage area increases heat generation. The continuation of overheating of the wireless communication terminal apparatus makes its communication characteristics deteriorate, and may damage components and a circuit thereof in accordance with its circumstances.

As the wireless communication terminal apparatus used for such a wireless system, monitoring temperature during communication to perform heat generation preventive control is known (Japanese Laid-open Patent Publication No. 10-145865). It is also known that a wireless communication terminal apparatus issues a request for a scan to a wireless base station during connection and scanning is executed in response to the request (Japanese National Publication of International Patent Application No. 2008-514108).

High transmission power of the wireless communication terminal apparatus increases heat generation. However, the continuation of overheating of the wireless communication terminal apparatus is not preferred because its communication characteristics deteriorate and components and a circuit thereof are damaged. For avoiding overheating, the wireless communication terminal apparatus may be brought into suspended and priority may be given to cooling the terminal apparatus down. However, this disturbs continuity of communication.

SUMMARY

According to an aspect of the embodiments, a wireless communication terminal apparatus communicates with a wireless base station wirelessly, and includes a wireless communication unit and a control unit. The wireless communication unit communicates wirelessly. The control unit transmits a search request, in which search duration for searching a wireless base station is included, from the wireless communication unit to a wireless base station during connection, and when a search response is received in the wireless communication unit from the wireless base station during connection, suspends at least a transmitter in the transmitter and a receiver of the wireless communication unit in all or a part of the search duration.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 depicts an example of a structure of a connection management table;

DESCRIPTION OF EMBODIMENTS

[a] First Embodiment

A wireless communication terminal apparatus generates a search (scan) request that a part or all of search (scan) duration for searching a wireless base station in a search mode (scan mode) is made for suspending duration and sends out the request to the wireless base station. In response to receiving a search (scan) instruction from the base station, the wireless communication terminal apparatus suspends at least a transmitter in the transmitter and a receiver in the suspending duration. Since the wireless communication terminal apparatus is mainly used by a mobile system, it will be referred to as an MS below. Since the wireless base station constitutes a base station for an MS, it is referred to as a BS below. An MS may represent the wireless communication terminal apparatus and may be a terminal apparatus other than the mobile system.

Figure 1:
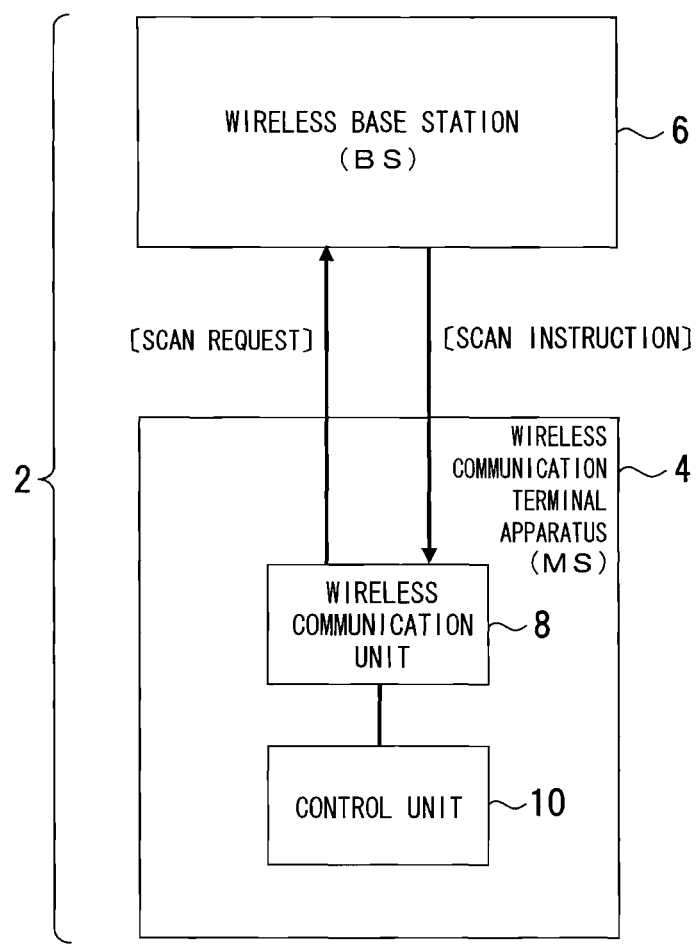
FIG. 1 depicts an example of a structure of a wireless system according to a first embodiment.

A first embodiment will be described with reference to FIG. 1. FIG. 1 depicts an example of a structure of a wireless system according to the first embodiment.

This wireless system 2 is an example of a system including an apparatus, a module, a program and a method of the present disclosure, and for example, constitutes a system in which an MS (wireless communication terminal apparatus) can issue to a BS (wireless base station) a request for searching a wireless base station.

The wireless system 2 includes an MS 4 and a BS 6 as depicted in FIG. 1. The MS 4 and BS 6 is the minimum unit for wireless communication of the wireless system 2. As described above, while other BS's (wireless base station), which can communicate with an MS, exist in a system of presupposing base station search, these BS's are omitted for simplifying description.

The MS 4 is an example of an apparatus used for wireless communication of the present disclosure, and includes a wireless communication unit 8 and a control unit 10. The wireless communication unit 8 is a means for transmitting and receiving with the BS 6 via radio and communicating with a communication destination 14 (FIG. 5) by the medium of the BS 6.

The control unit 10 is a control means for the wireless communication unit 8 and a means for generating a scan (search) request and executing a scan (search) process. The control unit 10 may be formed by a computer. In this embodiment, the control unit 10 generates a scan request that a part or all of scan duration for searching a BS is made for suspending duration. This scan request is transmitted to the BS 6 during communication via the wireless communication unit 8. As a response thereto, a scan instruction is received from the BS 6. Receiving the scan instruction shifts the MS 4 to a scan mode, and at least the transmitter in the transmitter and a receiver is suspended in the suspending duration during the scan duration.

Figure 2:
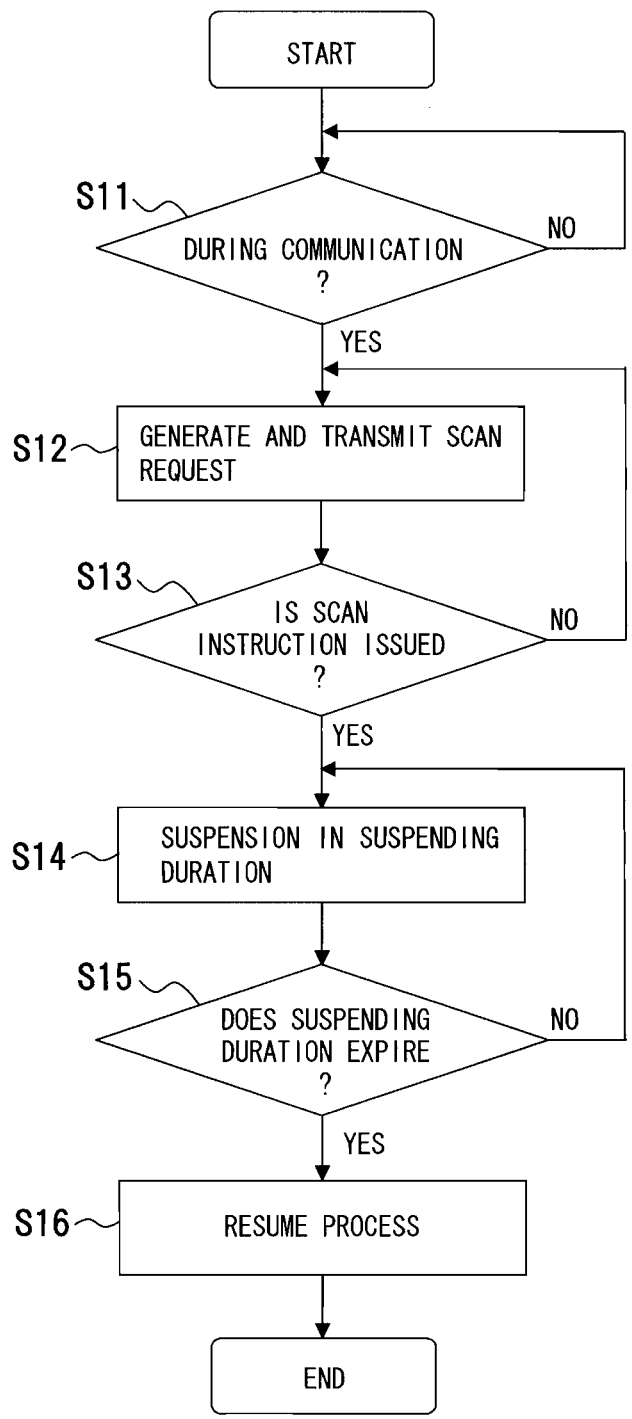
FIG. 2 is a flowchart depicting an example of a sequence of a suspending process.

A suspending process during communication will be described with reference to FIG. 2. FIG. 2 is a flowchart depicting an example of a sequence of the suspending process.

This sequence is an example of the program and the method of the present disclosure, and is a process executed by functional units of the MS 4.

As depicted in FIG. 2, in this sequence, whether the MS 4 is communicating with a BS, for example, the BS 6 is monitored (step S11). If the MS 4 is communicating therewith (YES of step S11), a scan request is generated and transmitted (step S12). In this case, being communicating is a condition of the generation and transmission of the scan request. This scan request means a scan request that a part or all of scan duration is made for suspending duration as described above.

Whether a scan instruction is issued from the BS 6 in response to this scan request is monitored (step S13). If the scan instruction is not issued (NO of step S13), the scan request may be repeatedly transmitted (step S12) or the process may wait for the scan instruction.

If the scan instruction is issued from the BS 6 in response to this scan request (YES of step S13), at least the transmitter in the transmitter and a receiver is suspended in the suspending duration, which is requested by the scan request during the scan duration (step S14).

Whether the suspending duration expires is determined (step S15) since this suspension is executed in the suspending duration. That is, if the suspending duration is continued (NO of step S15), the suspension is continued (step S14). If the suspending duration expires (YES of step S15), a communication process is resumed (step S16) and this process is ended.

While only the transmitter is selectively suspended in this embodiment, both of the transmitter and the receiver may be suspended in the suspending duration.

If the suspending duration is set in the scan duration and at least the transmitter is suspended like the above, electric power consumption can be reduced and heat generating elements in the wireless communication unit can be prevented from being overheat while a usual wireless communication is continued. Specifically, the effects of reducing electric power consumption and preventing overheating can be well obtained when both of the transmitter and the receiver are suspended.

[b] Second Embodiment

In a second embodiment, a processing state of an MS is monitored. When a state thereof is in shifting to suspension, the scan request that a part or all of the scan duration for searching a wireless base station is made for the suspending duration is generated and transmitted to a BS. In response to receiving the scan instruction from the BS, the MS suspends at least the transmitter in the transmitter and the receiver in the suspending duration.

Figure 3:
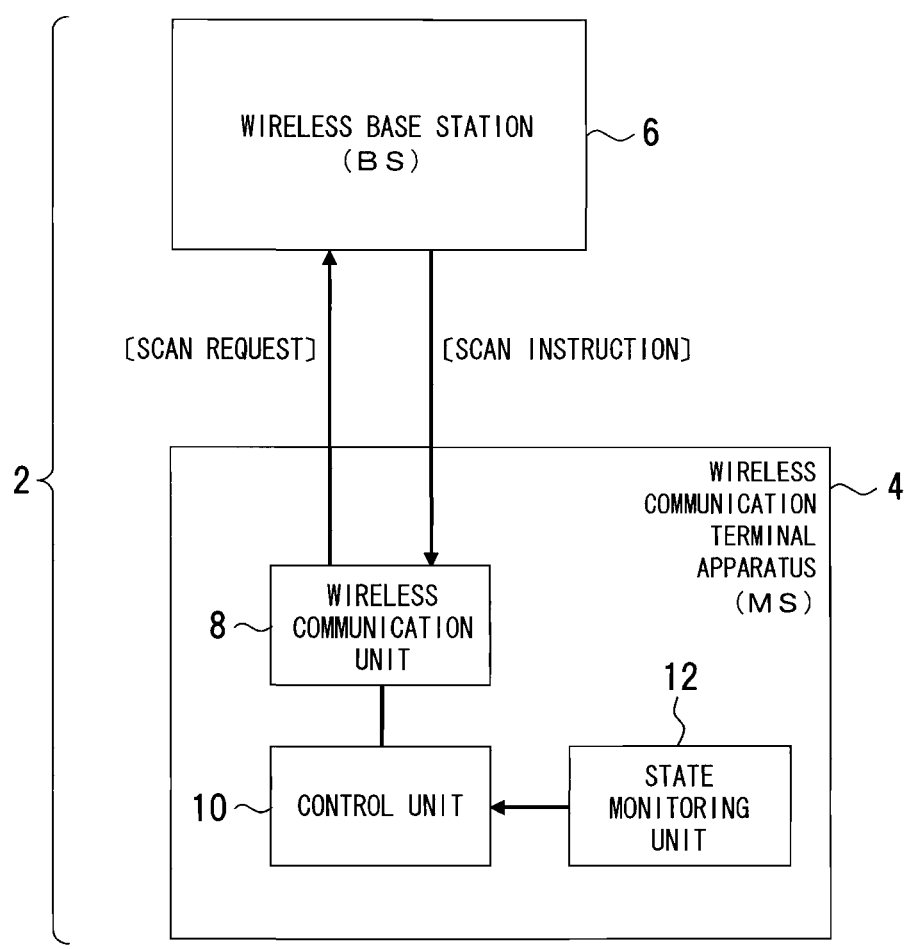
FIG. 3 depicts an example of a structure of a wireless system according to a second embodiment.

The second embodiment will be described with reference to FIG. 3. FIG. 3 depicts an example of a structure of the wireless system according to the second embodiment. In FIG. 3, the same components as those in FIG. 1 are denoted by the same reference numerals.

The BS 6 is the same as the first embodiment (FIG. 1). An MS 4 in this embodiment includes the wireless communication unit 8, the control unit 10 and a state monitoring unit 12. Since the wireless communication unit 8 is the same as the first embodiment, description thereof is omitted.

The state monitoring unit 12 monitors a processing state of the MS 4 by monitoring the temperature at a heat generating part etc., and outputs a monitored state output thereof to the control unit 10.

It is described above that the control unit 10 is a control means for the wireless communication unit 8 and a means for generating a scan request and executing a scanning process. In this embodiment, the control unit 10 receives the monitored state output from the state monitoring unit 12, and determines whether, for example, at least the transmitter from the transmitter and the receiver is suspended according to the monitored state output. That is, the control unit 10 constitutes a determination means of whether such suspension is executed.

When such suspension is to be executed, the control unit 10 generates the scan request that a part or all of scan duration for searching a BS is made for suspending duration. This scan request is transmitted to the BS 6 during communication via the wireless communication unit 8. As a response thereto, a scan instruction is received from the BS 6. Receiving the scan instruction suspends at least the transmitter from the transmitter and the receiver in the suspending duration during the scan duration.

Figure 4:
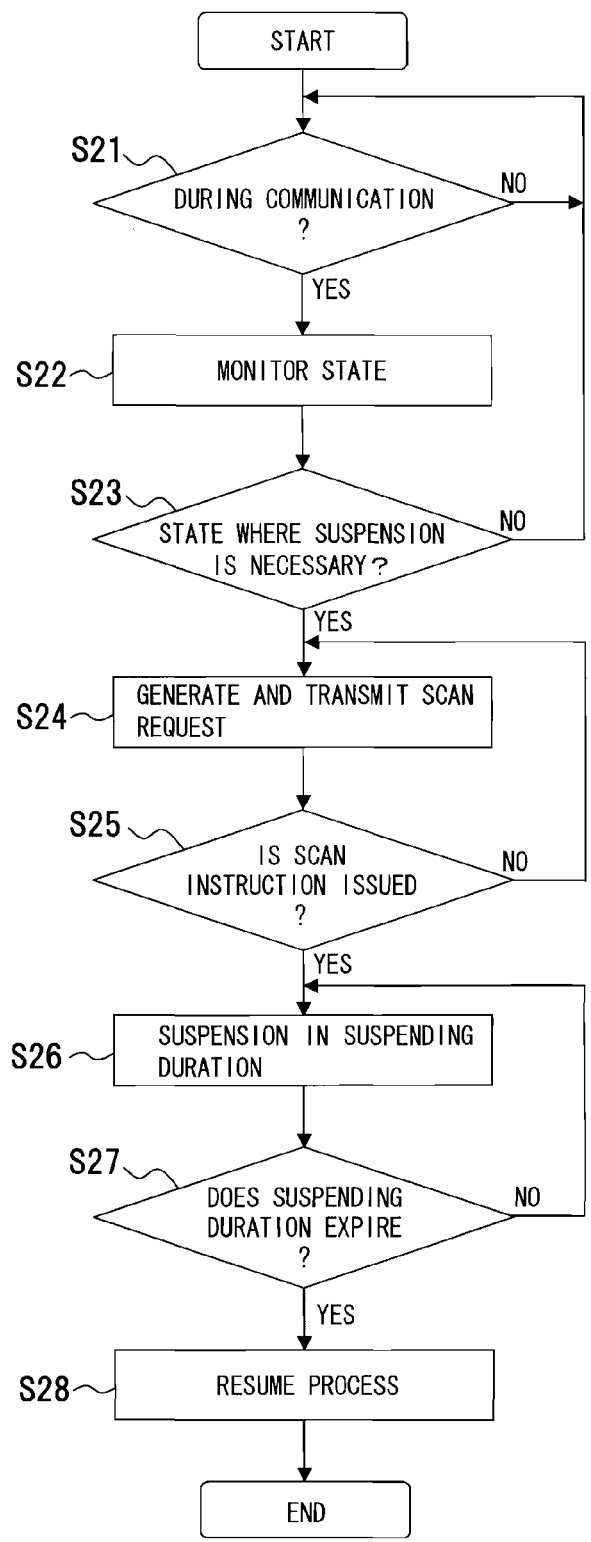
FIG. 4 is a flowchart depicting an example of a sequence of a suspending process.

A suspending process during communication will be described with reference to FIG. 4. FIG. 4 is a flowchart depicting an example of a sequence of the suspending process.

This sequence is an example of the program and the method of the present disclosure, and is a process executed by functional units of the MS 4.

As depicted in FIG. 4, in this sequence, whether the MS 4 is communicating with a BS, for example, the BS 6 is monitored (step S21). If the MS 4 is communicating therewith (YES of step S21), a state thereof is monitored (step S22).

Whether to be in a state where the transmitter and a receiver are to be suspended is determined (step S23) as a result of this state monitoring. If suspension may not be necessary (NO of step S23), the process returns to step S21. If the suspension may be necessary (YES of step S23), the scan request is generated and transmitted (step S24). In this case, being communicating and the case where the processing state asks the suspension are conditions of the generation and transmission of the scan request. This scan request means a scan request that a part or all of scan duration is made suspending duration as described above.

Whether the scan instruction is issued from the BS 6 in response to this scan request is monitored (step S25). If the scan instruction is not issued (NO of step S25), the scan request may be repeatedly transmitted (step S24) or the process may wait for the scan instruction.

If the scan instruction is issued from the BS 6 in response to this scan request (YES of step S25), at least the transmitter in the transmitter and the receiver is suspended in the suspending duration, which is requested by the scan request during the scan duration (step S26).

Whether the suspending duration expires is determined (step S27) since this suspension is executed in the suspending duration. That is, if the suspending duration is continued (NO of step S27), the suspension is continued (step S26). If the suspending duration expires (YES of step S27), a communication process is resumed (step S28) and this process is ended.

While only the transmitter is selectively suspended also in this embodiment, both of the transmitter and the receiver may be suspended in the suspending duration.

If a processing state is monitored during communication and suspension is asked according to the processing state like the above, the suspending duration is set in scan duration and at least the transmitter is suspended. If the transmitter is suspended in such scan duration, electric power consumption can be reduced and heat generating elements in the wireless communication unit can be prevented from being overheat without disturbing the usual wireless communication.

[c] Third Embodiment

In a third embodiment, temperature is monitored as state monitoring. When temperature is over a predetermined value, that is, a state is in overheating, the wireless communication terminal apparatus issues a request of a scanning process to a wireless base station, and in response to the scan instruction from the wireless base station, suspends the transmitter and receiver in the scan duration.

Figure 5:
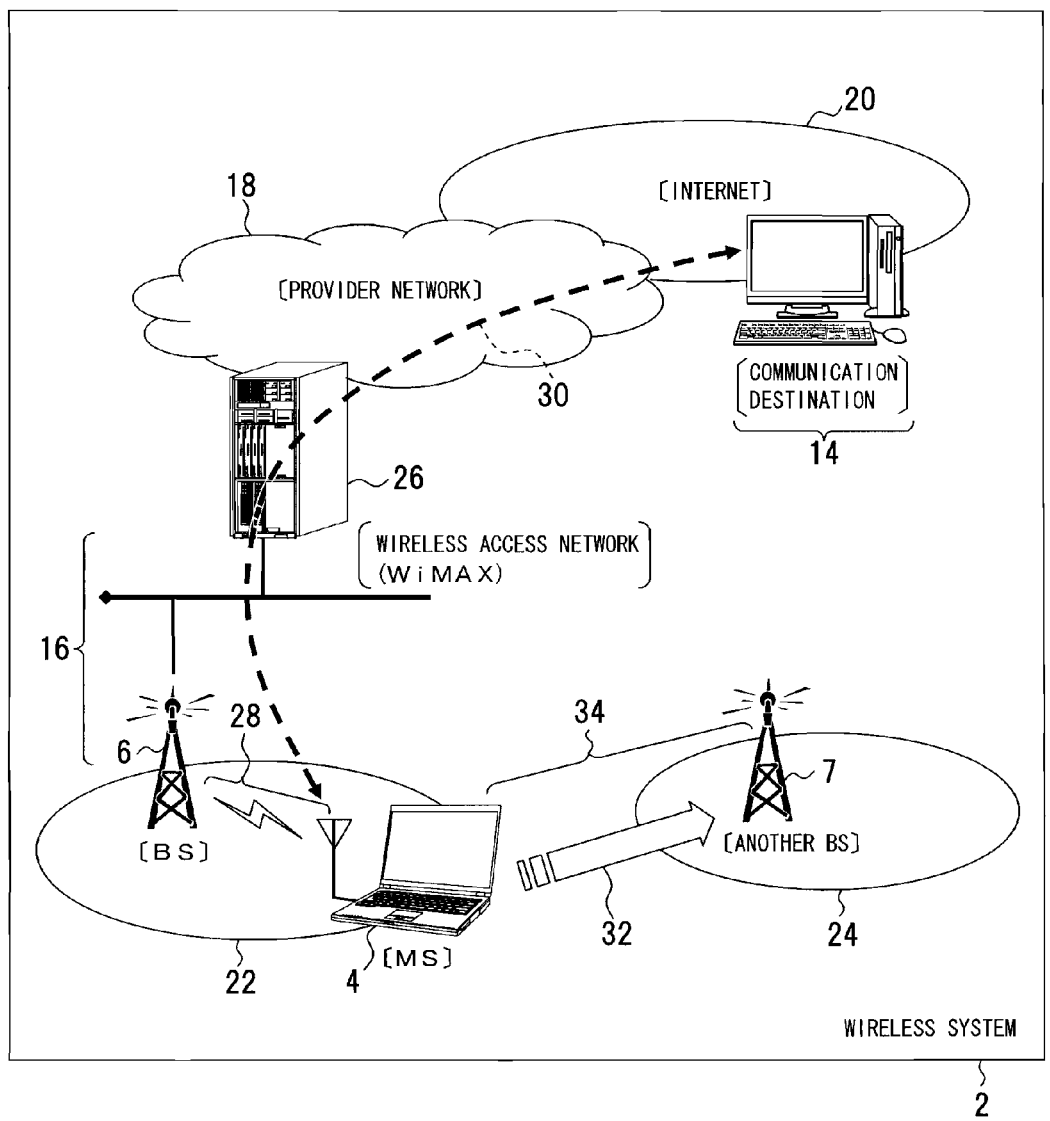
FIG. 5 depicts an example of a structure of a wireless system.

The third embodiment will be described with reference to FIG. 5. FIG. 5 depicts an example of a structure of a wireless system.

This wireless system 2 includes the MS 4 and at least the BS 6, and also includes a plurality of networks between the MS 4 and a communication destination 14, for example, a wireless access network 16, a provider network 18 and an Internet 20.

The MS 4 includes a communication function using a communication medium such as a radio wave, and is a means able to communicate in a service area of the BS 6 by radio. The MS 4 also includes a function of issuing the scan request (search request) to the BS 6, shifting to a scan mode in response to the scan instruction (search instruction) from the BS 6, and searching another BS 7.

The BS's 6 and 7 are capable of wireless connection, and are means for the MS 4 to connect to the communication destination 14 for communication. The BS 6 develops a specific service area 22, and the BS 7 develops a specific service area 24.

The wireless access network 16 is a mediated network provided between the MS 4 and the provider network 18, and, for example, is WiMAX (World Wide Interoperability of Microwave Access). WiMAX is a wireless access system using a microwave and interoperable worldwide.

The provider network 18 and the Internet 20 are computer networks which the communication destination 14 subscribes to. A gateway (GW) 26 is disposed at the provider network 18 side.

In this wireless system 2, a wireless connection section 28 is set between the MS 4 and the BS 6, and the MS 4 and the BS 6 are connected to the communication destination 14 via the wireless access network 16, the provider network 18 and the Internet 20. A brake line 30 is an example of a connection route thereof. On the contrary, an arrow 32 is an example of scanning connection between the MS 4 and the other BS 7 via a wireless connection section 34. In short, this wireless system 2 is constituted so that the scan request is issued from the MS 4 to the BS 6 during connection, the scan instruction in response to the scan request is issued from the BS 6 to the MS 4, and the MS 4 performs BS search in the scan duration.

Figure 6:
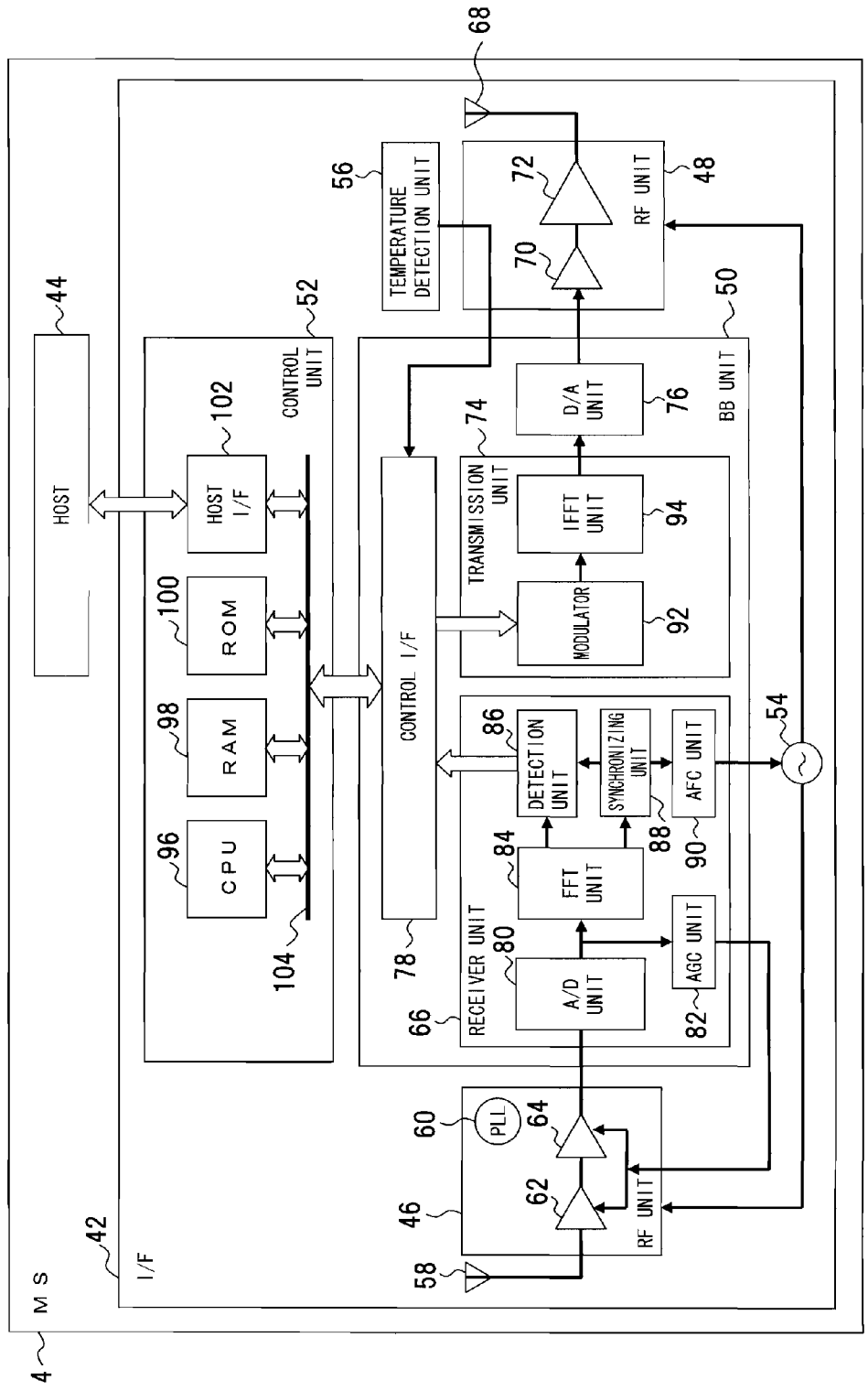
FIG. 6 depicts an example of a structure of hardware of a wireless communication terminal apparatus.

Hardware of this wireless communication terminal apparatus will be described with reference to FIG. 6. FIG. 6 depicts an example of a structure of hardware of the wireless communication terminal apparatus. In FIG. 6, the same components as those in FIG. 3 are denoted by the same reference numerals.

The MS 4 includes an interface (I/F) 42 and a host 44 as depicted in FIG. 6 as a means for connecting to the BS 6 by radio. The I/F 42 is an example of a wireless communication module including each function of transmission and reception for wireless connection with the BS 6. The host (host computer) 44 is a control unit of the I/F 42 and consists of a computer.

Since an example of the wireless communication module as described above, the I/F 42 includes a receive RF unit 46, a transmit RF unit 48, a BB (base band) unit 50, a control unit 52, an oscillator 54 and a temperature detection unit 56.

The receive RF (radio frequency) unit 46 includes a receiving antenna 58 and receives a transmission signal from the BS 6. Thus, the RF unit 46 at a reception side includes a radio frequency amplifying function for a reception signal and a tuning function for receiving frequency. In order to implement these functions, an oscillation output is supplied from the oscillator 54. As a means for tuning receiving frequency, a PLL (phase locked loop) 60 that constitutes a frequency synthesizer is included therein. As means for amplifying a reception signal, amplifiers 62 and 64 are also included therein. The gains of these amplifiers 62 and 64 are controlled by a gain control output of a receiver unit 66.

The transmit RF (radio frequency) unit 48 generates a transmission output signal of transmitting an output signal from the BB unit 50, and sends out this transmission output signal from a transmitting antenna 68 toward the BS 6. Thus, the RF unit 48 at a transmission side includes an output amplifying function for sending out a transmission signal. In order to implement this function, an oscillation output is supplied from the oscillator 54. As means for amplifying the transmission signal, amplifiers 70 and 72 are included therein.

The BB unit 50 executes data processing such as detecting, disassembling and reassembling a packet that transmits data, and signal processing such as modulation, digital-analog conversion (D/A) and analog-digital conversion (A/D). Thus, this BB unit 50 includes the receiver unit 66, a transmission unit 74, a D/A unit 76 and a control interface (I/F) 78.

The receiver unit 66 includes an A/D unit 80, an automatic gain control (AGC) unit 82, a fast Fourier transform (FFT) unit 84, a detection unit 86, a synchronizing unit 88 and an automatic frequency control (AFC) unit 90.

In the receiver unit 66, the reception signal obtained by the RF unit 46 is converted into a digital signal in the A/D unit 80. The AGC unit 82 detects a reception signal level from the digital signal obtained by the A/D unit 80, and generates an AGC signal according to the reception signal level. This AGC signal is supplied to the amplifiers 62 and 64 in the RF unit 46, and controls the gains of the amplifiers 62 and 64.

The FFT unit 84 is a signal processor that performs a fast Fourier transform on the digital signal obtained by the A/D unit 80, and extracts frequency components included in the digitalized reception signal. The detection unit 86 detects a packet signal from the frequency components extracted by the FFT unit 84 and outputs the detected packet signal to the control I/F 78. The synchronizing unit 88 synchronizes the detection unit 86 and synchronizes the AFC unit 90 using the frequency components extracted by the FFT unit 84. The AFC unit 90 executes frequency control of oscillation frequency of the oscillator 54 using the frequency components extracted by the FFT unit 84, and oscillates the oscillator 54 at a certain oscillation frequency.

The transmission unit 74 includes a modulator 92 and an inverse FFT (IFFT) unit 94. The modulator 92 receives the signal of data etc. from the control I/F 78 and performs digital modulation on a carrier wave. The IFFT unit 94 performs inverse fast Fourier transform on an output signal of the modulator 92 and generates a transmission signal of a digital signal.

The D/A unit 76 converts the transmission signal generated by the IFFT unit 94 to an analog signal, and sends out the conversed analog signal to the RF unit 48. The RF unit 48 converts the given transmission signal to a transmission output signal, and sends out the converted transmission output signal from the transmitting antenna 68.

The control I/F 78 is an interface that is a mediated means between the control unit 52, and the receiver unit 66 and the transmission unit 74. The control I/F 78 transmits the reception signal of packet data etc. obtained by the receiver unit 66 to the control unit 52 or transmits the transmission signal of the control unit 52 to the transmission unit 74. The control I/F 78 also constitutes a means for taking in a temperature detection signal from the temperature detection unit 56 and transmitting the taken signal to the control unit 52.

The control unit 52 is a control means for the BB unit 50, and executes various kinds of control such as a request of a scanning process to a BS during connection, for example, the BS 6, and suspension of the transmitter and a receiver according to detected temperature in response to a scan instruction from the BS 6. The control unit 52 includes a CPU (central processing unit) 96, a RAM (random-access memory) 98, a ROM (read-only memory) 100 and a host interface (I/F) 102, which are connected by a bus 104.

The CPU 96 is an example of a processor executing a control process and an operation process, and executes a program developed on the ROM 100, or a program developed on the RAM 98 from the ROM 100. The control for suspending the transmitter and the receiver described above is mounted as, for example, a part of processes incorporated in a program.

The RAM 98 is an example of a readable and writable storage means. The RAM 98 is used as a work area for a program executed by the CPU 96, and develops and stores the program stored in the ROM 100. The ROM 100 is a storage means for a program, data, etc., and stores the program executed by the CPU 96, various kinds of table data, etc. The ROM 100 may be formed by a recording medium such as a flash memory.

The host I/F 102 constitutes an interface as a mediated means for linking the control unit 52 and the host 44.

The oscillator 54 is a means for oscillating at predetermined frequency. Oscillation frequency is controlled by the output of the receiver unit 66 as described above. An oscillation output is outputted to the RF units 46 and 48, respectively.

The temperature detection unit 56 is an example of a temperature detection means for heat generating parts. In this embodiment, the temperature detection unit 56 is disposed at a position where the temperature of the RF unit 48 at the transmission side, which is a heat generating part, can be detected. A detection signal representing detected temperature thereof is supplied to the control I/F 78. While disposed at the RF unit 48 side in this embodiment, the temperature detection unit 56 may be disposed at heat generating parts other than the RF unit 48, for example, an IC (integrated circuit) or an element.

Figure 7:
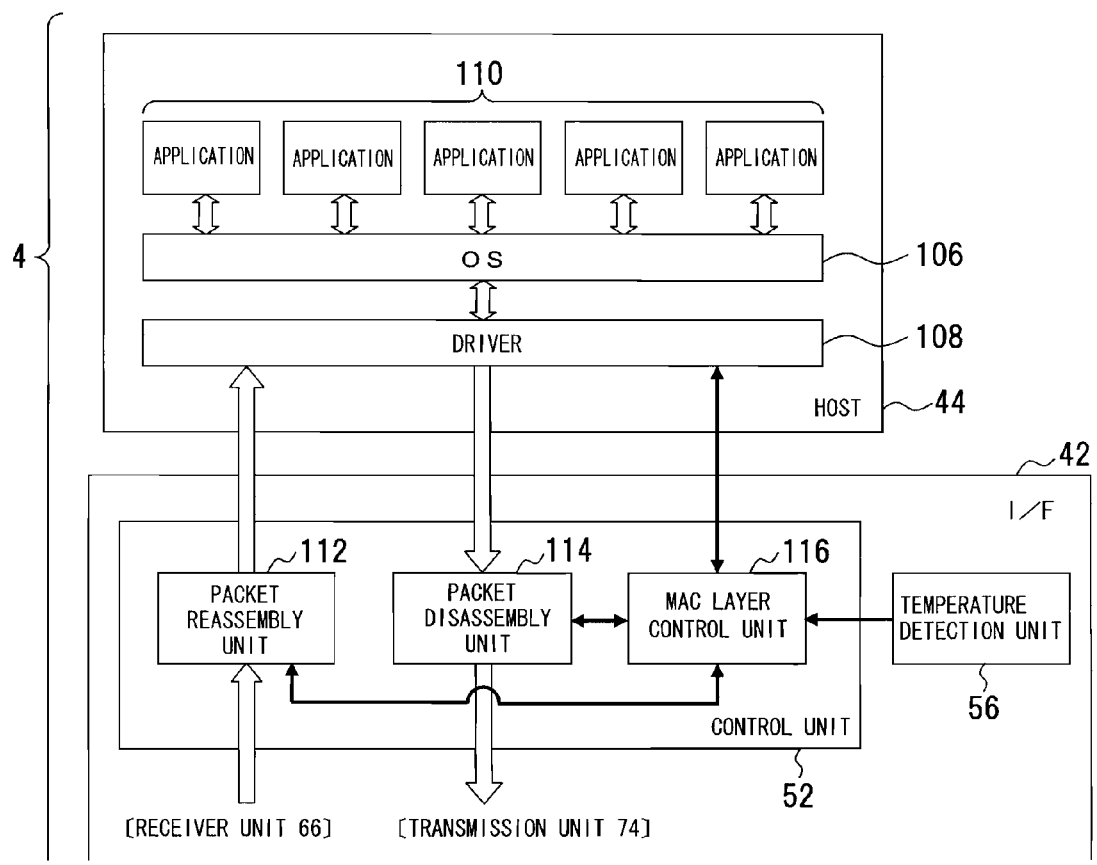
FIG. 7 depicts an example of a structure of functional units of the wireless communication terminal apparatus.

Functional units of this wireless communication terminal apparatus will be described with reference to FIG. 7. FIG. 7 depicts an example of a structure of functional units of the wireless communication terminal apparatus. In FIG. 7, the same components as those in FIG. 6 are denoted by the same reference numerals.

This MS 4 includes the host 44 and the control unit 52 as described above, and further, includes the temperature detection unit 56. The host 44 includes an OS (operating system) 106 and a driver 108 which are executed by a computer. The OS 106 includes a plurality of application programs 110.

The control unit 52 includes a packet reassembly unit 112, a packet disassembly unit 114 and a MAC (media access control) layer control unit 116 as functional units realized by hardware such as the above described CPU 96.

The packet reassembly unit 112 is a means for reassembling a packet from a packet signal obtained by the receiver unit 66 to reproduce a packet sent out from the BS 6.

The packet disassembly unit 114 is a means for disassembling packet data provided from the host 44 to a signal including a packet to send out the signal to the transmission unit 74 as a transmission signal from which the packet is able to be reassembled.

The MAC layer control unit 116 is a means for controlling a MAC layer at the MS 4 side such as connection control and packet communication control with the BS 6. In this embodiment, transmission and reception control is executed according to the temperature detected by the temperature detection unit 56. As described above, the MAC layer control unit 116 makes the transmission unit 74 send out to the BS 6 during connection the scan request that apart or all of scan duration is made transmission and reception suspending duration when the temperature detected by the temperature detection unit 56 is over a reference level. When the scan instruction is received from the BS 6 during connection, the transmitter and the receiver are suspended in the transmission and reception suspending duration set in the scan duration.

Figure 8:
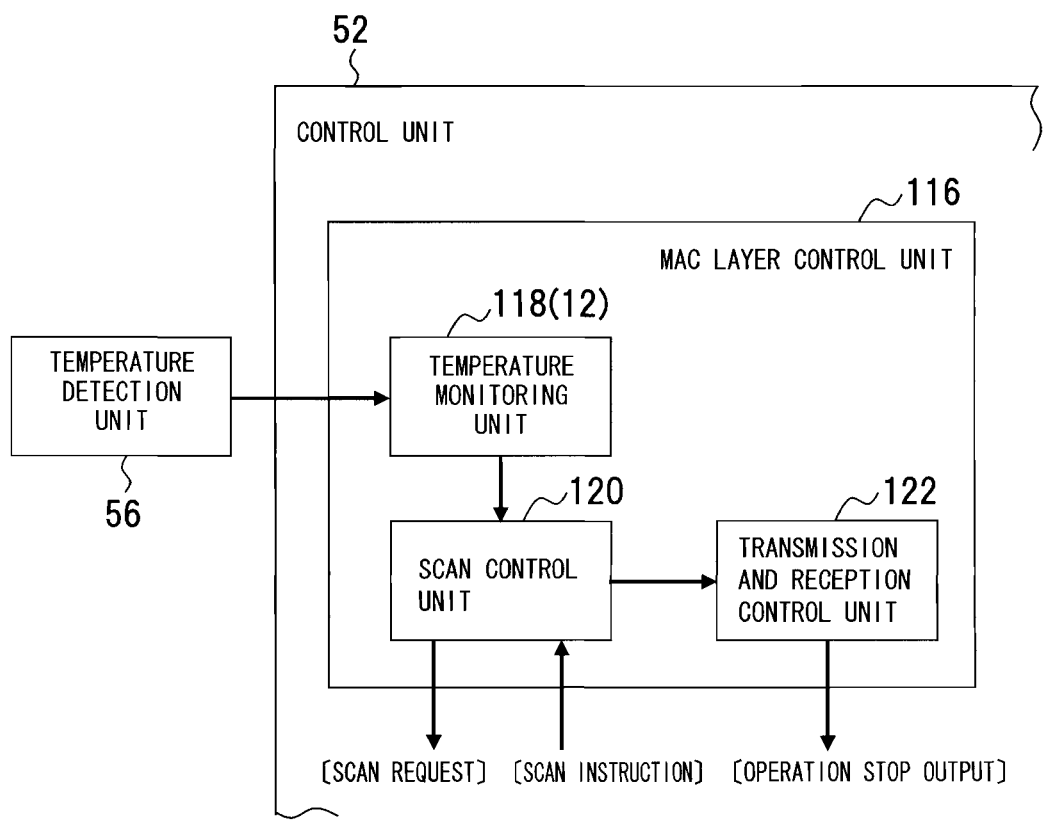
FIG. 8 depicts an example of a structure of functional units for transmission and reception control.

A function of this MAC layer control unit 116 will be described with reference to FIG. 8. FIG. 8 depicts an example of a structure of functional units for transmission and reception control. In FIG. 8, the same components as those in FIGS. 6 and 7 are denoted by the same reference numerals.

The MAC layer control unit 116 includes a temperature monitoring unit 118, a scan control unit 120 and a transmission and reception control unit 122 as depicted in FIG. 8. These functional units are generated by application programs of the control unit 52 which is the above described hardware.

The temperature monitoring unit 118 is an example of the above described state monitoring unit 12 (FIG. 3). The temperature monitoring unit 118 takes the temperature in, which is detected by the temperature detection unit 56, and monitors whether the detected temperature is over the predetermined temperature representing an overheated state. A monitor output of this temperature monitoring unit 118 is supplied to the scan control unit 120 and the transmission and reception control unit 122.

When the temperature monitoring unit 118 detects the overheated state, the scan control unit 120 executes scan control as a means for suspending the transmitter and receiver according to the monitor output from the temperature monitoring unit 118 in this embodiment. This scan control includes generation of the scan request to the BS 6 and a scanning process by the scan instruction from the BS 6. In this scan request, transmission and reception suspending duration is set in scan duration Ts. In this case, the scan duration Ts may be the sum of scan duration $T_1$ for a scan proper and transmission and reception suspending duration $T_2$ (Tm=$T_1$+$T_2$), or may be the same as the transmission and reception suspending duration (Ts=$T_2$). That is, the transmission and reception suspending duration $T_2$ may be a part or all of the scan duration Ts. In this case, the transmission and reception suspending duration $T_2$ may be a time period enough for the overheated state to be removed, and may be any length. The scan control unit 120 receives the scan instruction and informs the transmission and reception control unit 122 of an instruction of shifting to the scanning process.

The transmission and reception control unit 122 executes control of suspending the transmitter and the receiver of the MS 4 in the transmission and reception suspending duration $T_2$ included in the scan duration Ts, and executes control of resuming communication after the transmission and reception suspending duration $T_2$ has passed.

Figure 9:
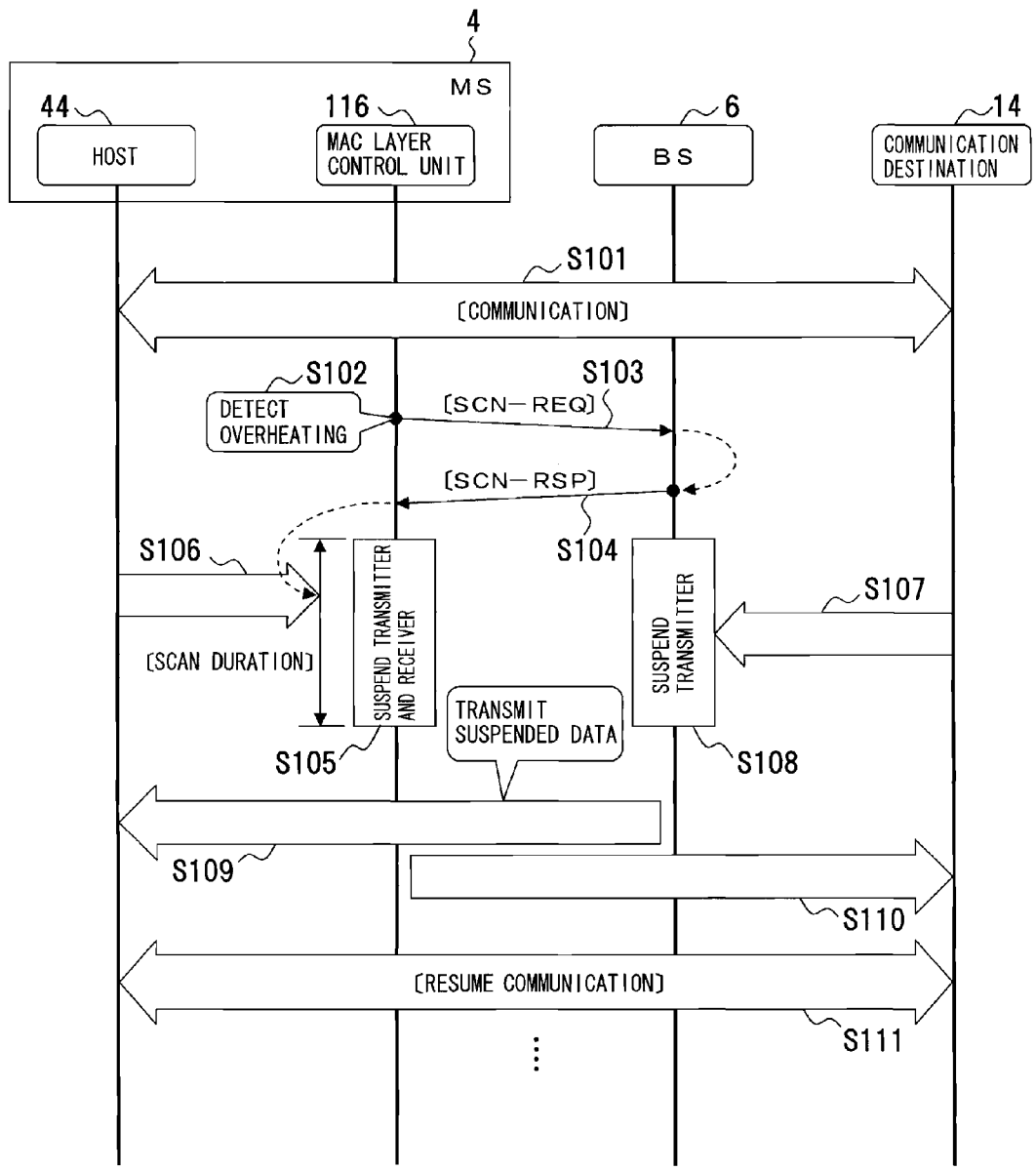
FIG. 9 depicts an example of a sequence.

A sequence of this wireless system will be described with reference to FIG. 9. FIG. 9 depicts an example of a sequence.

This sequence is an example of the program and the method of the present disclosure. In this sequence, when an overheated state is determined by the temperature detected by the temperature detection unit 56 in the I/F 42, a request of a BS scan is issued to the BS 6 during connection. In response to the scan instruction from the BS 6, a process is executed that the transmitter and the receiver are suspended during all the scan duration in this embodiment as the transmission and reception suspending duration set in a part or all of the scan duration. Specifically, the temperature detected by the temperature detection unit 56 is taken into the MAC layer control unit 116, and whether to be the overheated state or not is determined from the detected temperature. When the MAC layer control unit 116 determines the overheated state from the detected temperature in connection to the BS 6, the scan request is sent out to the BS 6 during connection. In response to the scan instruction from the BS 6, the transmitter and receiver of the MS 4 are suspended for all of the scan duration. In this case, if the MS 4 has a power saving function such as partial clock stop and power supply stop, clock stop or power supply stop for suspendable circuits may be executed along with the suspension of the transmitter and receiver. This suspension of the transmitter and receiver and executing the other processes accompanying, for example, the above power saving function accompaniments can reduce and suppress power consumption of the I/F 42 to remove the continuation of overheating.

In this wireless system 2, as depicted in FIG. 9, the MS 4 and the communication destination 14 execute communication with each other (step S101). During this communication, overheating detection is executed at the MS 4 side (step S102). In this overheating detection, the overheated state may be determined when the temperature detected by the above described temperature detection unit 56 is over a predetermined value. Based on this overheating detection, a scan request (SCN-REQ) is generated from the MS 4 and is sent to the BS 6 during communication (step S103). A scan response (SCN-RSP) is sent out from the BS 6 that receives this scan request (step S104). The MS 4 receives a scan instruction by this scan response.

Scan duration is set in this scan response. This scan duration includes transmission and reception suspending duration as duration for suspending the transmitter and receiver. In this embodiment, the scan duration and the transmission and reception suspending duration are the same length. Then, the MAC layer control unit 116 of the control unit 52 in the MS 4 suspends the transmitter and receiver in the scan duration (step S105). That is, data transmission from the host 44 in the MS 4 is suspended (step S106). Data transmission from the communication destination 14 (step S107) is also suspended (step S108). Transmission data sent out from the communication destination 14 is stored in the BS 6 that is in a transmission suspension state.

Since the MS 4 and the BS 6 sides monitor the scan duration, the suspended data is transmitted from the BS 6 to the MS 4 (step S109) after this scan duration expires, that is, in this embodiment, the transmission and reception suspending duration expires, and the suspended data is transmitted from the control unit 52 in the MS 4 to the communication destination 14 (step S110). After such data transmission and reception, communication is resumed (step S111).

In the process of such a sequence, a temperature detection element such as a thermistor may be mounted on heat generation parts such as the RF unit 48 as the temperature detection unit 56, or information such as temperature correction obtained from the RF unit 48 may be obtained. This obtained temperature information may be inputted into the MAC layer control unit 116 as control information as well as the temperature detection unit 56.

Instead of this temperature information, information of condition such as transmission power, transmission time and time passage from the start of transmission may be used as the control information. The above type of control information may be used along with the temperature information.

The detected temperature may be always monitored, and when the scan duration of once is not sufficient for the avoidance of overheating, that is, when overheating is continued, the scan request may be repeatedly issued while communication connection is kept, the transmitter and receiver may be suspended and the continuation of overheating may be avoided.

Figure 10:
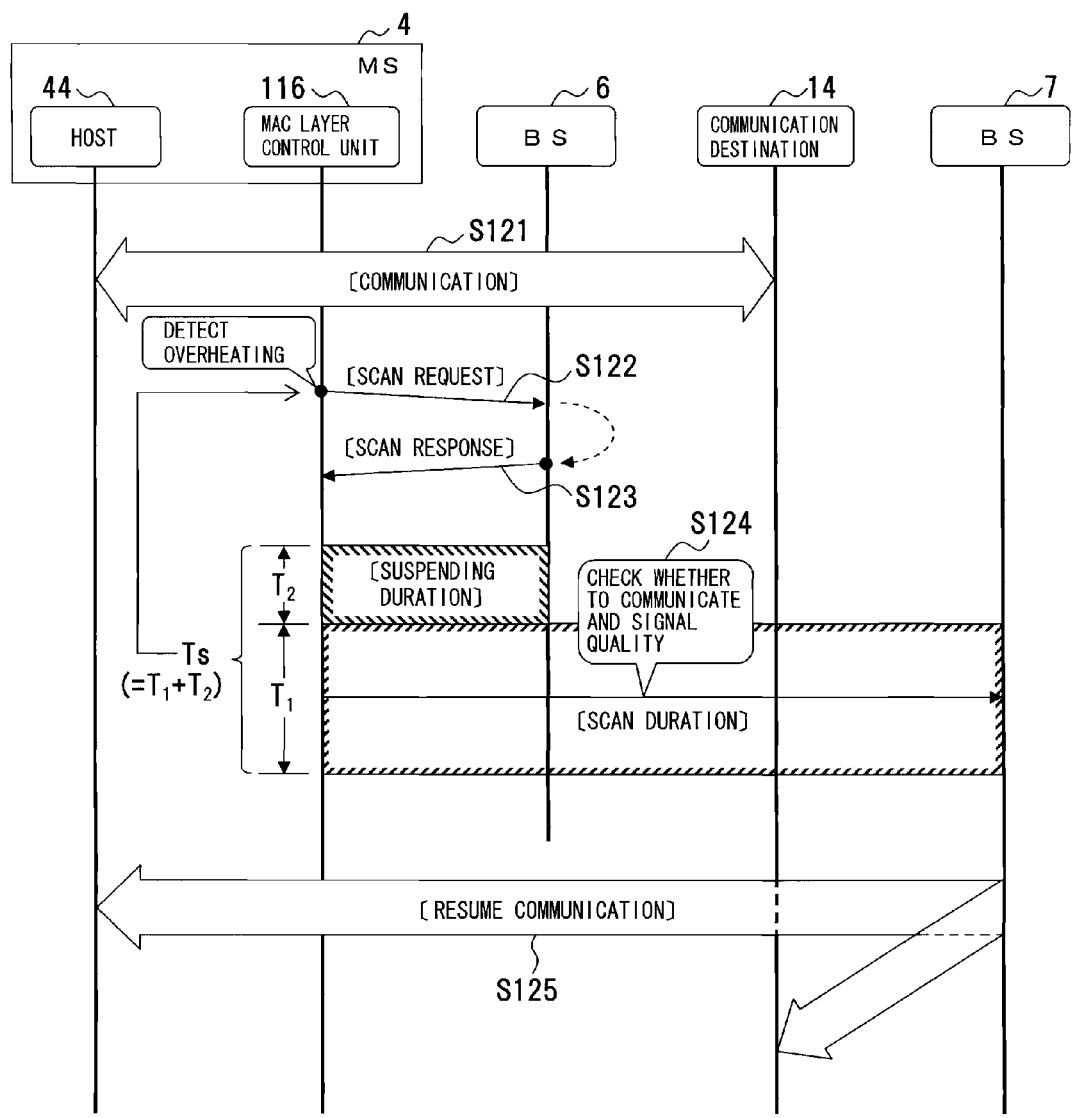
FIG. 10 depicts a sequence in which suspending duration is added to scan duration.

A sequence in which suspending duration is added to scan duration proper will be described with reference to FIG. 10. FIG. 10 depicts a sequence in which the suspending duration is added to the scan duration.

This sequence is an example of the program and the method of the present disclosure. A process of this sequence includes a process of requesting the total time period of the duration proper for a scan and transmission and reception suspending duration for moderating overheating when a scanning process is executed. That is, this sequence includes a process for avoiding overheating without any damage to a function proper of the scanning process. In this case, the scan duration Ts is a time period that the transmission and reception suspending duration $T_2$ for avoiding overheating is added to the scan duration proper $T_1$. The scan request that the total time period thereof is set for the scan duration Ts is issued. In such a structure, a scanning function and a function for preventing the overheated state from continuing can be carried out by executing a scan proper and stop of the transmitter and receiver for avoiding overheating in the assigned scan duration Ts.

In this wireless system 2, as depicted in FIG. 10, the MS 4 and the communication destination 14 execute communication with each other (step S121) as described above. By overheating detection, a scan request (SCN-REQ) is generated from the MS 4 and is transmitted to the BS 6 during communication (step S122). The BS 6 which receives this scan request sends out a scan response (SCN-RSP) as the scan instruction (step S123).

In this case, the scan duration Ts that is instructed in response to the scan request is defined as the sum of the scan duration $T_1$ for executing a scanning process proper and the transmission and reception suspending duration $T_2$. In this case, in the scan duration $T_1$ for the scanning process proper, determination whether to receive a signal or not and measurement of the signal quality are executed (step S124). In this case, the other BS 7 that has good reception quality is found out in the scan duration $T_1$ proper in the scan duration Ts accompanying the transmission and reception suspending duration $T_2$ with the BS 6 during communication, and a handover process is executed.

After a BS is shifted to the other BS 7, communication between the MS 4 and the communication destination 14 is resumed (step S125).

In the wireless system 2 in which a BS scan can be requested from the MS 4 to, for example, the BS 6 like the above, the temperature detected by the temperature detection unit 56 is monitored through the control I/F 78 in the BS 6. In this case, the temperature detection unit 56 may be disposed at a part where extreme heat generation which causes power consumption occurs, for example, the RF unit 48 at the transmission side. In this case, during the connection of the MS 4 and the BS 6, the MAC layer control unit 116 monitors a temperature detection signal in the temperature detection unit 56, and determines whether the detected temperature thereof is a predetermined value representing the overheated state. In such a case, the scan request is generated to the BS 6 during connection and sent it out. The BS 6 that receives the scan request accepts the scan request, and sends out the scan instruction to the MS 4. Thus, all or a part of the scan duration included in this scan instruction is defined as the transmission and reception suspending duration, and the transmitter and receiver are suspended in the MS 4.

In other words, in the third embodiment, the sequence is activated that overheating of the MS 4 is detected, the scanning process is requested for the BS 6, and the instruction about scan duration is received from the BS 6. This scan duration means a time period when the MS 4 can check whether to receive a radio wave of the other BS 7. As a result, duration that transmission and reception is not temporally executed with the BS 6 during connection, that is, the transmission and reception suspending duration is generated.

If the transmission and reception suspending duration is set in the scan duration like the above, power consumption can be suppressed and the continuation of overheating can be avoided since the transmitter and receiver of the MS 4 are suspended for a part or all of the scan duration. That is, a temperature protection system of the MS 4 is established using the scan duration in the scanning process. For example, in the scan mode provided in a mobile WiMAX, the scan duration is used for scanning other BS's, like searching a receivable BS and for measuring a signal level and quality thereof, and during the scan duration, a BS is considered as a transitional non-connection state with an MS. Therefore, if all or a part of the scan duration is set in the transmission and reception suspending duration, there occurs no convenience.

Since the BS 6 also suspends the transmitter to the MS 4 in this transmission and reception suspending duration, there occurs no convenience that the MS 4 may miss receiving data. In the suspension of the transmitter and receiver, power supply to the receiver unit 66 and the transmission unit 74 at the MS 4 side, and the BB unit 50 including them may be suspended (that is, power-OFF). In the scan duration including the transmission and reception suspending duration, a time period when the scanning process proper can be executed may be set and a BS search process proper may be executed in this period.

[d] Fourth Embodiment

A fourth embodiment is that when detected temperature represents overheating, power supply to a part or all of an I/F is suspended in transmission and reception suspending duration in scan duration.

Figure 11:
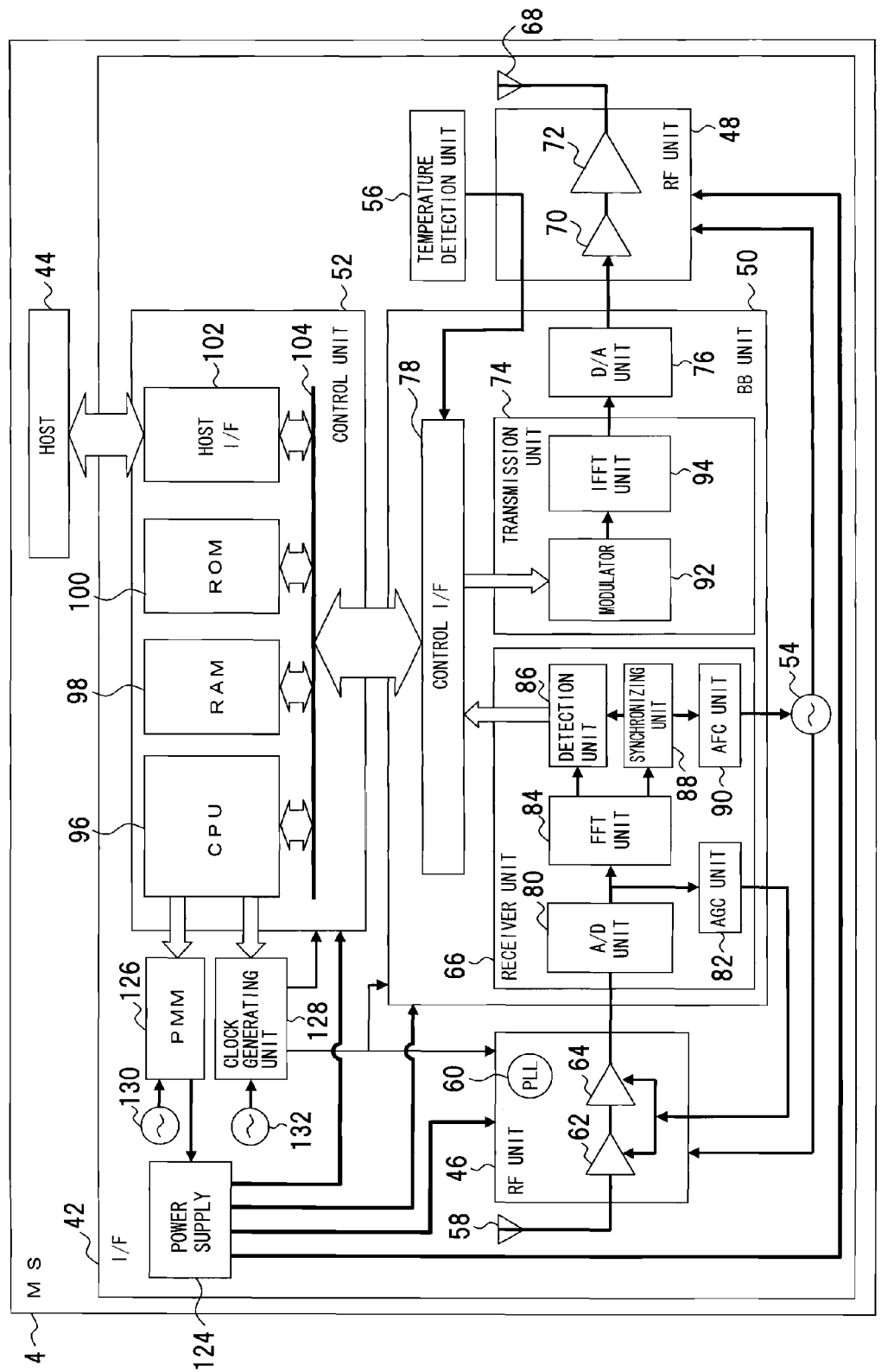
FIG. 11 depicts an example of a structure of a wireless communication terminal apparatus according to a fourth embodiment.

The fourth embodiment will be described with reference to FIG. 11. FIG. 11 depicts an example of a structure of a wireless communication terminal apparatus according to the fourth embodiment. In FIG. 11, the same components as those in FIG. 6 are denoted by the same reference numerals.

In the MS 4 of this embodiment, the above described suspension of the transmitter and receiver is implemented by power feeding control. Thus, this MS 4 includes s power supply 124, a PMM (power management module) 126 and a clock generating unit 128 along with the above described RF units 46 and 48, the BB unit 50 and the control unit 52 in the I/F 42.

The power supply 124 is an example of a power feeding means for the functional units such as the RF units 46 and 48, the BB unit 50 and the control unit 52.

The PMM 126 is an example of a power supply control means, operates by a clock signal from a clock emission unit 130 and controls an output of the power supply 124 in response to the output of the control unit 52.

The clock generating unit 128 receives a clock signal from a clock emission unit 132, executes signal processing such as frequency dividing of this clock signal, generates a clock for the control unit 52, and supplies the generated clock to the control unit 52. In this embodiment, the operation of the clock generating unit 128 is controlled by the control unit 52.

In this embodiment, the above described MAC layer control unit 116 (FIGS. 7 and 8) is also generated by the control unit 52. The operations of the PMM 126 and the clock generating unit 128 are controlled by an operation stop output from the MAC layer control unit 116.

The control unit 52 monitors the temperature detected by the temperature detection unit 56. When the detected temperature thereby represents overheating, a scan request is issued and a scan instruction is received from the BS 6 as described above. The scan instruction is received and the transmitter and receiver are suspended in the transmission and reception suspending duration set in the scan duration. In this embodiment, the suspension of the transmitter and receiver is implemented by the power feeding control.

In this case, the control unit 52 gives the PMM 126 the above described operation stop output. The PMM 126 that receives this output controls the power supply 124 to stop the power supply to the RF units 46 and 48, and the BB unit 50. Thereby, the operations of the RF units 46 and 48, and the BB unit 50 are suspended or to be hibernation in the transmission and reception suspending duration.

The operation stop output is also given from the control unit 52 to the clock generating unit 128 to stop the operation of the clock generating unit 128. Thereby, a clock is also in hibernation.

According to such a structure, when the temperature detection unit 56 detects overheating of the MS 4, for example, overheating of the amplifiers 70 and 72 of the RF unit 48 at the transmission side, processes can be suspended in the transmission and reception suspending duration set in the scan duration. Therefore, the MS 4 is protected from the continuation of overheating, and the reduction of power consumption can be achieved. In this case, since power supplying to the control unit 52 is not stopped, control operation is not disturbed.

In the structure of controlling the operation of the I/F 42 by temperature monitoring of the temperature detection unit 56, the operation of a circuit including the transmitter and receiver can be controlled to be suspended temporally while the connection to the BS 6 is kept, and the continuation of overheating can be avoided.

[e] Fifth Embodiment

A fifth embodiment is that in control according to a type of communication, the above described suspension of the transmitter and receiver based on the temperature monitoring is executed.

Figure 12:
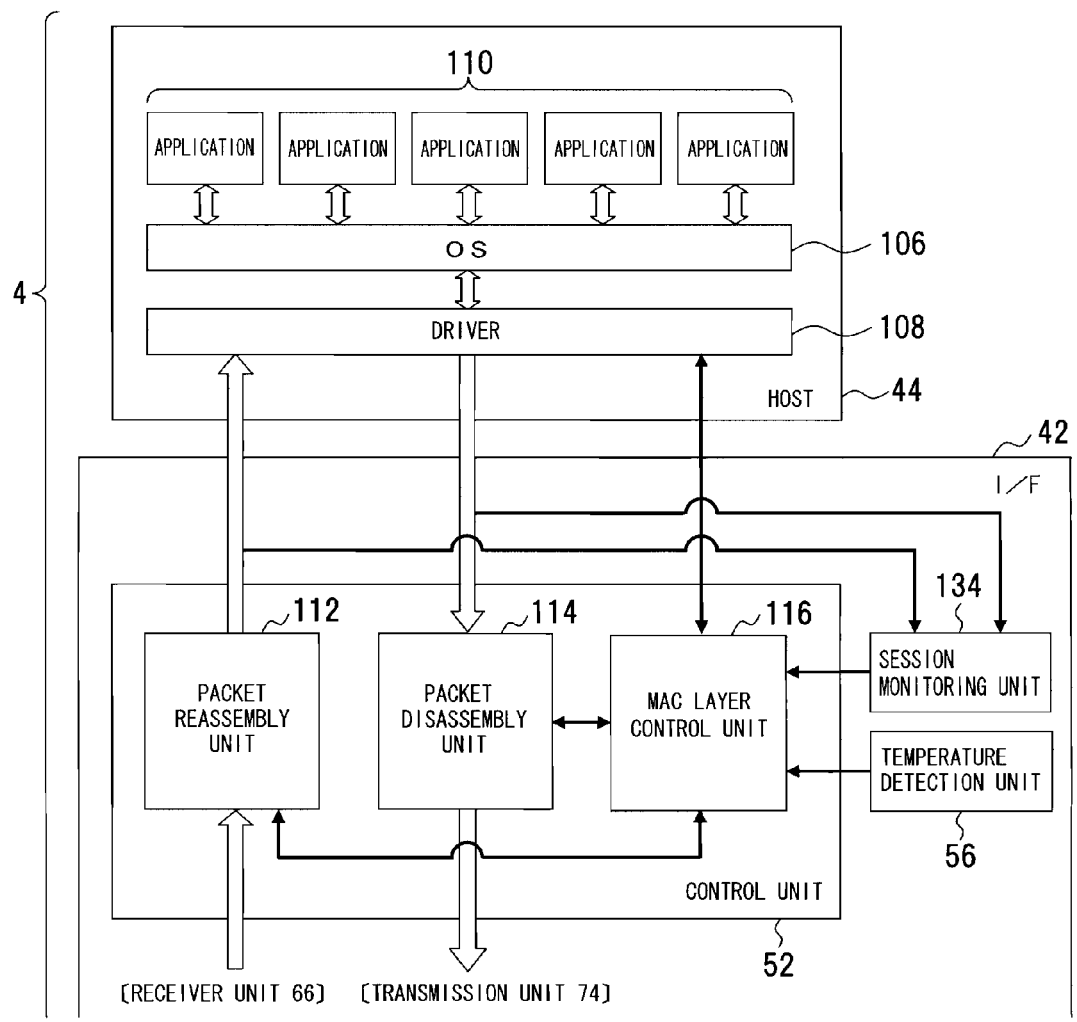
FIG. 12 depicts an example of a structure of a wireless communication terminal apparatus according to a fifth embodiment.

The fifth embodiment will be described with reference to FIG. 12. FIG. 12 depicts an example of a structure of a wireless communication terminal apparatus according to the fifth embodiment. In FIG. 12, the same components as those in FIG. 7 are denoted by the same reference numerals.

This MS 4 includes a session monitoring unit 134 along with the control unit 52 and the temperature detection unit 56 in the I/F 42. The session monitoring unit 134 is a means for monitoring a type of communication in order to implement control based on a type of communication. The session monitoring unit 134 informs the MAC layer control unit 116 of information representing a detected type of communication.

In this case, a packet reassembled in the packet reassembly unit 112 based on a reception signal in the receiver unit 66 is supplied to the session monitoring unit 134, and a packet which is outputted to the packet disassembly unit 114 is supplied from the host 44. Thus, the session monitoring unit 134 monitors a session using these packets, and informs the MAC layer control unit 116 of control information representing a detected type of communication.

As to such a structure, when TCP/IP (transmission control protocol/Internet protocol) is used for an upper protocol of WiMAX, a protocol identifier of an upper layer exists in an IP header of a packet. This protocol identifier includes protocol identification information representing which the protocol of the upper layer is, TCP (transmission control protocol), UDP (user datagram protocol) or another protocol. Therefore, a type of communication, that is, a communication session can be determined from this protocol identifier.

In a case of TCP or UDP, what type of data flows can be determined using a corresponding relationship between a port number, which is called Well Known Port, that is a session identifier as port information and a using protocol. In the case of UDP, whether there is header information of a RTP (real-time transport protocol) packet or not in a UDP payload may be tested.

Such determination of a type of communication data may be executed by a packet. This determination may also be executed depending that a session is continued or not by monitoring the occurrence or disappearance of a communication session, which is called "Connection Tracking" or "Stateful Inspection".

For the identification of a session, a type of data can be used that is used for identification of a compression and development protocol of a packet header of a PHS (personal handyphone system), ROHC (robust header compression), etc. As to this identification of a type of data, a header format (FIG. 22) or a header structure (FIG. 23) may be used in order to know packet information.

Other structures of the I/F 42 is the same as the third embodiment. The function of the temperature detection unit 56 and temperature monitoring thereof are also the same as the third embodiment. Thus, description thereof is omitted.

Figure 13:
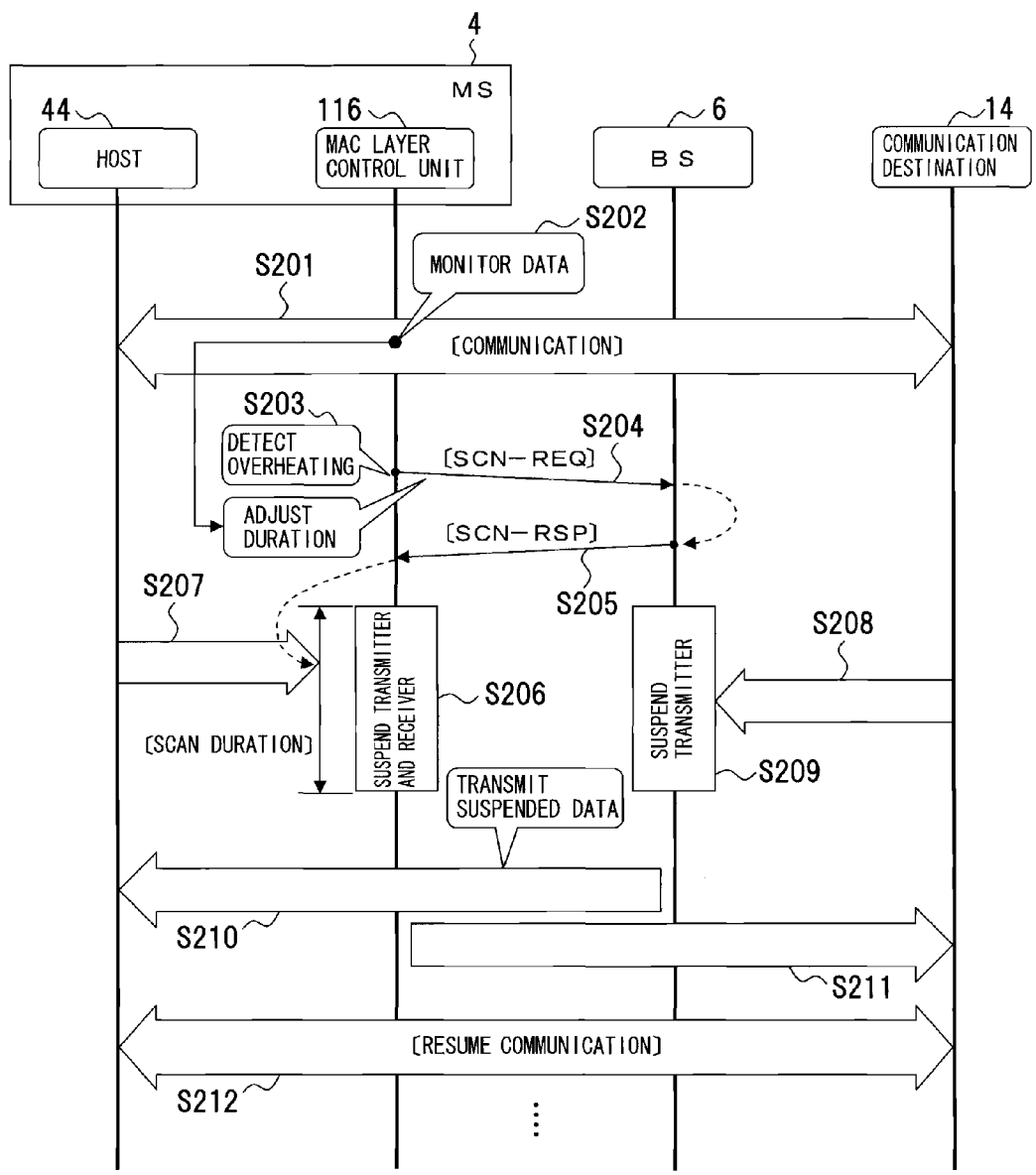
FIG. 13 depicts a control sequence according to a type of communication.

Control according to a type of communication will be described with reference to FIG. 13. FIG. 13 depicts a control sequence according to a type of communication.

In this sequence, one or both pieces of transmitting and received data is analyzed at the MS 4 side in order to implement the control according to a type of communication, and upper protocol information included in packets to be transmitted and received, or a session establishment sequence that the upper protocol executes is monitored. That is, what protocol is used in communication may be detected.

In this control, when overheating is determined and the scan request is executed, scan duration therefor can be changed according to a type of communication. In this case, the tolerance of delay fluctuation which is generated by the suspension of the transmitter and receiver (delay tolerance) is considered in the setting of the transmission and reception suspending duration secured in the scan duration. This tolerance is different by a type of communication. Thus, long scan duration may be set for communication traffic of high tolerance and short scan duration may be set for communication traffic of low tolerance. Scan duration like the above is requested to a BS, and the frequency of a scanning process is increased to set transmission and reception suspending duration that can moderate overheating in the scan duration.

In this control sequence, as depicted in FIG. 13, when the MS 4 and the communication destination 14 communicate with each other (step S201), data is monitored (step S202). A type of communication is determined by this data monitoring.

Overheating is detected by the temperature detected by the temperature detection unit 56 in the MS 4 (step S203). Based on this detection of overheating, the scan request (SCN-REQ) is generated and transmitted to the BS 6 during communication (step S204). In this scan request, the transmission and reception suspending duration set in the scan duration is adjusted according to the above described type of communication.

A scan response (SCN-RSP) is issued from the BS 6 that receives the scan request (step S205). The MS 4 receives a scan instruction by this scan response.

The scan duration is set in this scan response. The transmission and reception suspending duration set in this scan duration is a time period adjusted based on the determination of a type of communication.

The MAC layer control unit 116 of the control unit 52 in the MS 4 suspends transmission and reception in the scan duration (step S206). That is, data transmission from the host 44 in the MS 4 is suspended (step S207). Data transmission from the communication destination 14 (step S208) is also suspended (step S209). Transmitting data sent out from the communication destination 14 is stored in the BS 6 that is in a transmitter suspension state.

The MS 4 and the BS 6 sides monitor the expiration of the scan duration. When the transmission and reception suspending duration expires, suspended data is transmitted form the BS 6 to the MS 4 (step S210), and suspended data is transmitted from the control unit 52 in the MS 4 to the communication destination 14 (step S211). After such data transmission and reception, communication is resumed (step S212).

Figure 15:
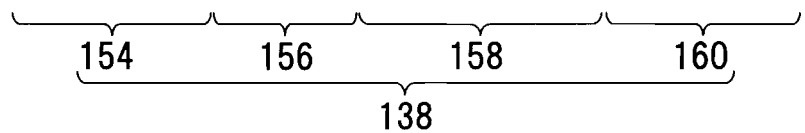
FIG. 15 depicts an example of a structure of an application table.

Management tables used for the control according to a type of communication will be described with reference to FIGS. 14 and 15. FIG. 14 depicts an example of a structure of a connection management table, and FIG. 15 depicts an example of a structure of an application table.

These connection management table 136 (FIG. 14) and application table 138 are means for detecting a communication application in order to execute the above described determination process of a type of communication. These connection management table 136 and application table 138 may be set in a data storage unit set in the above described ROM 100.

In the connection management table 136, as depicted in FIG. 14, a source IP storage unit 140, a protocol storage unit 142, a source port storage unit 144, an address IP storage unit 146, an address port storage unit 148, a state storage unit 150 and a fluctuation tolerance storage unit 152 are set.

Source IP information is stored in the source IP storage unit 140. The above described TCP etc. are stored in the protocol storage unit 142. Source port information is stored in the source port storage unit 144. Address IP information is stored in the address IP storage unit 146. Address port information is stored in the address port storage unit 148. State information such as whether to be communicating is stored in the state storage unit 150. The above described fluctuation tolerance information according to a protocol is stored in the fluctuation tolerance storage unit 152, and in this case, it is indicated that the fluctuation tolerance is "low". This fluctuation tolerance is information for determining and adjusting the transmission and reception suspending duration as described above.

In the application table 138, a protocol storage unit 154, a port storage unit 156, an upper protocol storage unit 158 and a fluctuation tolerance storage unit 160 are set as depicted in FIG. 15.

Protocols such as the above described TCP and UDP are stored in the protocol storage unit 154. Information representing a port that is used is stored in the port storage unit 156. An upper protocol such as RTP is stored in the upper protocol storage unit 158. Information representing fluctuation tolerance is stored in the fluctuation tolerance storage unit 160, and in this case, it is indicated that the fluctuation tolerance is "middle" in TCP and "low" in UDP.

Figure 16:
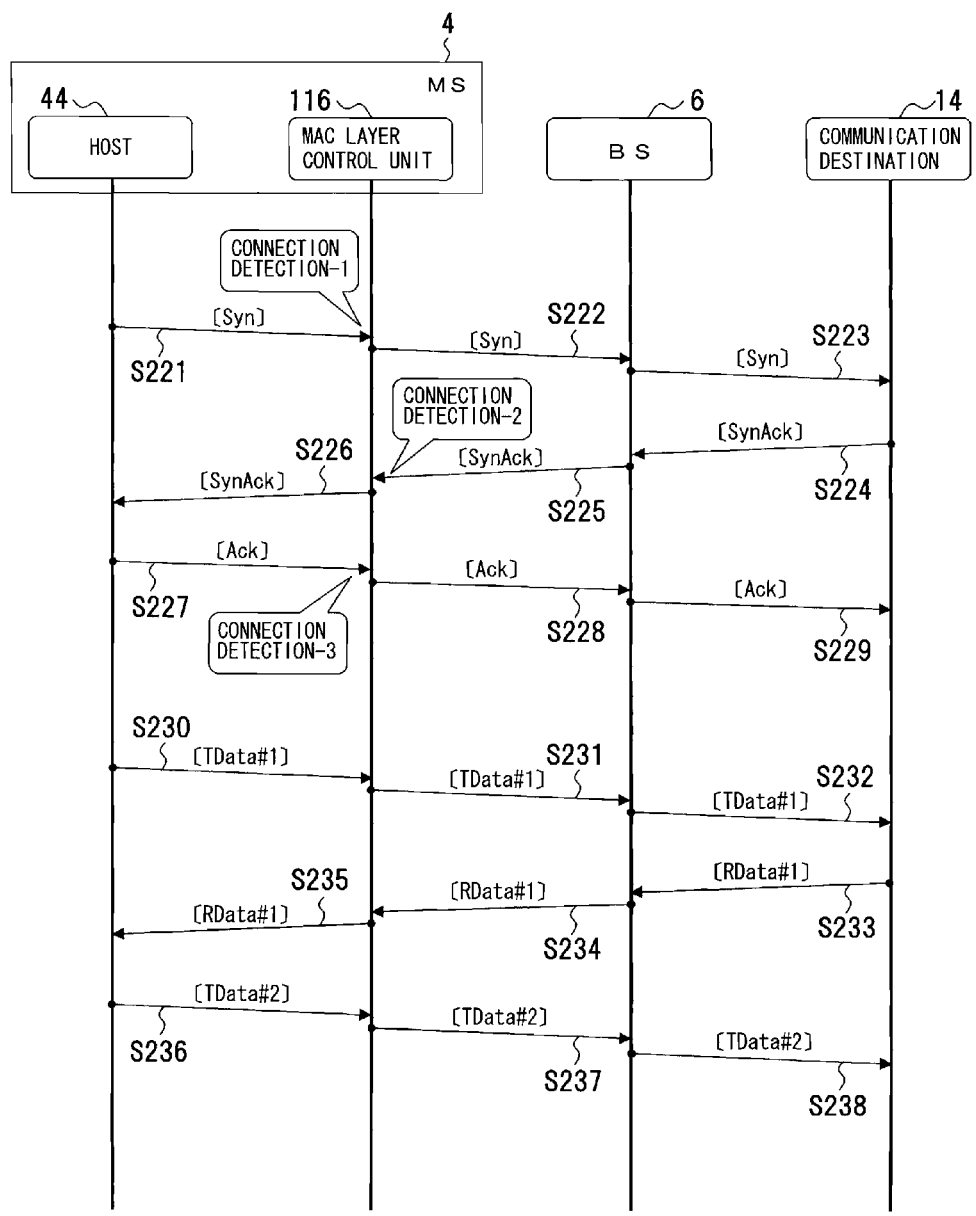
FIG. 16 depicts an example of a sequence of communication application detection.

Detection of a communication application will be described with reference to FIG. 16. FIG. 16 depicts an example of a sequence of communication application detection.

This sequence is an example of the program and the method of the present disclosure, is activated from the host 44, and includes a process of communication application detection. Thus, in this sequence, a connection request (Syn) is sent out from the host 44 to the MAC layer control unit 116 (step S221) as depicted in FIG. 16. In the MAC layer control unit 116, connection detection (connection detection-1) is executed in response to this connection request (Syn).

In response to the connection request, a connection request (Syn) is generated from the MAC layer control unit 116 and sent out to the BS 6 (step S222). This connection request (Syn) is informed of from the BS 6 to the communication destination 14 (step S223), and a connection response (Syn-Ack) is informed of from the communication destination 14 to the BS 6 (step S224). This connection response (SynAck) is notified of from the BS 6 to the MAC layer control unit 116 (step S225). In the MAC layer control unit 116, connection detection (connection detection-2) is executed in response to this connection response (SynAck).

The connection response is informed of from the MAC layer control unit 116 to the host 44 (step S226), and an acknowledgment (Ack) is informed of from the host 44 to the MAC layer control unit 116 (step S227). In the MAC layer control unit 116, connection detection (connection detection-3) is executed in response to this acknowledgment (Ack). This acknowledgment is informed of from the MAC layer control unit 116 to the BS 6 (step S228) to be informed of to the communication destination 14 (step S229).

When connection is established by such a series of processes, packet data of a first frame (TData#1) is sent out from the host 44 to the MAC layer control unit 116 (step S230). This packet data (TData#1) is informed of from the MAC layer control unit 116 to the BS 6 (step S231) to be informed of from the BS 6 to the communication destination 14 (step S232).

Packet data (RData#1) is informed of from the communication destination unit 14 which receives this packet data (TData#1) to the BS 6 (step S233). This packet data (RData#1) is informed of from the BS 6 to the MAC layer control unit 116 (step S234) to be informed of from the MAC layer control unit 116 to the host 44 (step S235).

Packet data of a second frame (TData#2) is sent out from the host 44 to the MAC layer control unit 116 (step S236). This packet data (TData#2) is informed of from the MAC layer control unit 116 to the BS 6 (step S237) to be informed of from the BS 6 to the communication destination 14 (step S238). The same processes are executed thereafter.

Figure 17:
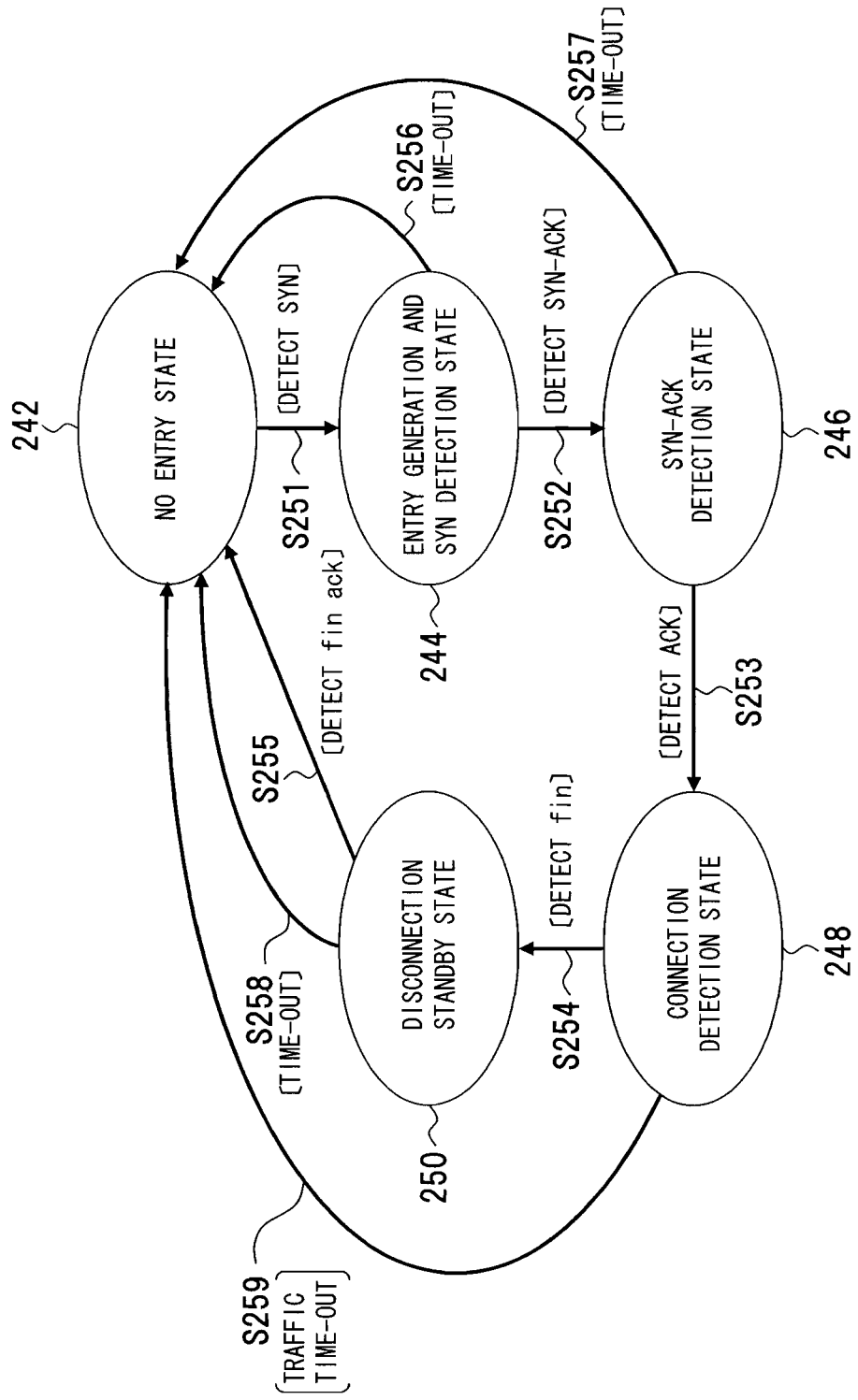
FIG. 17 depicts an example of state transition of the communication application detection.

State transition of the communication application detection will be described with reference to FIG. 17. FIG. 17 depicts an example of state transition of the communication application detection.

In this communication application detection, there exist no entry state 242, an entry generation and connection request (SYN) detection state 244, a connection response (SYN-ACK) detection state 246, a connection detection state 248 and a disconnection standby state 250 as depicted in FIG. 17.

The no entry state 242 transitions to the entry generation and connection request (SYN) detection state 244 by detecting a connection request (SYN) (step S251). The entry generation and connection request (SYN) detection state 244 transitions to the connection response (SYN-ACK) detection state 246 by detecting a connection response (SYN-ACK) (step S252).

This connection response (SYN-ACK) detection state 246 transitions to the connection detection state 248 by detecting an acknowledgment (ACK) (step S253). The connection detection state 248 transitions to the disconnection standby state 250 by "fin" detection according to the end of data transmission etc. (step S254). The disconnection standby state 250 transitions to the no entry state 242 by finAck detection (step S255).

When time-out is detected in any of the entry generation and connection request (SYN) detection state 244, the connection response (SYN-ACK) detection state 246 and the disconnection standby state 250, the state transitions to the no entry state 242 (steps S256, S257 and S258). The connection detection state 248 transitions to the no entry state 242 by detecting traffic time-out (step S259).

Figure 18:
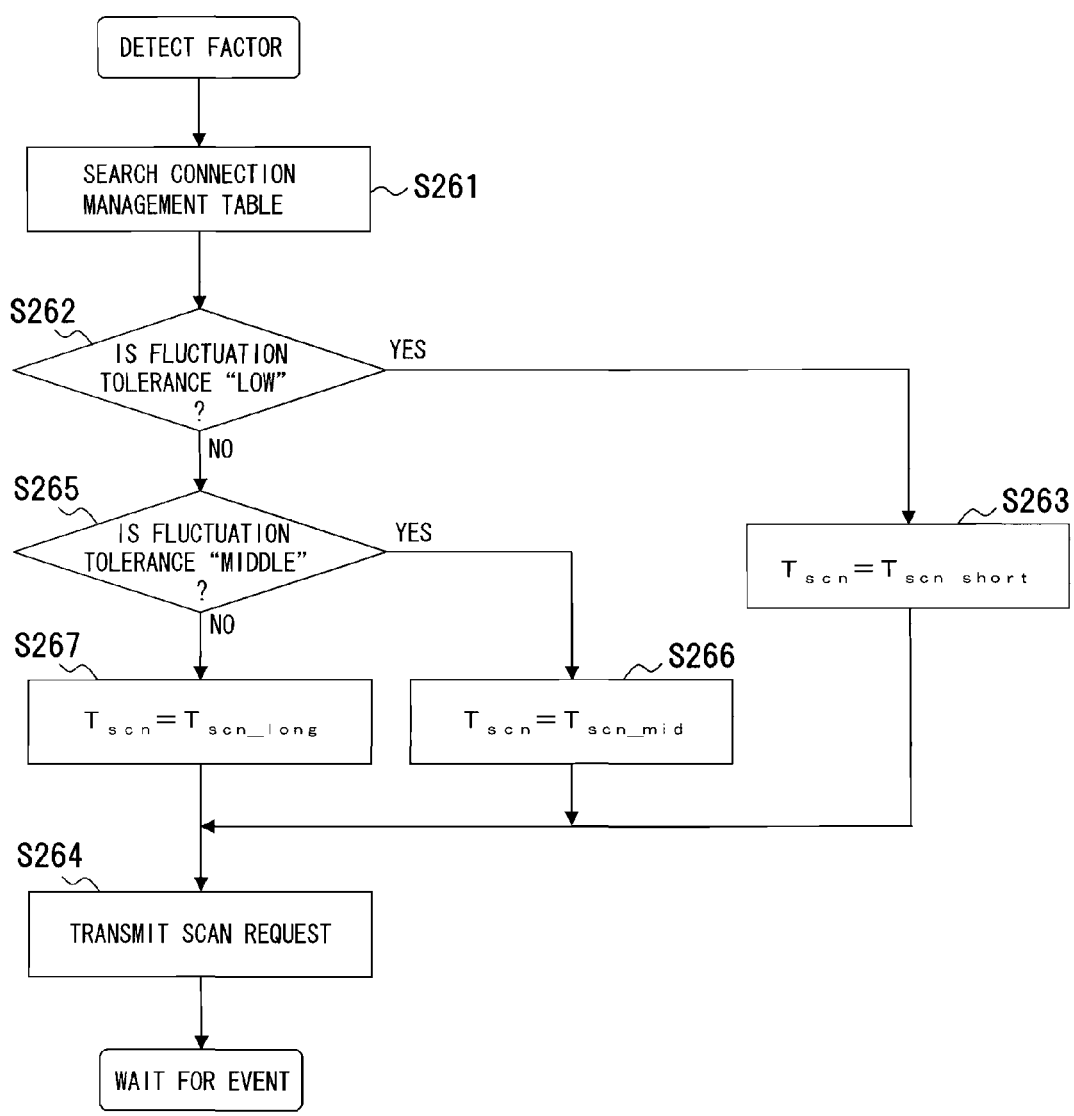
FIG. 18 is a flowchart depicting an example of a sequence of factor detection.

A sequence of the sequence (FIG. 13) will be described with reference to FIG. 18. FIG. 18 is a flowchart depicting an example of a sequence of factor detection.

This sequence is a process of detecting a factor in the sequence (FIG. 13). As depicted in FIG. 18, the connection management table 136 (FIG. 14) is searched (step S261). Whether the fluctuation tolerance is "low" or not is determined from this connection management table 136 (step S262). If the fluctuation tolerance is "low" (YES of step S262), scan duration $T_{scn}$ (=Ts) to be requested is $T_{scn}=T_{scn\_short}$ (step S263). In this case, the scan duration $T_{scn}$ is short scan duration $T_{scn\_short}$ for a communication application of low fluctuation tolerance, the scan request is sent out (step S264), and the process moves to event waiting.

If the fluctuation tolerance is not "low" (NO of step S262), whether the fluctuation tolerance is "middle" or not is determined (step S265). If the fluctuation tolerance is "middle" (YES of step S265), the scan duration $T_{scn}$ (=Ts) to be requested is $T_{scn}=T_{scn\_mid}$ (step S266). In this case, the scan duration $T_{scn}$ is middle scan duration $T_{scn\_mid}$ for a communication application of middle fluctuation tolerance, the scan request is sent (step S264), and the process moves to event waiting.

If the fluctuation tolerance is not "middle" (NO of step S265), the scan duration $T_{scn}$ (=Ts) to be requested is $T_{scn}=T_{scn\_long}$ (step S267) since the fluctuation tolerance is over "middle". In this case, the scan duration $T_{scn}$ is long scan duration $T_{scn\_long}$ for the communication application of high fluctuation tolerance, the scan request is sent (step S264), and the process moves to event waiting.

According to such a procedure, upper protocol information that data to be communicated is used is monitored, and the scan duration that is requested in the scan request can be changed according to this information. Thus, the transmission and reception suspending duration adapting to the fluctuation tolerance according to the communication application can be set. Therefore, suspension of the transmitter and receiver can be executed without damaging connectivity of communication.

Figure 19:
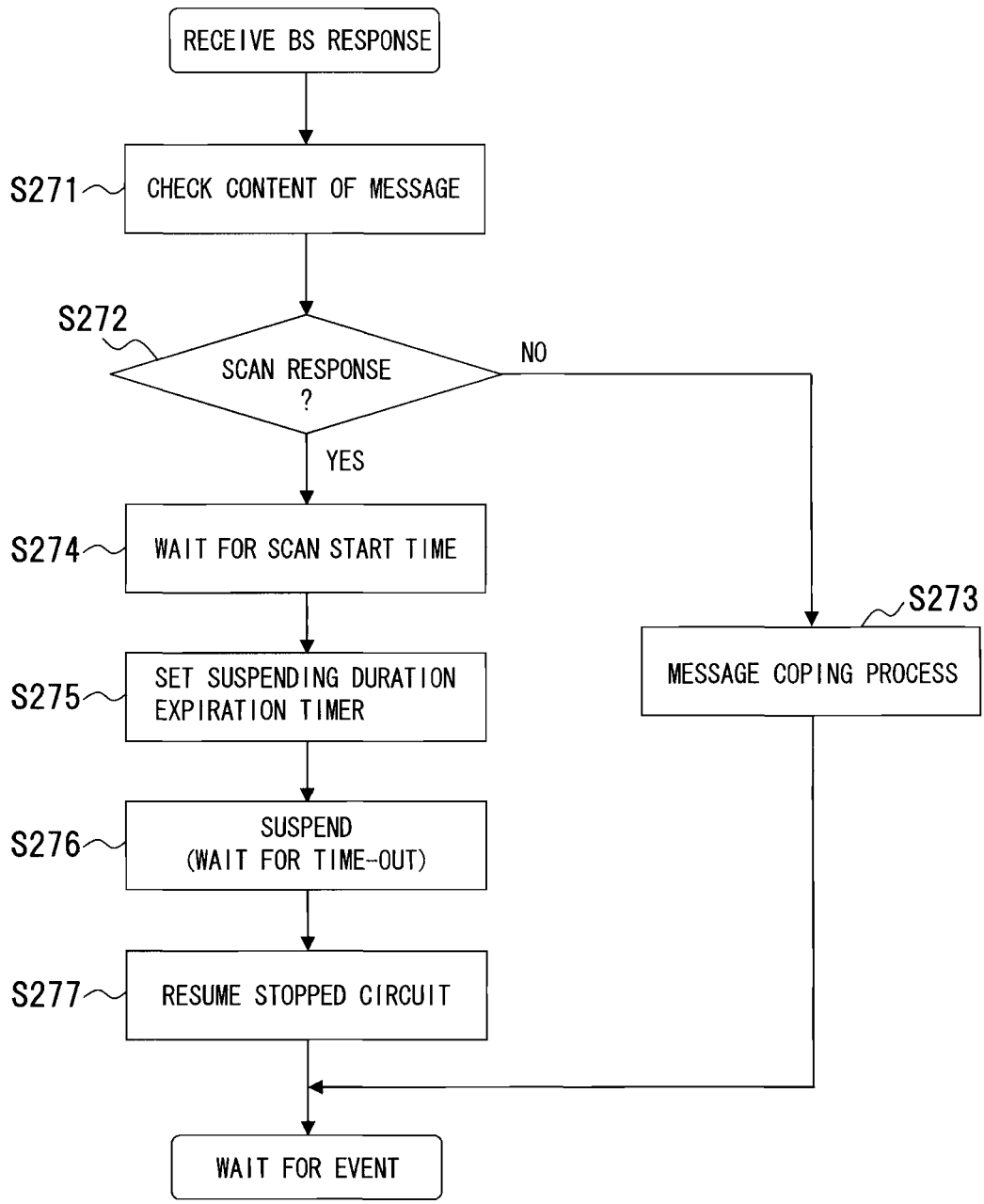
FIG. 19 is a flowchart depicting a sequence of BS response reception at an MS.

A procedure of response reception in the sequence (FIG. 13) will be described with reference to FIG. 19. FIG. 19 is a flowchart depicting an example of a sequence of response reception at an MS.

This procedure is a process of response reception at the MS 4 side executed by the above described sequence (FIG. 13). In this procedure, as depicted in FIG. 19, a response from the BS 6 is received in the MS 4 after the scan request, and the content of a message from the BS 6 is checked (step S271). It is determined whether the transmitted message is the scan response or not, or if not, whether the transmitted message includes the scan response or not (step S272). If the scan response does not exist (NO of step S272), a normal message coping process is executed (step S273), and the process moves to event waiting as a standby state.

If the scan response exists (YES of step S272), the process flows to a scan start time waiting state (step S274), setting of a suspending duration expiration timer (step S275) and suspension, for example, operation stop (time-out waiting) (step S276). After the suspending duration expiration timer expires, the operation of a circuit in the operation stop state is resumed (step S277) and the process moves to the event waiting state. Repeating these processes can execute suspending the transmitter and receiver in the scan duration. The flowchart depicted in FIG. 19 depicts the process in the case of the number of runs (Iteration)=1. The control of the present disclosure is not limited to such a process.

In this procedure, the timer may be a software timer that counts by the execution of a program in the control unit 52, or may be formed by a counter of hardware.

Figure 20:
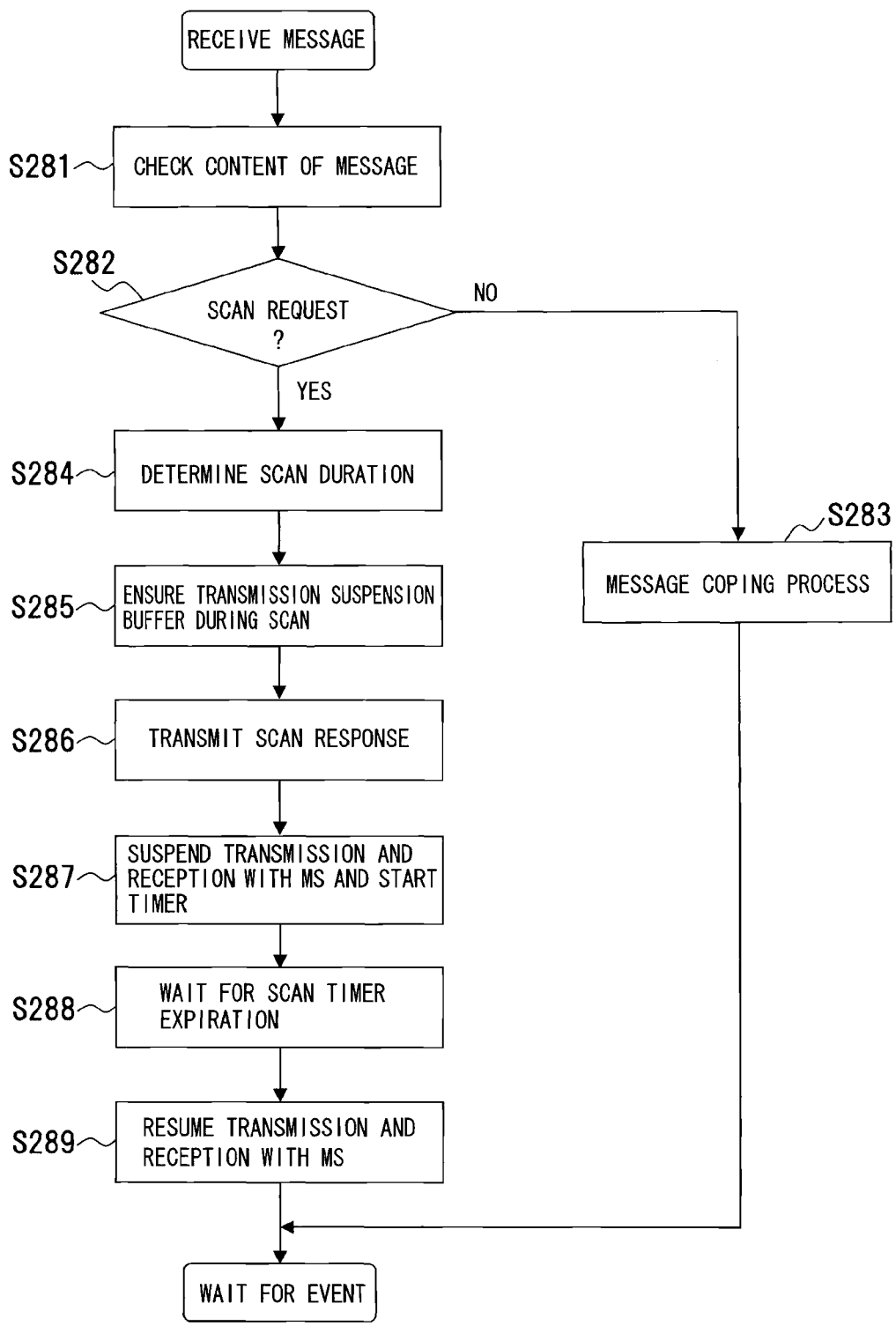
FIG. 20 is a flowchart depicting a sequence of message reception.

A procedure at the BS side in the sequence (FIG. 13) will be described with reference to FIG. 20. FIG. 20 is a flowchart depicting an example of a sequence of message reception at the BS side.

This procedure is a process of message reception at the BS 6 side which is executed by the above described sequence (FIG. 13). In this procedure, as depicted in FIG. 20, the content of a message from the MS 4 is checked in the BS 6 in response to message reception (step S281). It is determined whether the transmitted message is the scan request or not, and if not, whether the transmitted message includes the scan request or not (step S282). If the scan request does not exist (NO of step S282), the normal message coping process is executed (step S283), and the process moves to event waiting as a waiting state.

If the scan request exists (YES of step S282), the scan duration is determined (step S284), and a transmission suspension buffer is ensured during the scanning process of the MS 4 (step S285). The scan response is transmitted (step S286), transmission and reception to the MS 4 during connection are suspended and a scan timer is started to count (step S287), and the scan duration is monitored. The process flows to expiration waiting of the scan timer (step S288), and after the scan timer expires, the transmission and reception with the MS 4 are resumed (step S289), and the process moves to the event waiting state.

This process is operation that an attention is paid to the single MS 4. When an MS other than the MS 4 exists for the BS 6, that is, a plurality of MS's exist, the same process is executed for every MS.

[f] Sixth Embodiment

A sixth embodiment is a wireless communication terminal apparatus that executes transmission and reception suspension in a scanning process in communication of WiMAX (IEEE 802.16e).

Figure 21:
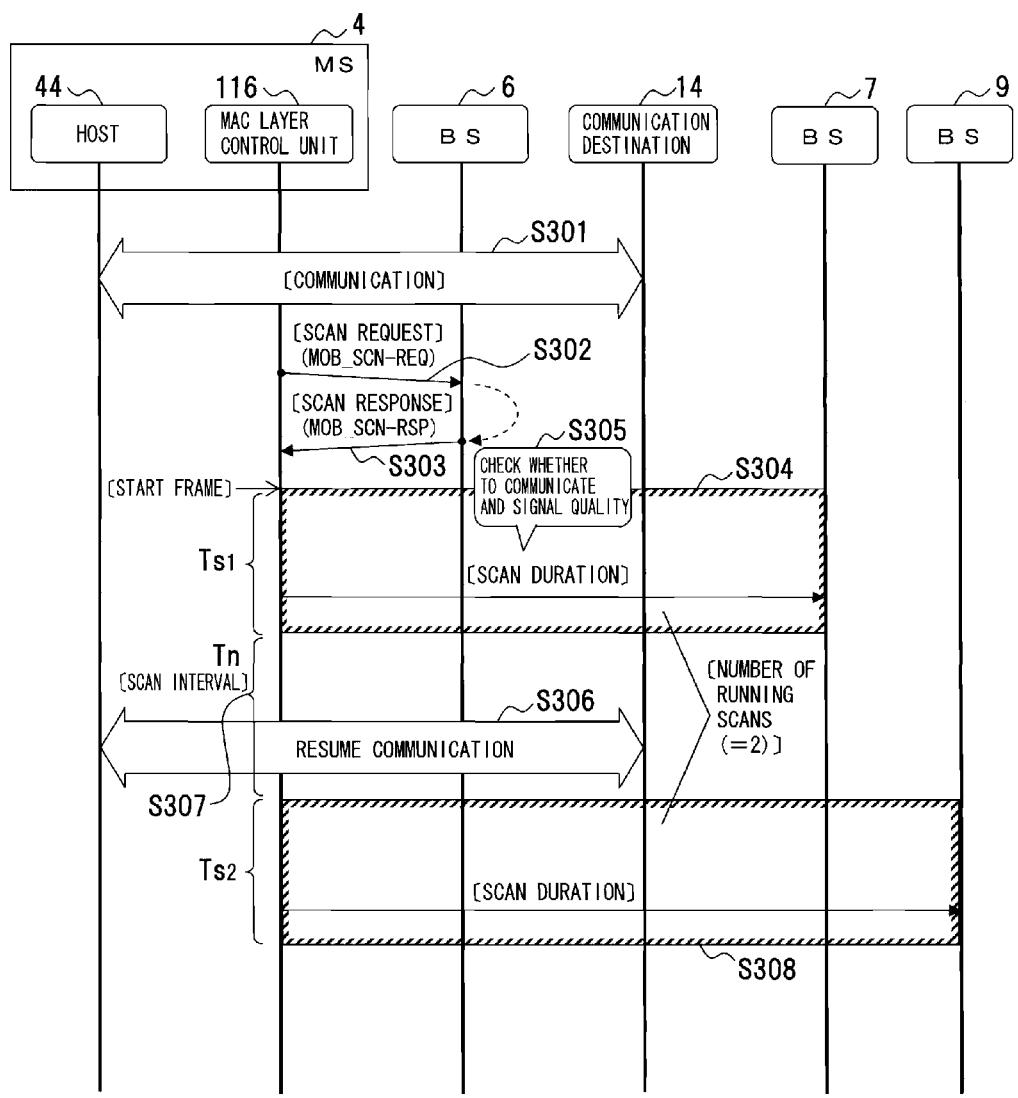
FIG. 21 depicts an example of a sequence of a wireless communication terminal apparatus, WiMAX (IEEE 802.16e) according to a sixth embodiment.

The sixth embodiment will be described with reference to FIG. 21. FIG. 21 depicts an example of a sequence of WiMAX (IEEE 802.16e) according to the sixth embodiment.

The above described hardware (FIG. 6) and functional units (FIGS. 7 and 8) are also used in this embodiment. Description thereof is thus omitted.

In the wireless system 2 (FIG. 5), a scan is used for the search for a BS, which is another candidate of a connection destination and for the check of radio wave condition when the radio wave condition deteriorates during connection. Thus, for scan duration, the time is ensured when communication is temporarily suspended and the radio wave from another BS can be received while the connection between an MS and the BS is kept. In IEEE 802.16e, this kind of a sequence mode is defined as a scan mode, and a message for a process and a processing instruction thereof is provided. When it is checked whether there is the BS, which is another candidate of a connection destination, or when a signal level/quality is checked because of the deterioration of the radio wave condition etc., a scan request (MOB_SCN-REQ) message is transmitted from the MS side. This message includes duration to be requested by a unit of a frame period of WiMAX in a parameter that indicates scan requesting duration (Duration). That is, this message includes parameters such as a scan interval (Interval) representing a scan period and the number of runs (Iteration).

By such the scan request, the BS schedules a time band for assigning the scan duration, and returns a scan response (MOB_SCN-RSP) message. This message includes parameters such as scan requesting duration, a scan interval and the number of runs as well as the scan request. In this case, the scan response from the BS for the scan request may be the same as the scan request from the MS, or the BS may return the scan response different from the scan request from the MS due to the affairs of the BS side. As a result of scheduling the scan duration, a start frame that is a parameter representing a start timing of a scan is returned to the MS.

In this sequence, as depicted in FIG. 21, the MS 4 and the communication destination 14 execute communication with each other (step S301) as described above. A scan request (MOB_SCN-REQ) is generated from the MS 4 and is transmitted to the BS 6 during communication (step S302). The BS 6 which receives this scan request sends out a scan response (MOB_SCN-RSP) as the scan instruction (step S303).

In the MS 4 that receives the scan instruction, scan duration $Ts_1$ is started by the start frame (step S304). During this scan duration $Ts_1$, whether to be communicate and signal quality are checked (step S305).

After this scan duration $Ts_1$ expires, communication is resumed (step S306). During this resumed communication, a scan interval Tn is counted since the time point of expiration of the scan duration $Ts_1$ (step S307). After this scan interval Tn, next scan duration $Ts_2$ is started (step S308), and a scanning process is executed.

In this case, the scans in the scan duration $Ts_1$ and $Ts_2$ find BS's other than the BS 6, for example, the BS 7 and a BS 9.

In this embodiment, the above described transmission and reception suspending duration can be ensured during connection by a sequence of the scan request/response. In the scan request (MOB_SCN-REQ), requesting duration is converted to the number of frames, and a Duration value is designated. In this case, a value of the number of runs (Iteration) may be defined as one to request a single scan, or a plurality of scan requests may be issued. A BS does not always permit a plurality of scan requests. For a scan interval (Interval), if the number of running scans is "1", a fixed value may be set. It is assumed that if a large value is designated for the scan interval, the BS may not accept a new scan request for the designated duration. In that case, a small interval value may be set. The BS that receives this request returns a scan response (MOB_SCN-RSP) with an actually accepted value to the received scan request. In the scan duration since the scan start timing designated by this message, an MS can temporarily suspend the transmitter and receiver between the BS during connection. As a result, the continuation of overheating can be prevented and the escape from the overheating can be achieved.

Figure 22:
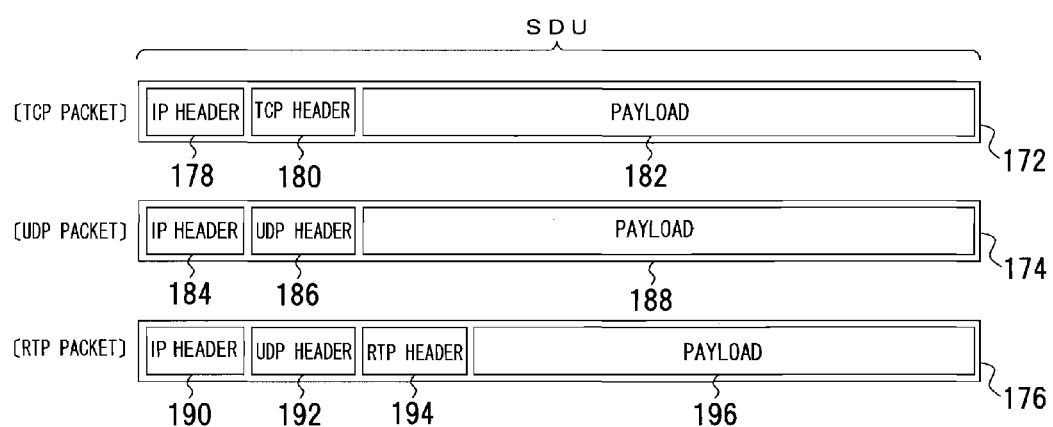
FIG. 22 depicts an example of a packet format.
Figure 23:
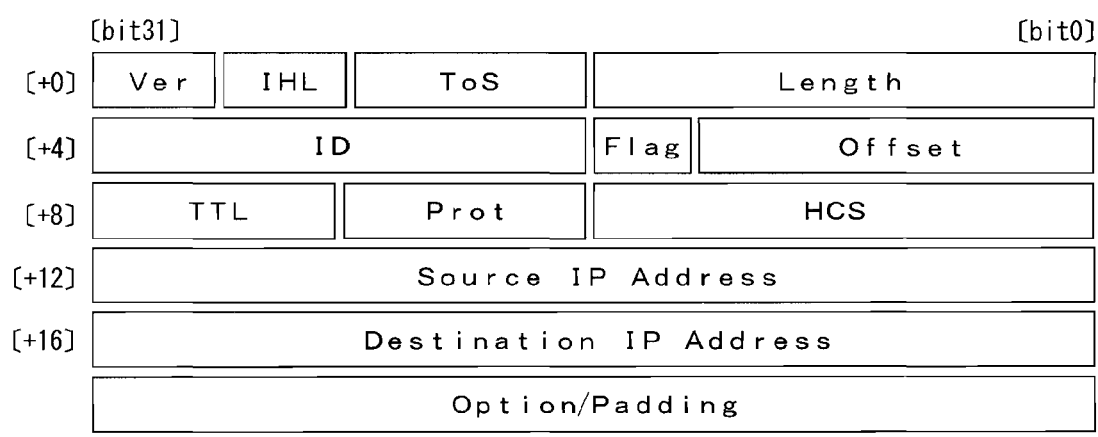
FIG. 23 depicts an example of a header structure.

Identification of packet information will be described with reference to FIGS. 22 and 23. FIG. 22 depicts an example of a packet format, and FIG. 23 depicts an example of a header structure.

As described above, a packet format (FIG. 22) and a header structure (FIG. 23) may be used for the identification of a type of data of packet information.

In this packet format, as depicted in FIG. 22, there exist a TCP packet 172, a UDP packet 174 and a RTP packet 176 as an SDU (Service Data Unit).

The TCP packet 172 includes an IP header 178, a TCP header 180 and a payload 182. The UDP packet 174 includes an IP header 184, a UDP header 186 and a payload 188. The RTP packet 176 includes an IP header 190, a UDP header 192, a RTP header 194 and a payload 196.

The IP headers 178, 184 and 190 include, as depicted in FIG. 23, Ver, IHL (Internet Header Length), ToS (Type of Service), Length, ID (Identification), Flag, Offset (Fragment Offset), TTL (Time to Live), Prot (Protocol), HCS (Header Checksum), Source IP Address, Destination IP Address and Option/Padding.

By using such a packet format and header structure, packet information can be known easily. Also, proper scan duration can be used according to a type of data or a type of an application detected during connection.

Figure 24:
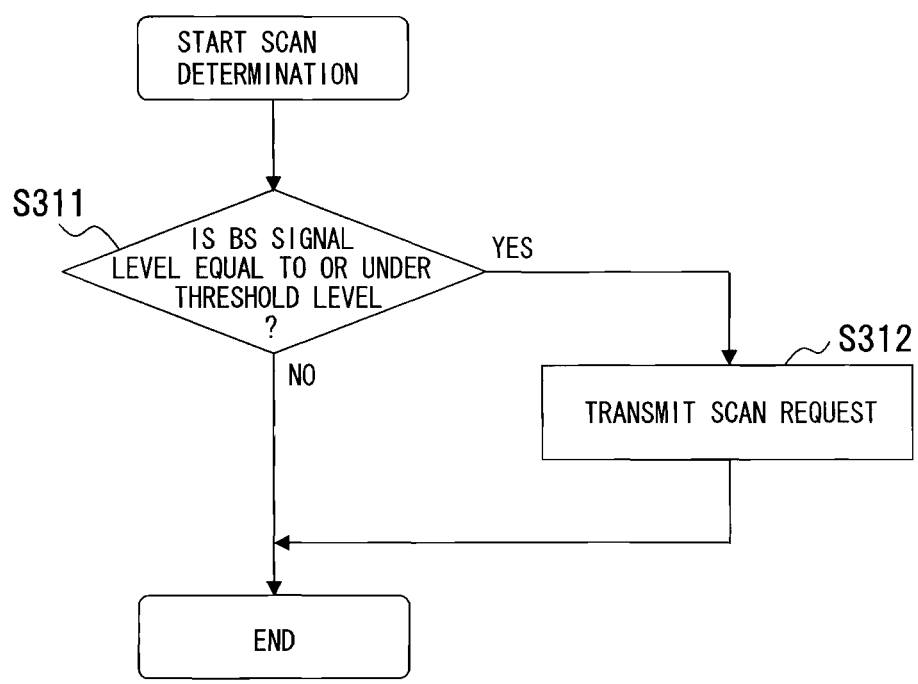
FIG. 24 is a flowchart depicting an example of a sequence of a start of scan determination.

A procedure of a start of scan determination in the sequence (FIG. 21) will be described with reference to FIG. 24. FIG. 24 is a flowchart depicting an example of a procedure of a start of scan determination.

In this procedure, it is determined whether a BS signal level is equal to or under a threshold level or not based on the start of scan determination (step S311). If the BS signal level is over the threshold level (NO of step S311), this process is ended. If the BS signal level is equal to or under the threshold level (YES of step S311), this triggers the transmission of the scan request to the BS (step S312).

Figure 25:
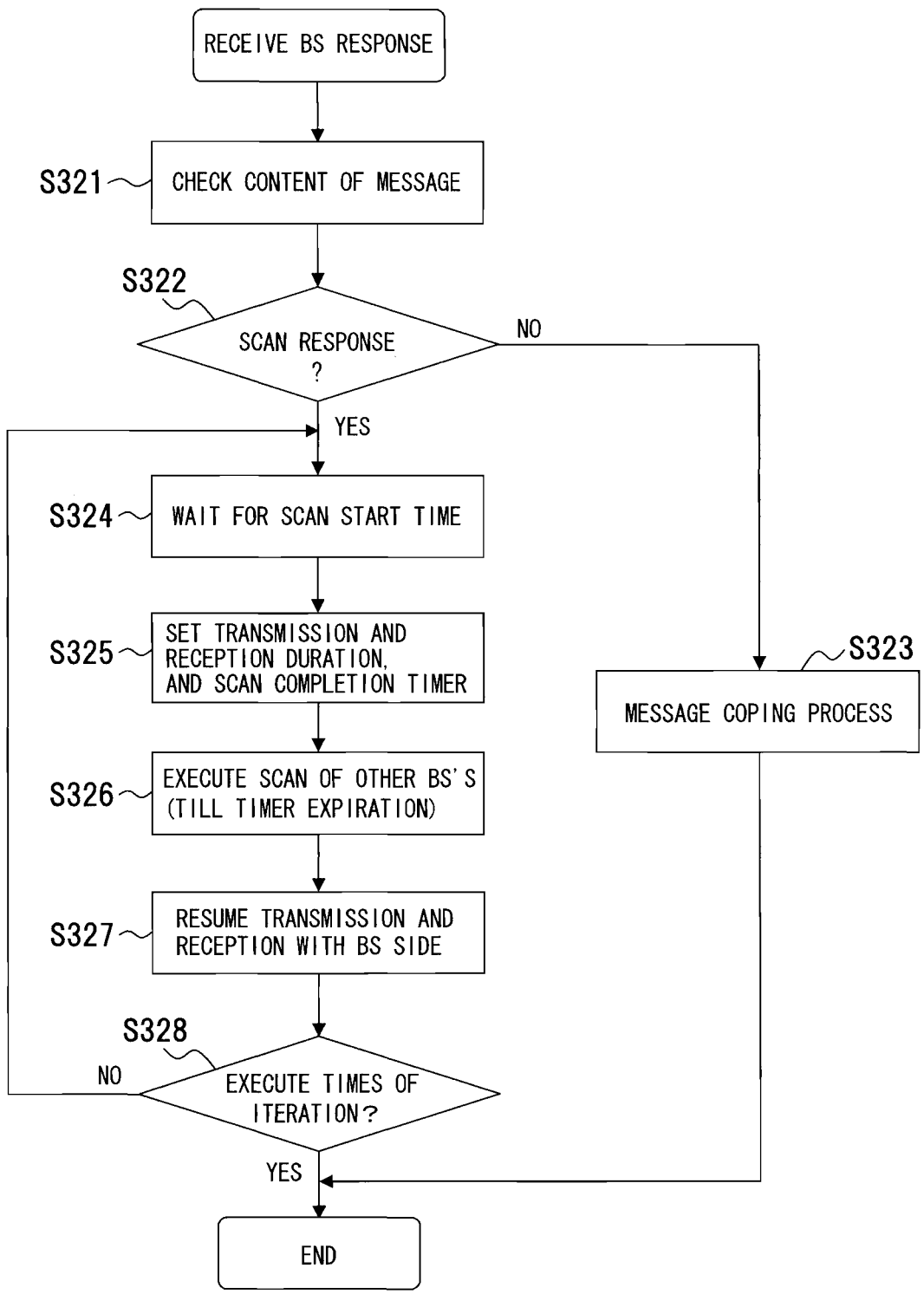
FIG. 25 is a flowchart depicting an example of a sequence of BS response reception at an MS.

A procedure of BS response reception in the sequence (FIG. 21) will be described with reference to FIG. 25. FIG. 25 is a flowchart depicting an example of a procedure of BS response reception at the MS side.

In this procedure, as depicted in FIG. 25, after the scan request, the response from the BS 6 is received at the MS 4 and the content of a message from the MS 6 is checked (step S321). It is determined whether the transmitted message is the scan response or not, and if not, whether the transmitted message includes the scan response or not (step S322). If the scan response does not exist (NO of step S322), the normal message coping process is executed (step S323), and this process is ended.

If the transmitted message is the scan response (YES of step S322), the process flows to scan start time waiting (step S324), setting of suspension of the transmission and reception and of scan completion timer (suspending duration expiration timer) (step S325) and scan execution of other BS's (step S326). After the scan completion timer is time-out, the transmission and reception with the BS 6 is resumed (step S327), the above process is executed certain times according to the number of runs (step S328), and the process is ended.

In this embodiment, a scan is executed by providing scan interval for a scanning process, and thus the continuation of the overheating of the MS 4 can be prevented.

[g] Seventh Embodiment

A seventh embodiment is an example of a structure of suspension of the transmitter and receiver when TCP is used.

Figure 26:
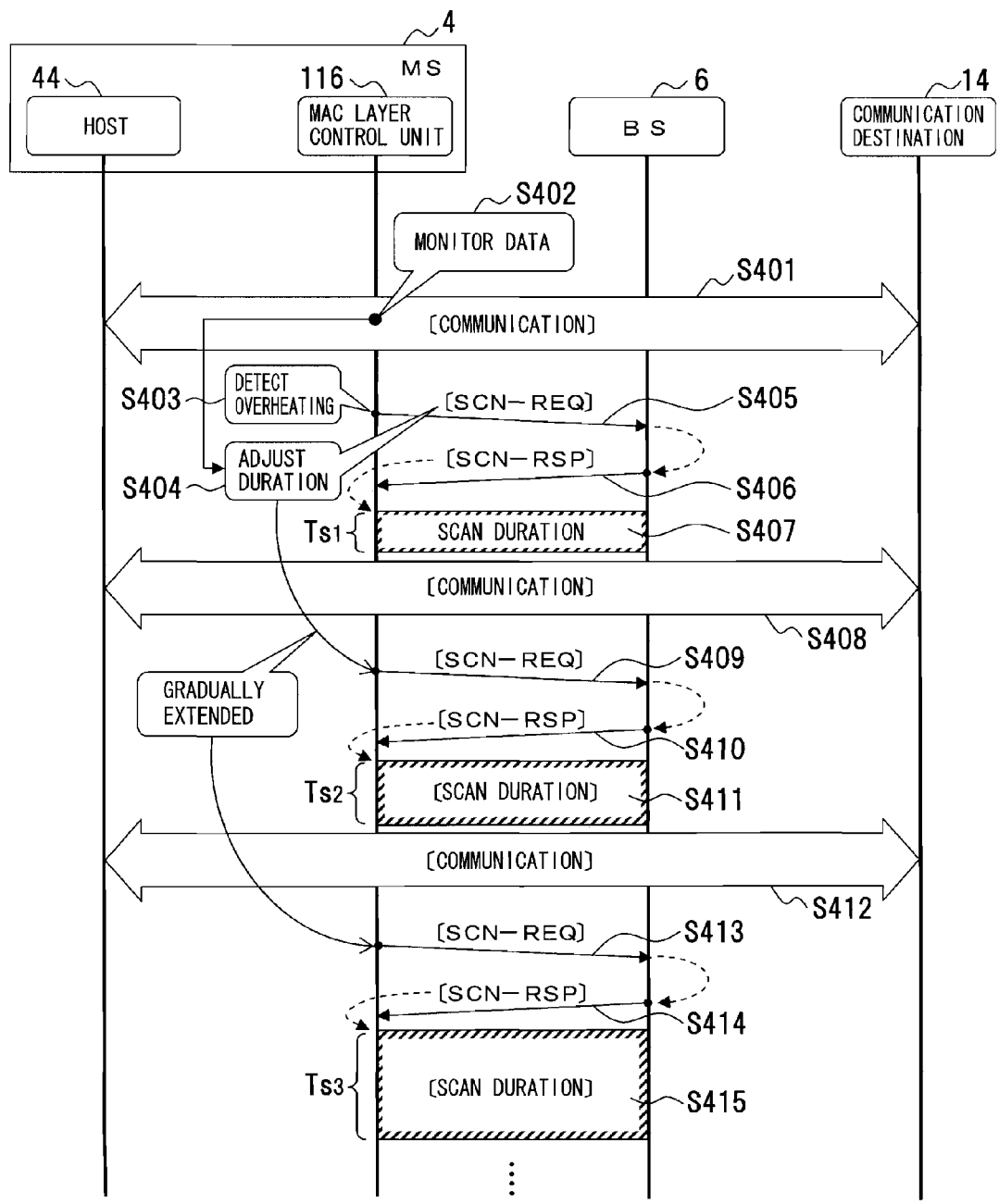
FIG. 26 depicts an example of a sequence of a wireless communication terminal apparatus when TCP is used according to a seventh embodiment.

The seventh embodiment will be described with reference to FIG. 26. FIG. 26 depicts an example of a sequence when TCP is used.

This embodiment is the case of using TCP/IP as an upper protocol for WiMAX. That is, when communication is determined to use TCP as an upper layer by the above described process, scan duration is gradually extended. As to a process of extending the scan duration, when a BS instructs shorter duration than the scan duration to be requested, the upper limit of scan tolerance duration can be known. The known value may be the upper limit of the extension to stop the scan duration. At a time point when the prescribed upper limit is reached, the scan duration may be requested using this upper limit in processing after this time point.

In this sequence, as depicted in FIG. 26, when the MS 4 and the communication destination 14 communicate with each other (step S401), data is monitored (step S402). A type of communication is determined by this data monitoring.

Overheating is detected by the temperature detected by the temperature detection unit 56 in the MS 4 (step S403), and the scan duration according to the type of communication is adjusted (step S404). Based on the detection of overheating, a scan request (SCN-REQ) is generated. For the scan duration to be designated, scan duration $Ts_1$ is set which is adjusted based on the above described adjustment of the scan duration. The scan request is transmitted to the BS 6 during communication (step S405). In this case, the scan duration is the duration which is adjusted according to the type of communication as described above, and the suspending duration of the transmitter and receiver is set in the scan request.

A scan response (SCN-RSP) is issued from the BS 6 that receives the scan request (step S406). The MS 4 receives a scan instruction by this scan response, and the process moves in the scan duration $Ts_1$ (step S407).

It is described above that in the scan duration, the transmitter and receiver are suspended. When the scan duration $Ts_1$ expires, communication is resumed (step S408), a scan request (SCN-REQ) is generated again based on the detection of overheating, and adjusted scan duration $Ts_2$ ($>Ts_1$) is set. The scan request is transmitted to the BS 6 during communication (step S409).

The scan response (SCN-RSP) is issued from the BS 6 that receives the scan request (step S410). The MS 4 receives the scan instruction by this scan response, and the process moves in the scan duration $Ts_2$ (step S411).

When the scan duration Ts2 expires, communication is resumed (step S412), the scan request (SCN-REQ) is generated again based on the detection of overheating, and adjusted scan duration $Ts_3$ ($>Ts_2$) is set. The scan request is transmitted to the BS 6 during communication (step S413).

The scan response (SCN-RSP) is issued from the BS 6 that receives the scan request (step S414). The MS 4 receives the scan instruction by this scan response, and the process moves in the scan duration $Ts_3$ (step S415).

Like the above, the scan duration Ts is gradually extended to $Ts_1 < Ts_2 < Ts_3$ step by step, and a scan is executed in these scan durations. Moreover, the transmitter and receiver are suspended within the transmission and reception suspending duration that is set in the scan duration Ts.

According to such a procedure, since a plurality of scan durations are set and the scan duration is extended step by step, time-out in the scan duration can be prevented and communication can be continued.

Figure 27:
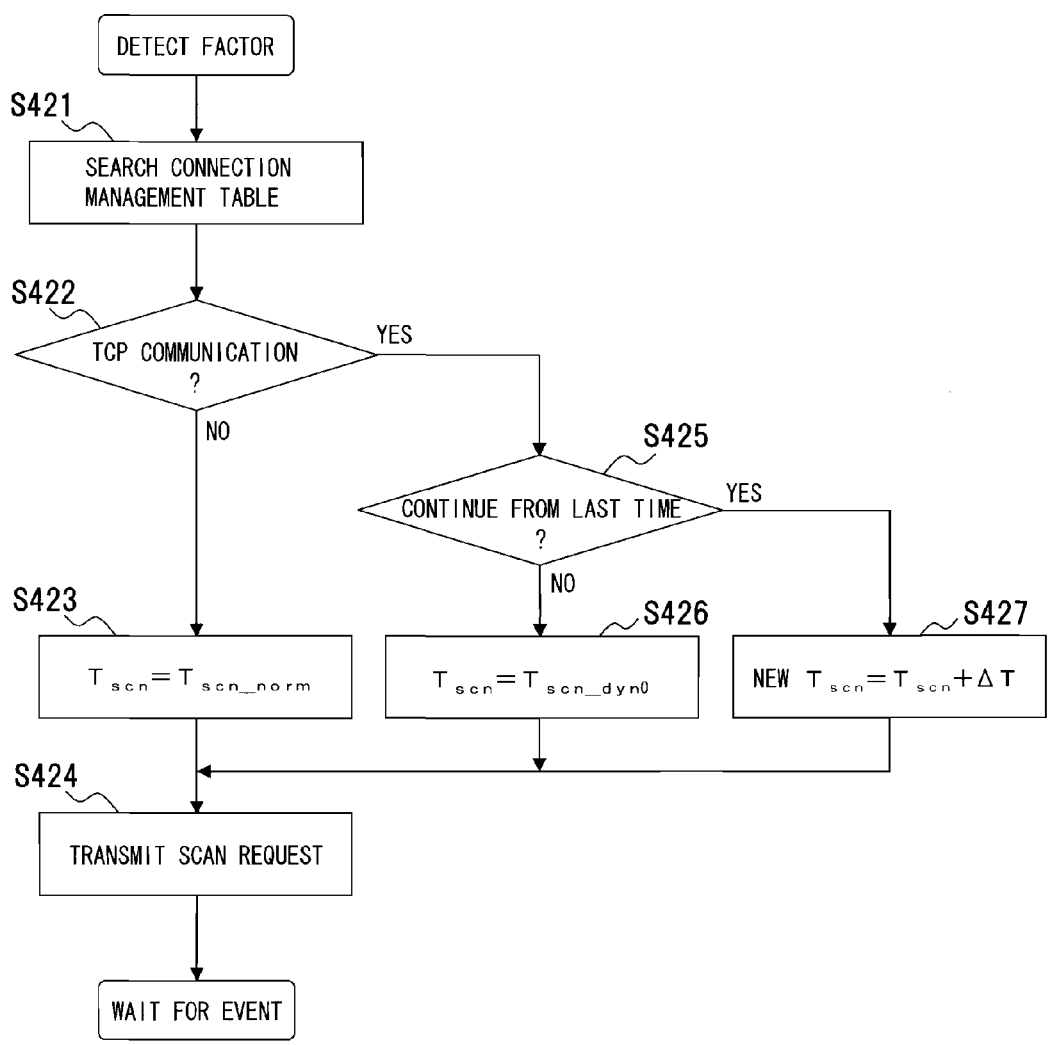
FIG. 27 is a flowchart depicting an example of a sequence of factor detection.

Factor detection of the sequence (FIG. 26) will be described with reference to FIG. 27. FIG. 27 is a flowchart depicting an example of a sequence of factor detection.

This procedure is a process of detecting a factor in the sequence (FIG. 26). As depicted in FIG. 27, the connection management table 136 (FIG. 14) is searched (step S421). Whether to be TCP communication is determined from this connection management table 136 (step S422). In the case of not TCP communication (NO of step S422), $T_{scn}=T_{scn\_norm}$ is set for the scan duration $T_{scn}$ (step S423). $T_{scn\_norm}$ is the scan duration when TCP communication is not performed. After $T_{scn}=T_{scn\_norm}$ is set for this scan duration $T_{scn}$, the scan request is transmitted (step S424), and the process moves to an event waiting state.

In the case of TCP communication (YES of step S422), it is determined whether the TCP communication continues from the last time (step S425). If the TCP communication does not continue from the last time (NO of step S425), $T_{scn}=T_{scn\_dyn0}$ is set for the scan duration $T_{scn}$ (step S426). This $T_{scn\_dyn0}$ is an initial value of the scan duration when the TCP communication is performed. After $T_{scn}=T_{scn\_dyn0}$ is set for this scan duration $T_{scn}$, the scan request is transmitted (step S424), and the process moves to the event waiting state.

If the TCP continuation continues from the last time (YES of step S425), new $T_{scn}=T_{scn}+\Delta T$ is set for the scan duration $T_{scn}$ (step S427). ΔT is the extension of scan requesting duration, and for example, $\Delta T=T_{scn\_dyn0}$. After this new $T_{scn}$ is set, the scan request is transmitted (step S424), and the process moves to the event waiting state.

Figure 28:
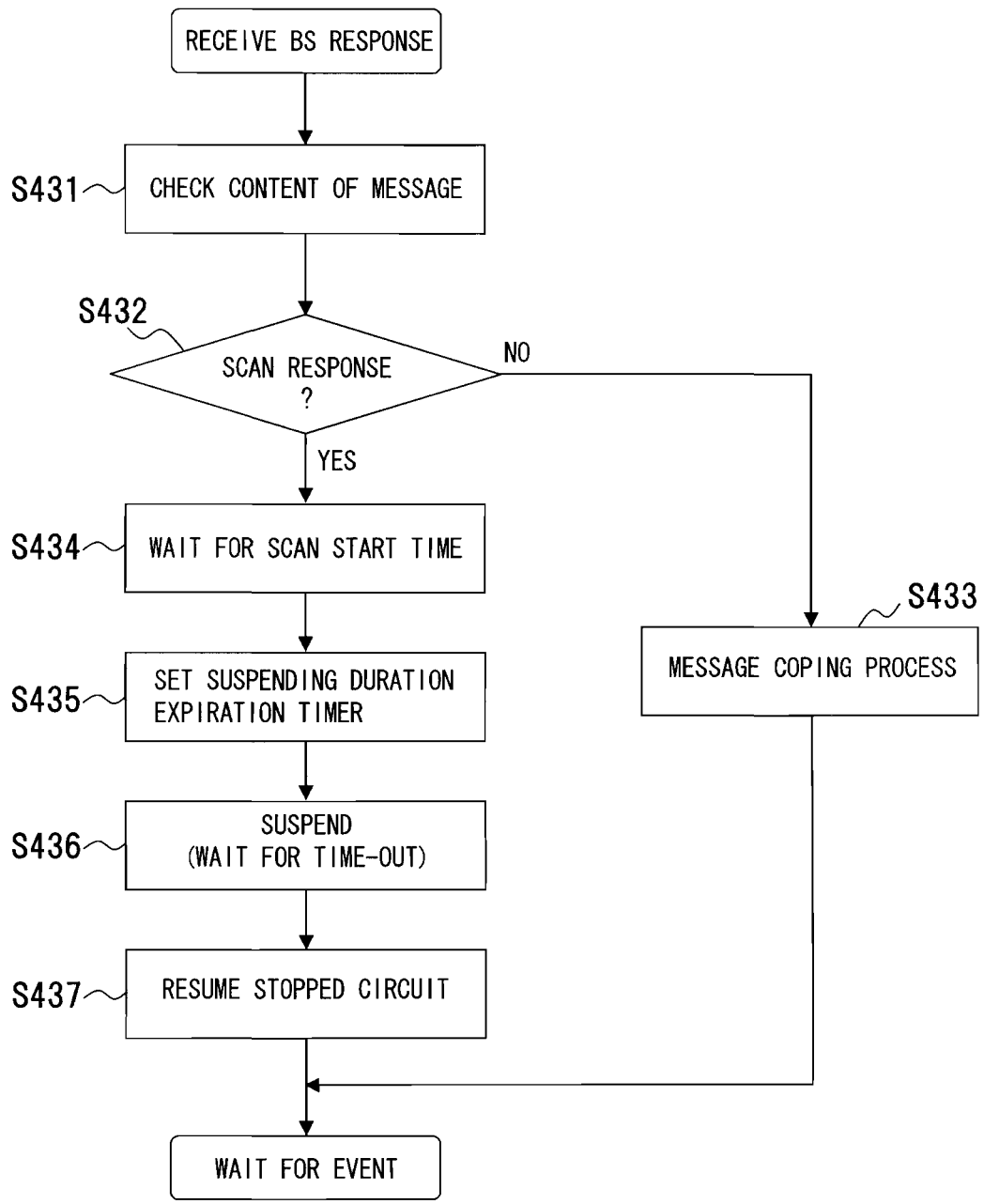
FIG. 28 is a flowchart depicting an example of a sequence of BS response reception at an MS.

A procedure of BS response reception of the sequence (FIG. 26) will be described with reference to FIG. 28. FIG. 28 is a flowchart depicting an example of a procedure of BS response reception at an MS side.

In this procedure, as depicted in FIG. 28, after the scan request, the response from the BS 6 is received in the MS 4 and the content of a message from the BS 6 is checked (step S431). It is determined whether the transmitted message is the scan response or not, or if not, the transmitted message includes the scan response or not (step S432). If the scan response does not exist (NO of step S432), a normal message coping process is executed (step S433), and this process moves to an event waiting state to be ended.

If the transmitted message is the scan response (YES of step S432), the process flows to a scan start time waiting (step S434), setting of the transmitter and receiver suspension, and of a scan completion timer (suspending duration expiration timer) (step S435) and suspension, for example operation stop (time-out waiting) (step S436). After the scan completion timer is time-out, the operation of a circuit part in the operation stop state is resumed (step S437), and the process moves in the event waiting state. This sequence is an example of the case of the number of runs=1.

Figure 29:
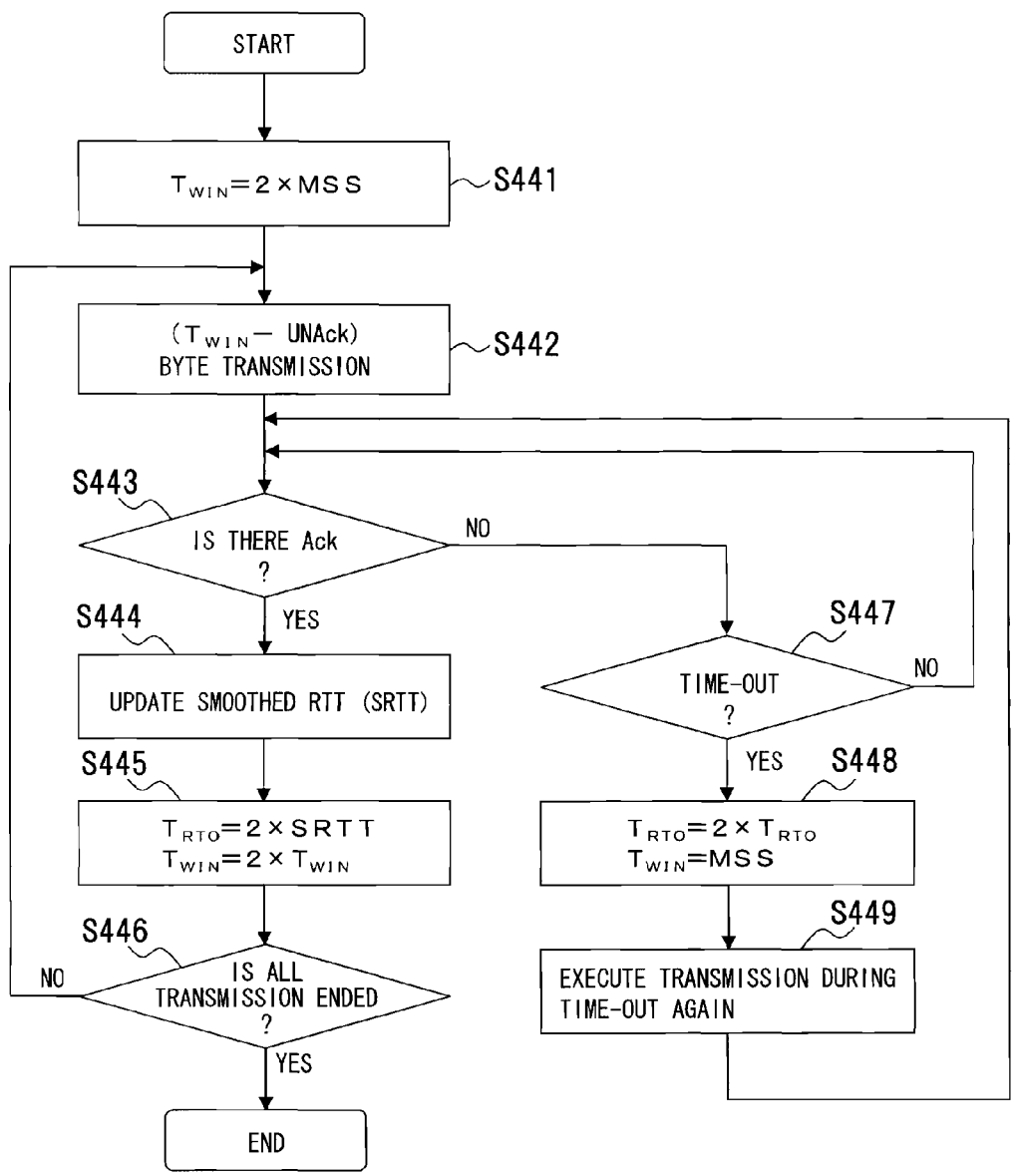
FIG. 29 is a flowchart depicting an example of a sequence of a congestion window size and response time-out.

A congestion window size of TCP and a process of response time-out will be described with reference to FIG. 29. FIG. 29 is a flowchart depicting an example of a sequence of a congestion window size of TCP and response time-out.

In this sequence, the congestion window (transmission window) size $T_{WIN}$ is set in $T_{WIN}=2\times MSS$ (step S441), and $(T_{WIN}-unAck)$ byte transmission is set (step S442). MSS is the size of the maximum segment, which is the maximum value of the amount of data that can be transmitted by one packet. $T_{WIN}$ is a congestion window (transmission window) size.

Whether there is acknowledgment Ack is determined (step S443). If there is Ack (YES of step S443), smoothed RTT (SRTT) is updated (step S444), and $T_{RTO}=2\times SRTT$ and $T_{WIN}=2\times T_{WIN}$ are set (step S445). Here, the smoothed RTT (SRTT) is smoothed round trip time and $T_{RTO}$ is an Ack time-out time.

Whether all transmission is ended is determined (step S446). If all the transmission is not ended (NO of step S446), steps S442 to S446 are repeated. If all the transmission is ended (YES of step S446), this process is ended.

If there is not Ack (NO of step S443), whether to be time-out is determined (step S447). In the case of not time-out (NO of step S447), the process returns to step S443. In the case of time-out (YES of step S447), $T_{RTO}=2\times T_{RTO}$ and $T_{WIN}=MSS$ are set (step S448), the transmission during the time-out is executed again (step S449), and the process returns to step S443.

Figure 30:
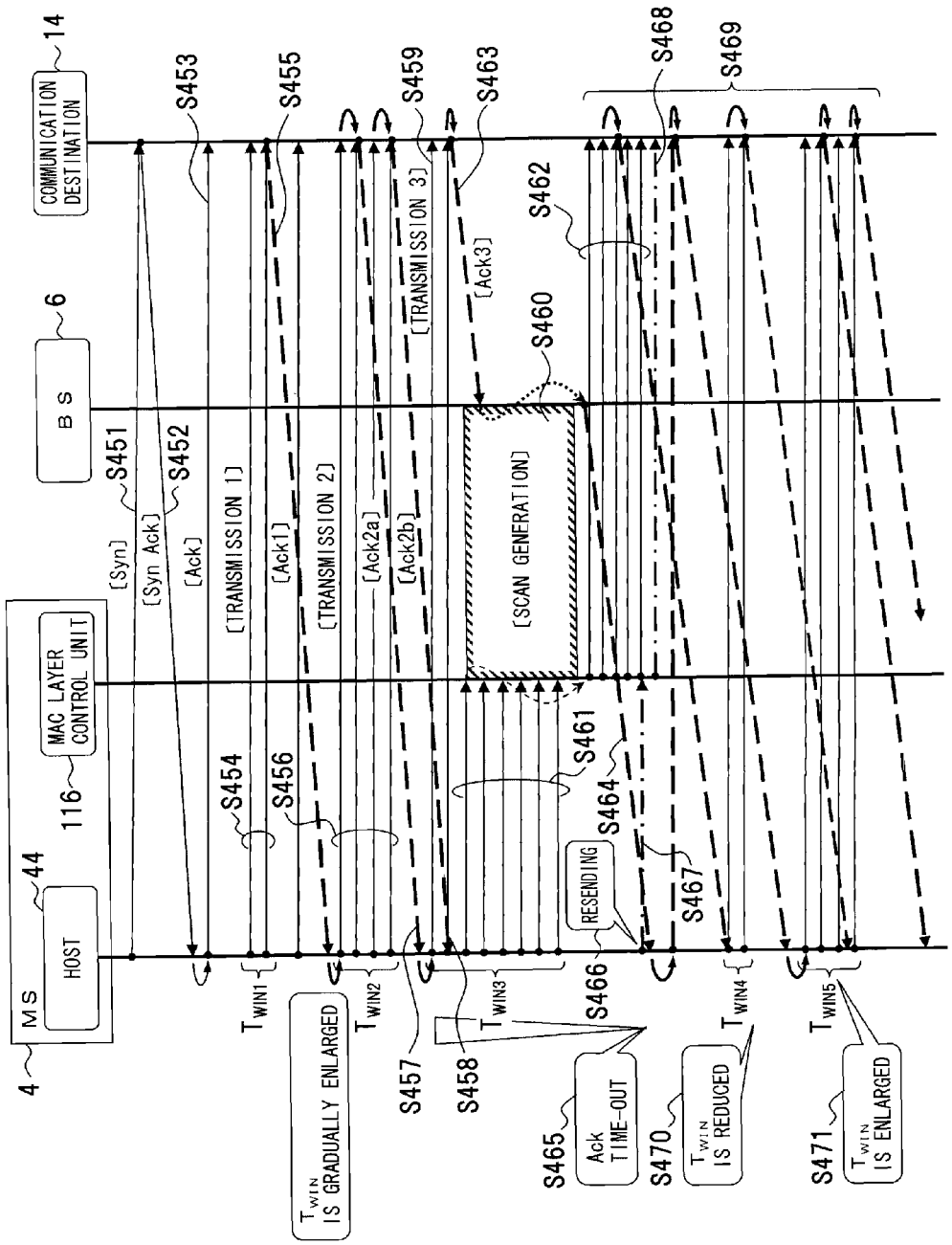
FIG. 30 depicts a sequence in the case of not corresponding to the sequence in FIG. 26.
Figure 31:
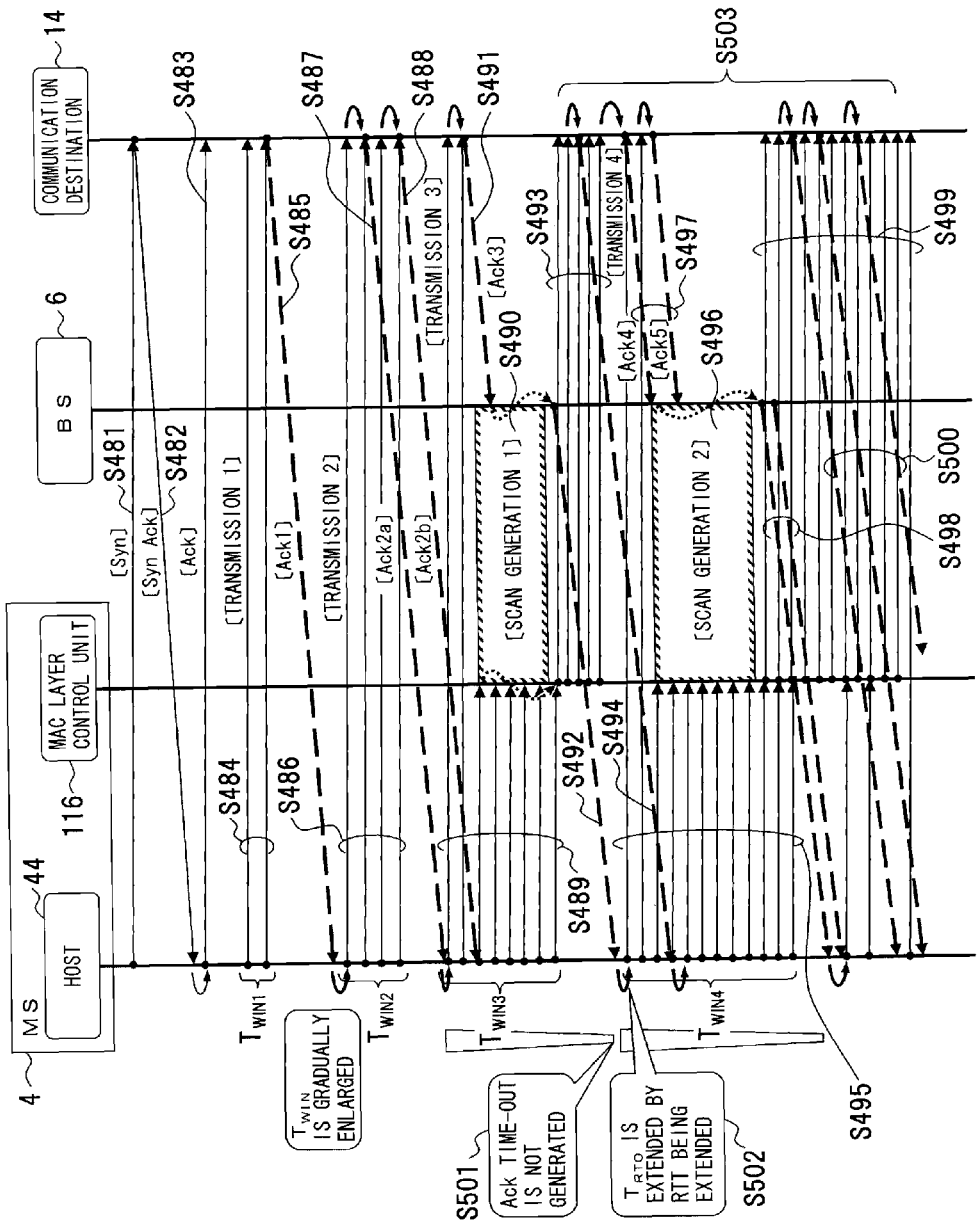
FIG. 31 depicts a sequence in the case of corresponding to the sequence in FIG. 26.

A sequence in the cases of not corresponding and of corresponding to the sequence (FIG. 26) will be described with reference to FIGS. 30 and 31. FIG. 30 depicts a sequence in the case of not corresponding to the sequence (FIG. 26) and FIG. 31 depicts a sequence in the case of corresponding to the sequence (FIG. 26).

Each sequence is a procedure of starting up TCP communication from the host 44 and transferring data from the host 44 to the communication destination 14.

(1) Process in not Corresponding to Sequence (FIG. 26) (FIG. 30)

A connection request (Syn) is generated from the host 44 and sent out to the communication destination 14 (step S451). In response to this connection request, a request response (SynAck) is issued from the communication destination 14 (step S452). An acknowledgment (Ack) is issued from the host 44 that receives this request response and transmitted to the communication destination 14 (step S453).

After connection is established through such a procedure, data is transmitted from the host 44 to the communication destination 14 as transmission 1 (step S454), and an acknowledgment Ack 1 is issued from the communication destination 14 (step S455). After this Ack 1 is received, data is transmitted from the host 44 to the communication destination 14 as transmission 2 (step S456). Ack 2a and Ack 2b are issued by turns as the acknowledgments of twice for the transmission 2 from the communication destination 14 that receives this data (steps S457 and S458).

In this case, after the host 44 receives the Ack 2a, data is transmitted to the communication destination 14 as transmission 3 (step S459). During a time of the transmission 3, scan is generated (step S460).

If the transmission window size of the transmission 1 is $T_{WIN1}$, the transmission window size of the transmission 2 is $T_{WIN2}$ and the transmission window size of the transmission 3 is $T_{WIN3}$, the transmission window size $T_{WIN}$ is $T_{WIN1}<T_{WIN2}<T_{WIN3}$, that is, gradually enlarges. In this case, $T_{WIN3}$ is set shorter than the Ack time-out time $T_{RTO}$.

In this scan duration, a scanning process blocks data transfer. When the scanning process is started, data sent out from the host 44 is retained in the MAC layer control unit 116 (step S461). After the scan duration expires, the MAC layer control unit 116 sends out data according to the transmission 3 to the communication destination 14 (step S462).

Correspondingly to the arrival of data of the transmission 3 during the scan duration, an acknowledgment Ack 3 is issued from the communication destination 14 (step S463). This Ack 3 is retained in the BS 6, and after the scan duration expires, the Ack 3 reaches the host 44 from the BS (step S464).

Ack time-out is generated in the host 44 that receives this Ack 3 (step S465), and resending is generated by this Ack time-out (step S466). This resending is informed of to the MAC layer control unit 116 (step S467) to reach the communication destination 14 (step S468).

Through such data transfer, data is transmitted from the host 44 to the communication destination 14, and an acknowledgment reaches the host 44. In a process after the generation of a scan (step S469), resending is performed and accompanying the resending, the transmission window size $T_{WIN}$ is reduced to $T_{WIN4}$ (step S470), and after that, enlarged to a transmission window size $T_{WIN5}$ (step S471). That is, in the process after the generation of a scan (step S469), the communication rate lowers more than the suspending duration of the transmitter and receiver due to the scan generation. In this case, the communication rate means the substantial amount of the data transfer.

(2) Process in Corresponding to Sequence (FIG. 26) (FIG. 31)

The procedure is executed as described above such as a connection request (Syn) of the host 44 and sending out the connection request (Syn) to the communication destination 14 (step S481), a request response (SynAck) from the communication destination 14 (step S482) and an acknowledgment (Ack) of the host 44 (step S483).

After connection is established through such a procedure, data transmission 1 of the host 44 (step S484), an acknowledgment Ack 1 from the communication destination 14 (step S485), data transmission 2 of the host 44 (step S486), and sending out of the Ack 2a and Ack 2b as acknowledgments of twice for the data transmission 2 (steps S487 and S488) are executed.

After receiving the Ack 2a, the host 44 executes data transmission 3 to the communication destination 14 (step S489). During a time of this data transmission 3, partial data in the data transmission 3 reaches the communication destination 14 by scan generation 1 (step S490), and an acknowledgment Ack 3 issued from the communication destination 14 is retained by the BS 6 (step S491). This acknowledgment Ack 3 is transmitted after the scan duration to reach the host 44 (step S492).

Data retained in the MAC layer control unit 116 in the scan generation 1 (step S490) is transmitted to the communication destination 14 after the scan duration (step S493). The acknowledgment thereof. Ack 3 reaches the host 44 from the communication destination 14 (step S494).

The host 44 that receives the acknowledgment Ack 3 starts data transmission 4 (step S495). During a time of this data transmission 4, partial data in the data transmission 4 reaches the communication destination 14 by scan generation 2 (step S496), and acknowledgments Ack 4 and Ack 5 issued from the communication destination 14 are retained by the BS 6 (step S497). These acknowledgments Ack 4 and Ack 5 are transmitted after the scan duration to reach the host 44 (step S498).

Data retained in the MAC layer control unit 116 by the scan generation 2 is transmitted to the communication destination 14 after the scan duration (step S499). An acknowledgment thereof. Ack is issued from the communication destination 14 to reach the host 44 (step S500). The processes are repeated such as the scan generation, the data transmission and the acknowledgment.

As to the transmission window sizes of $T_{WIN1}$, $T_{WIN2}$, $T_{WIN3}$, $T_{WIN4}$ ... of the transmissions 1, 2, 3 ..., the window size $T_{WIN}$ is $T_{WIN1} < T_{WIN2} < T_{WIN3} < T_{WIN4}$ ..., that is, gradually enlarging.

In the transmission window size $T_{WIN3}$, Ack time-out is not generated (step S501). In the transmission window size $T_{WIN4}$, the Ack time-out time $T_{RTO}$ extends by the extension of RTT (step S502).

Therefore, in a process after the scan generation (step S503), the communication rate is suppressed so as to match the transmission and reception suspending duration by the scan generation.

[h] Eighth Embodiment

An eighth embodiment is another example of a structure of suspension of a transmitter and receiver when TCP is used.

Figure 32:
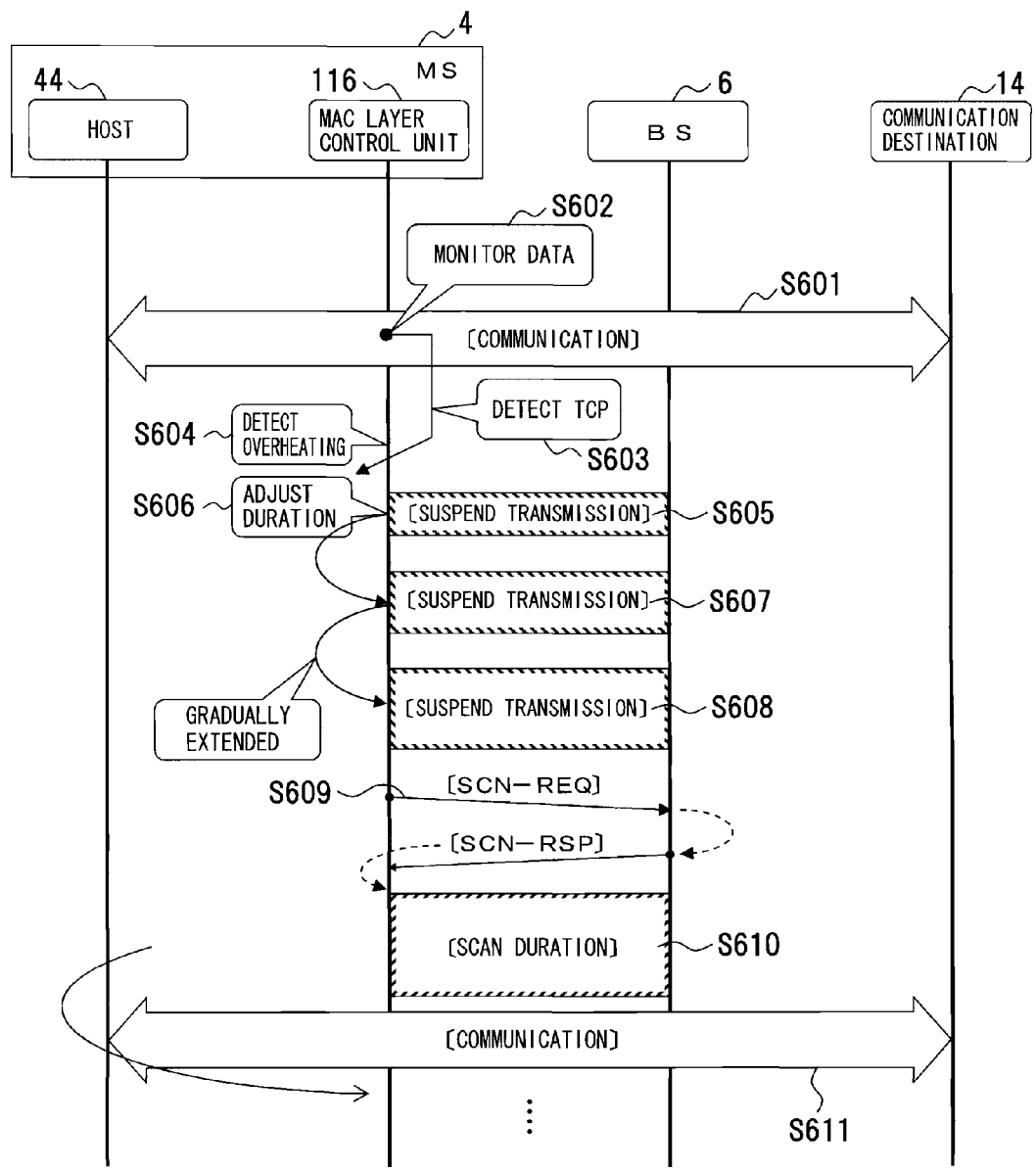
FIG. 32 depicts an example of a sequence of a wireless communication terminal apparatus when TCP is used according to an eighth embodiment.

The eighth embodiment will be described with reference to FIG. 32. FIG. 32 depicts an example of a sequence when TCP is used.

When TCP/IP is used for an upper protocol for WiMAX, duration of suspending a transmitter (transmission suspending) may be provided in advance of a scan request and by gradually extending this suspending duration, RTT detected by TCP/IP may be extended to extend an Ack time-out time instead of gradually extending the scan duration by the above procedure (FIG. 26) if communication uses TCP as an upper layer. At a time point when the suspending duration is extended to the scan duration or an appropriate time, a scan request is issued. In WiMAX, when a service flow that makes user data flow makes its best effort, a Mac header of encoding a band request (BW-REQ) is transmitted in order to assign a transmission slot for transmission to a BS side. When there is no assignment of the transmission slot for the MAC header, assignment is performed using BW Ranging, which is one of CDMA (code division multiple access) Ranging. Suspending BW-REQ transmission for desired time can implement suspension of the transmitter easily. The suspension of the transmitter is possible to control duration more closely than sudden ensuring of the transmission and reception suspending duration by a scan. The communication rate is suppressed so as to match the transmission and reception suspending duration due to the scan generation by extending Ack time-out time till the scan generation.

If the transmitter is suspended, data transmission is stopped. Even if transmission is performed, only feedback information for the BS of little information (signal quality measurement value etc.) is transmitted. Thus, the transmitter takes a slight short time, which is effective in moderating an overheating state.

In a sequence at this time, as depicted in FIG. 32, communication between the host 44 and the communication destination 14 is established (step S601). During this communication, data is monitored at the Mac layer control unit 116 (step S602).

In this case, TCP is detected from data (step S603) because TCP communication is used. Overheating is detected in the MAC layer control unit (step S604), and transmission is suspended according to this detection of overheating (step S605). In this transmission suspension, duration is adjusted (step S606), and for this duration adjustment, a detected result of the TCP detection is referred and transmission and reception suspending duration according to TCP is set. After the transmitter suspension (step S605), transmission is intermittently stopped (steps S607 and S608), thus the transmission and reception suspending duration is gradually extended step by step.

After the transmitter suspension (step S608), a scan request (SCN-REQ) based on the detection of overheating (step S604) is generated, and transmitted to the BS 6 (step S609). A scan response (SCN-RSP) to this scan request (SCN-REQ) is transmitted from the BS 6 to the MS 4. In response to this scan response, scan duration is set and a scan is executed (step S610).

It is described above that by this scan, the transmitter and receiver are suspended in the transmission and reception suspending duration that is set in the scan duration. After the scan duration expires, communication is resumed (step S611).

Figure 33:
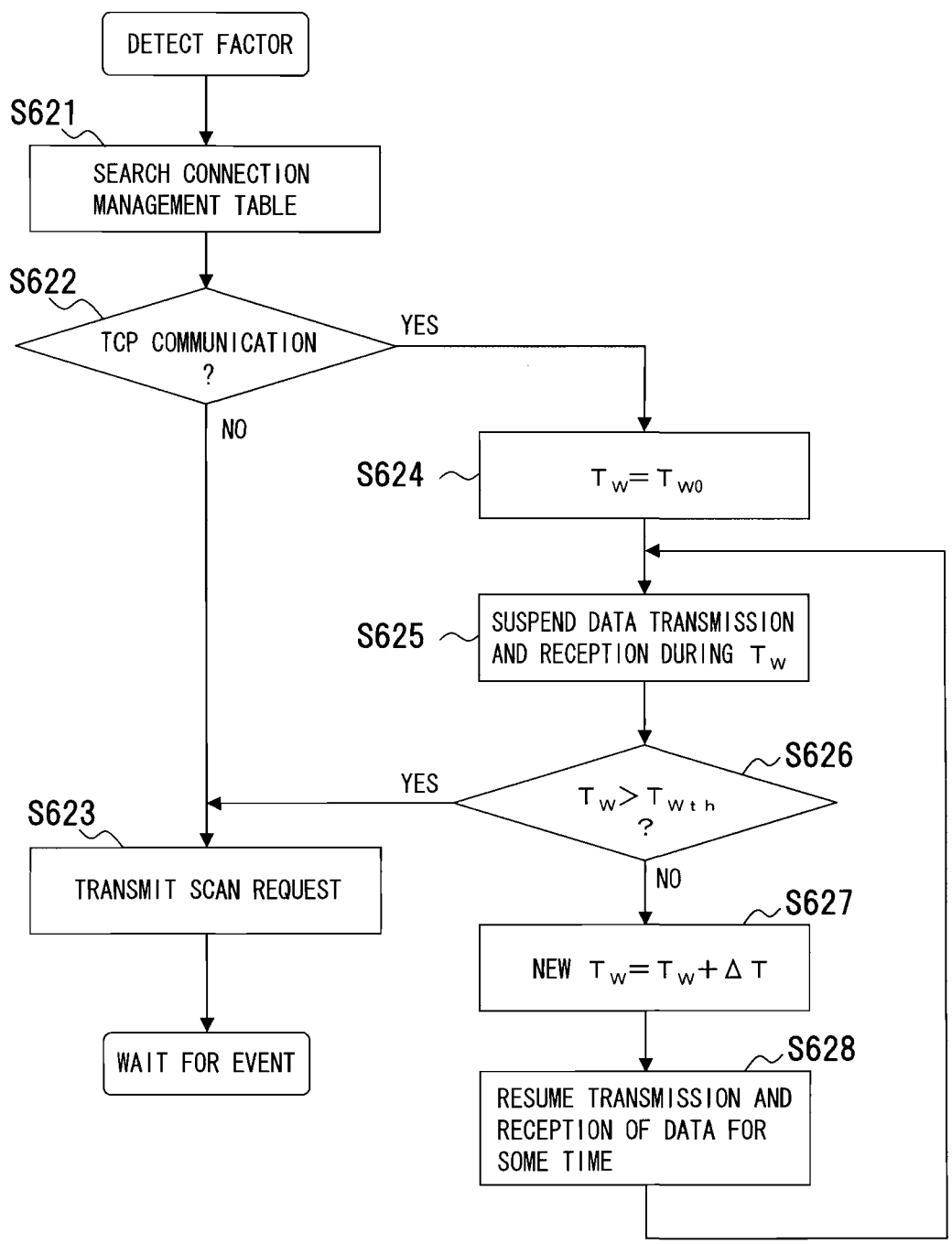
FIG. 33 is a flowchart depicting an example of a sequence of factor detection.

Factor detection of the sequence (FIG. 32) will be described with reference to FIG. 33. FIG. 33 is a flowchart depicting an example of a sequence of factor detection.

This sequence is a process of detecting a factor in the sequence (FIG. 32). As depicted in FIG. 33, the connection management table 136 (FIG. 14) is searched (step S621). Whether to be TCP communication is determined from this connection management table 136 (step S622). In the case of not TCP communication (NO of step S622), the scan request is transmitted (step S623) and the process moves in an event waiting state.

In the case of TCP communication (YES of step S622), a data transmission and reception suspending duration initial value $T_{W0}$ is set for data transmission and reception suspending duration $T_W$ ($T_W = T_{W0}$) (step S624), and during the data transmission and reception suspending duration $T_W$, data transmitter and receiver is suspended (step S625). $T_W$ is compared with a data transmission and reception suspending duration threshold value $T_{Wth}$, and it is determined whether to be $T_W > T_{Wth}$. In the case of $T_W > T_{Wth}$ (YES of step S626), the process moves to step S623. If the case of not $T_W > T_{Wth}$ (NO of step S626), the data transmission and reception suspending duration $T_W$ is changed. In this case, new $T_W = T_W + \Delta T$ is set (step S627). This new $T_W$ is the sum of the current $T_W$ and an increase of data transmission and reception suspending duration $\Delta T$. $\Delta T$ may be the duration of $T_W$.

After the new $T_W$ is set, the transmission and reception of data is resumed for some time (step S628), and the process returns to step S625.

By such a process, the transmission stop that the transmission and reception suspending duration is gradually extended is executed step by step in the case of the TCP communication, and the process can be moved to scanning.

Figure 34:
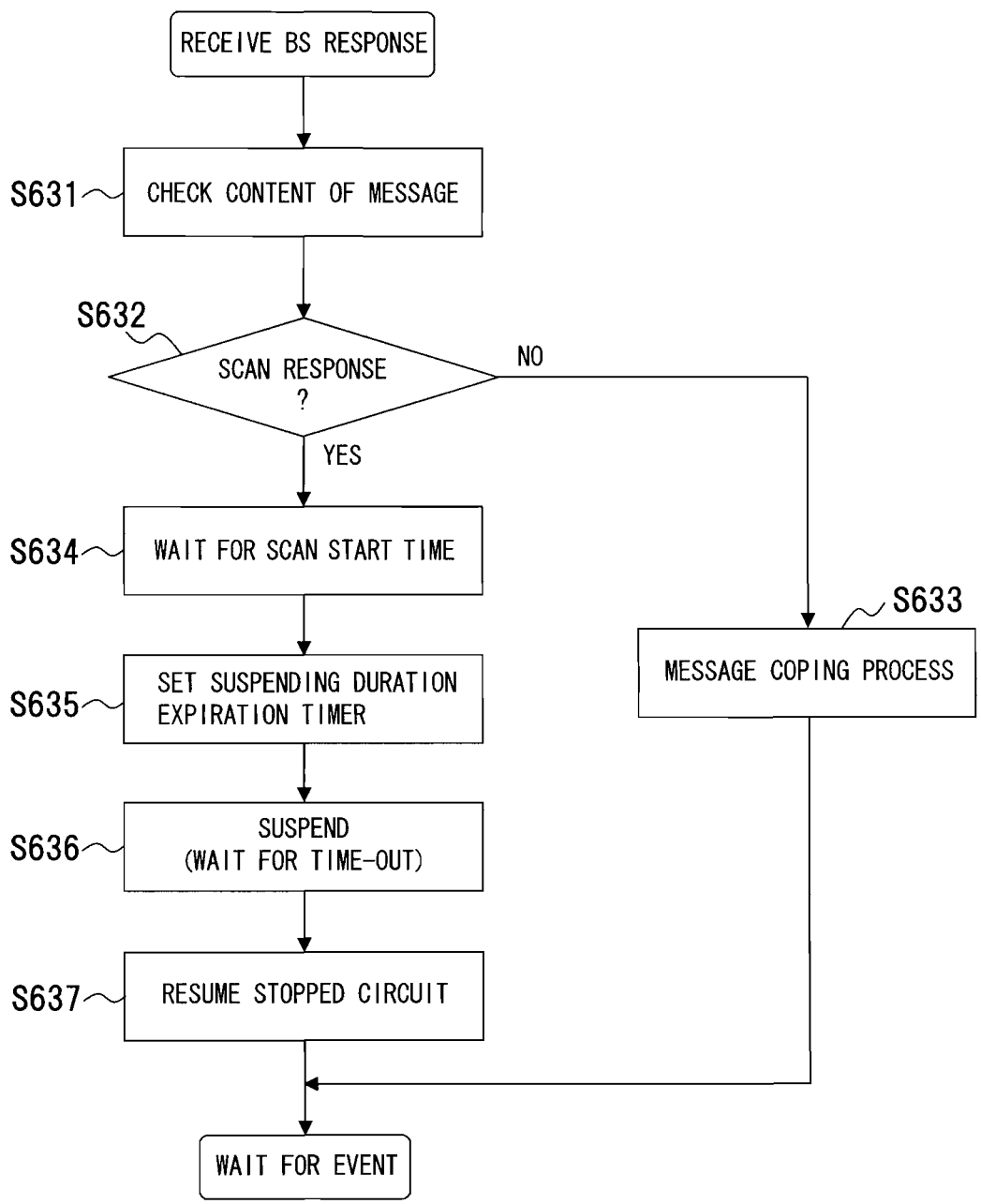
FIG. 34 is a flowchart depicting an example of a sequence of BS response reception at an MS.

A procedure of BS response reception of the sequence (FIG. 32) will be described with reference to FIG. 34. FIG. 34 is a flowchart depicting an example of a sequence of BS response reception at an MS side.

In this sequence, as depicted in FIG. 34, after the scan request, the response from the BS 6 is received at the MS 4, and the content of a message from the BS 6 is checked (step S631). It is determined whether the transmitted message is the scan response or not, or if not, whether the transmitted message includes the scan response or not (step S632). If the scan response does not exist (NO of step S632), a normal message coping process is executed (step S633), and this process moves in an event waiting state.

If the scan response exists (YES of step S632), the process flows to a scan start time waiting (step S634), setting of transmission and reception stop and of scan completion timer (step S635) and suspension, for example, operation stop (time-out waiting) (step S636). After the scan completion timer is time-out, the operation of a circuit part in the operation stop state is resumed (step S637), and the process moves in the event waiting state. This sequence is an example of the case of the number of runs=1.

Figure 35:
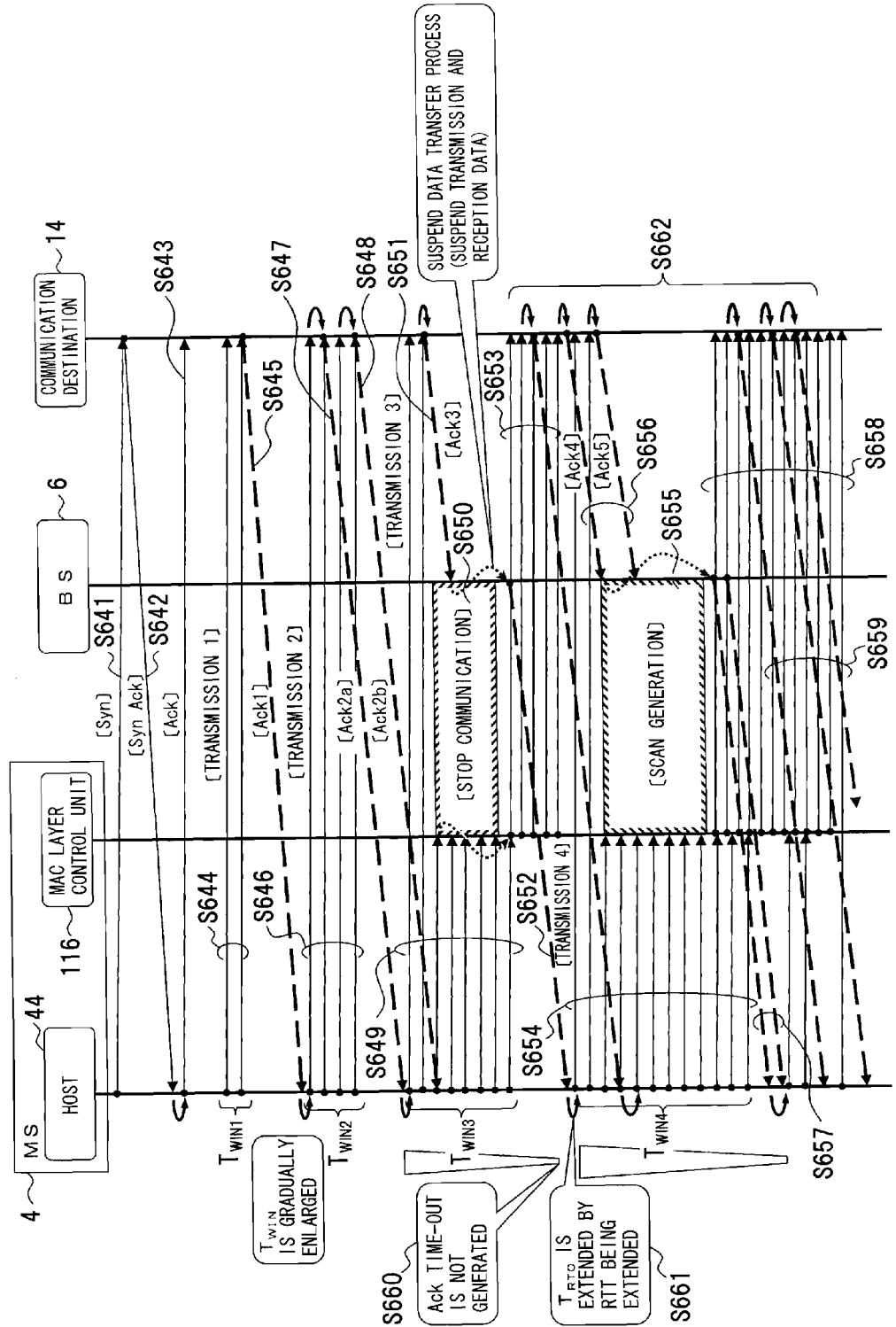
FIG. 35 depicts a sequence which corresponds to the sequence in FIG. 32.

A sequence in the cases of corresponding to the sequence (FIG. 32) will be described with reference to FIG. 35. FIG. 35 depicts a sequence in the case of corresponding to a sequence (FIG. 32).

A sequence is a procedure of starting up TCP communication from the host 44 and transferring data from the host 44 to the communication destination 14.

The procedure is executed as described above such as a connection request (Syn) of the host 44 and sending out the connection request (Syn) to the communication destination (step S641), a request response (SynAck) from the communication destination 14 (step S642) and an acknowledgment (Ack) of the host 44 (step S643).

After connection is established through such a procedure, data transmission 1 of the host 44 (step S644), the acknowledgment Ack 1 from the communication destination 14 (step S645), data transmission 2 of the host 44 (step S646), and sending out of the Ack 2a and Ack 2b as the acknowledgments of twice for the data transmission 2 (steps S647 and S648) are executed.

After the Ack 2a is received, the host 44 executes data transmission 3 to the communication destination 14 (step S649). During this data transmission 3, communication stop is generated (step S650), partial data in the data transmission 3 reaches the communication destination 14, and the acknowledgment Ack 3 issued from the communication destination 14 is retained by the BS 6 (step S651). That is, in the communication stop (step S650), a data transfer process is stopped and transmitting and receiving data is suspended. The acknowledgment Ack 3 which is retained by the BS 6 is transmitted to the MS 4 after the cancellation of the communication stop to reach the host 44 (step S652).

In the communication stop (step S650), the data retained in the MAC layer control unit 116 is transmitted to the communication destination 14 after the cancellation of the communication stop (step S653).

The host 44 that receives the acknowledgment Ack 3 starts data transmission 4 (step S654). During this data transmission 4, partial data in the data transmission 4 reaches the communication destination 14 by scan generation (step S655), and the acknowledgments Ack 4 and Ack 5 which are issued from the communication destination 14 are retained by the BS (step S656). These acknowledgments Ack 4 and Ack 5 are transmitted after the scan duration to reach the host 44 (step S657).

The data retained in the MAC layer control unit 116 by the scan generation is transmitted to the communication destination 14 after the scan duration (step S658). An acknowledgment Ack thereof is issued from the communication destination 14 to reach the host 44 (step S659). Processes are repeated such as the scan generation, the data transmission and the acknowledgment.

As to the transmission window sizes $T_{WIN1}$, $T_{WIN2}$, $T_{WIN3}$ ... of the transmissions 1, 2, 3 ..., the window size $T_{WIN}$ is $T_{WIN1}<T_{WIN2}<T_{WIN3}$ ..., and gradually enlarging (step S661).

In the size of transmission window $T_{WIN3}$/Ack time-out is not generated (step S660). In the size of transmission window $T_{WIN4}$, the period of Ack time-out $T_{RTO}$ increases by the increase of RTT (step S661).

Therefore, in a process after the scan generation (step S662), the communication rate is suppressed so as to match the transmission and reception suspending duration by the scan generation.

[i] Ninth Embodiment

A ninth embodiment is composed so that it is supposed that an overheating state exists from transmission duration to execute transmission stop. That is, after predetermined transmission duration, a scan request is issued and transmission stop is executed to avoid a continuous overheating state.

Figure 36:
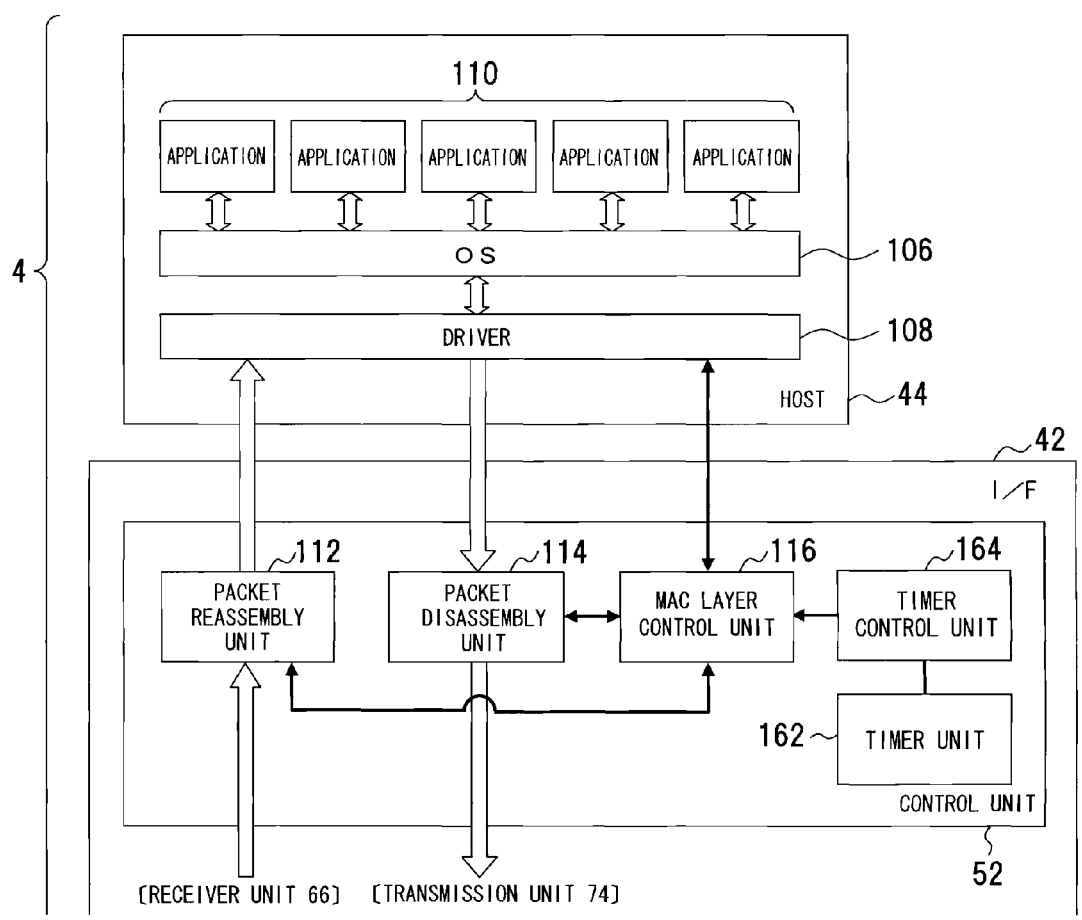
FIG. 36 depicts an example of a wireless communication terminal apparatus according to a ninth embodiment.

The ninth embodiment will be described with reference to FIG. 36. FIG. 36 depicts an example of a wireless communication terminal apparatus according to the ninth embodiment. In FIG. 36, the same components as those in FIG. 7 are denoted by the same reference numerals.

This MS 4 includes, as depicted in FIG. 36, a timer unit 162 and a timer control unit 164 along with the packet reassembly unit 112, the packet disassembly unit 114 and the MAC layer control unit 116 in the control unit 52.

The timer unit 162 is a means for counting the duration of transmission from the RF unit 48 of the I/F 42, and constituted by, for example, a counter. This timer unit 162 is an example of a time count means for counting a time from the starting time of transmission to the end time point of the transmission of the RF unit 48. The output of this timer unit 162 is supplied to the timer control unit 164 as time information.

The timer control unit 164 is an example of a means for receiving the time information from the timer unit 162, and when the transmission duration reaches a predetermined value, for generating an instruction output of a scan request for the MAC layer control unit 116. Hardware of the MS 4 for implementing these functional units is as depicted in FIG. 6, and thus, description thereof is omitted.

If the counted transmission duration is informed of to the timer control unit 164, the timer control unit 164 determines whether this transmission duration reaches or is over a predetermined value, or not. If the transmission duration at least reaches the predetermined value based on such determination, an instruction output of the scan request is supplied from the timer control unit 164 to the MAC layer control unit 116. It is described above that the MAC layer control unit 116 receives such an instruction output, generates the above scan request, and moves the process to a scanning process based on this scan request.

According to such a structure, since it can be supposed that an overheating state exists from transmission duration, the MS 4 can be protected from the continuation of overheating, and the deterioration of transmission characteristics and components can be prevented.

In this embodiment, transmission duration may not only be continuous transmission duration. Intermittent transmission duration may be recorded and the total thereof may be used as a trigger for the scan request.

[j] Tenth Embodiment

A tenth embodiment is composed so that it is supposed that an overheating state exists from transmit power to execute transmission and reception stop. That is, temperature is estimated from transmit power and transmission duration, and when transmission suspending duration is reached, a scan request is issued, transmission and reception are suspended to avoid a continuous overheating state.

Figure 37:
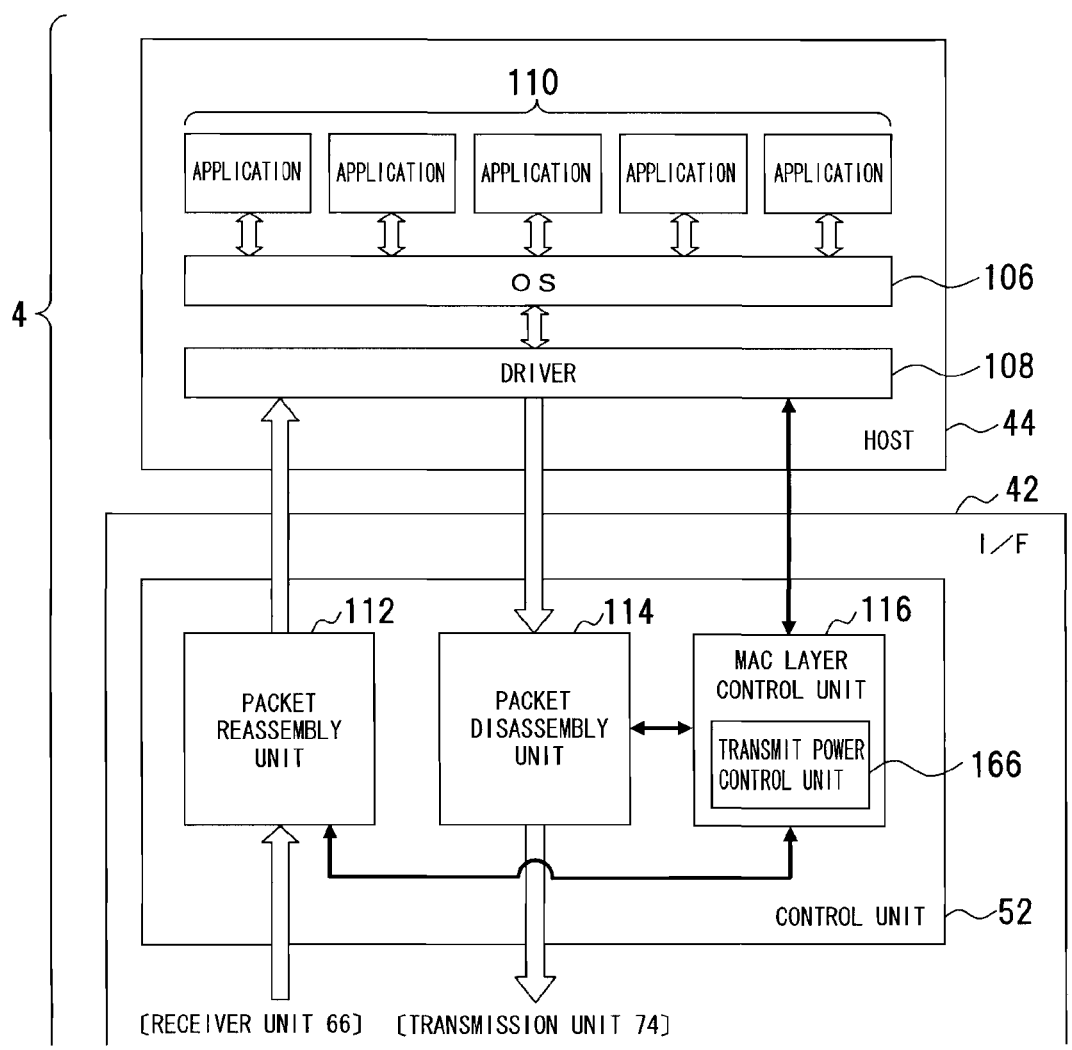
FIG. 37 depicts an example of a wireless communication terminal apparatus according to a tenth embodiment.

The tenth embodiment will be described with reference to FIGS. 37 and 38. FIG. 37 depicts an example of a wireless communication terminal apparatus according to the tenth embodiment, and FIG. 38 is a flowchart depicting an example of a procedure based on transmit power.

This MS 4 includes, as depicted in FIG. 37, a transmit power control unit 166 in the MAC layer control unit 116 that is disposed in the control unit 52.

This transmit power control unit 166 is a means for generating an instruction output of a scan request based on transmit power information. In this transmit power control unit 166, as an example, transmit power is obtained from the RF unit 48, and transmit duration is counted. From these, it is supposed how much temperature is changed, and a transmission and reception stop sequence is activated. Hardware of the MS 4 for implementing these functional units is as depicted in FIG. 6, and thus description thereof is omitted.

Figure 38:
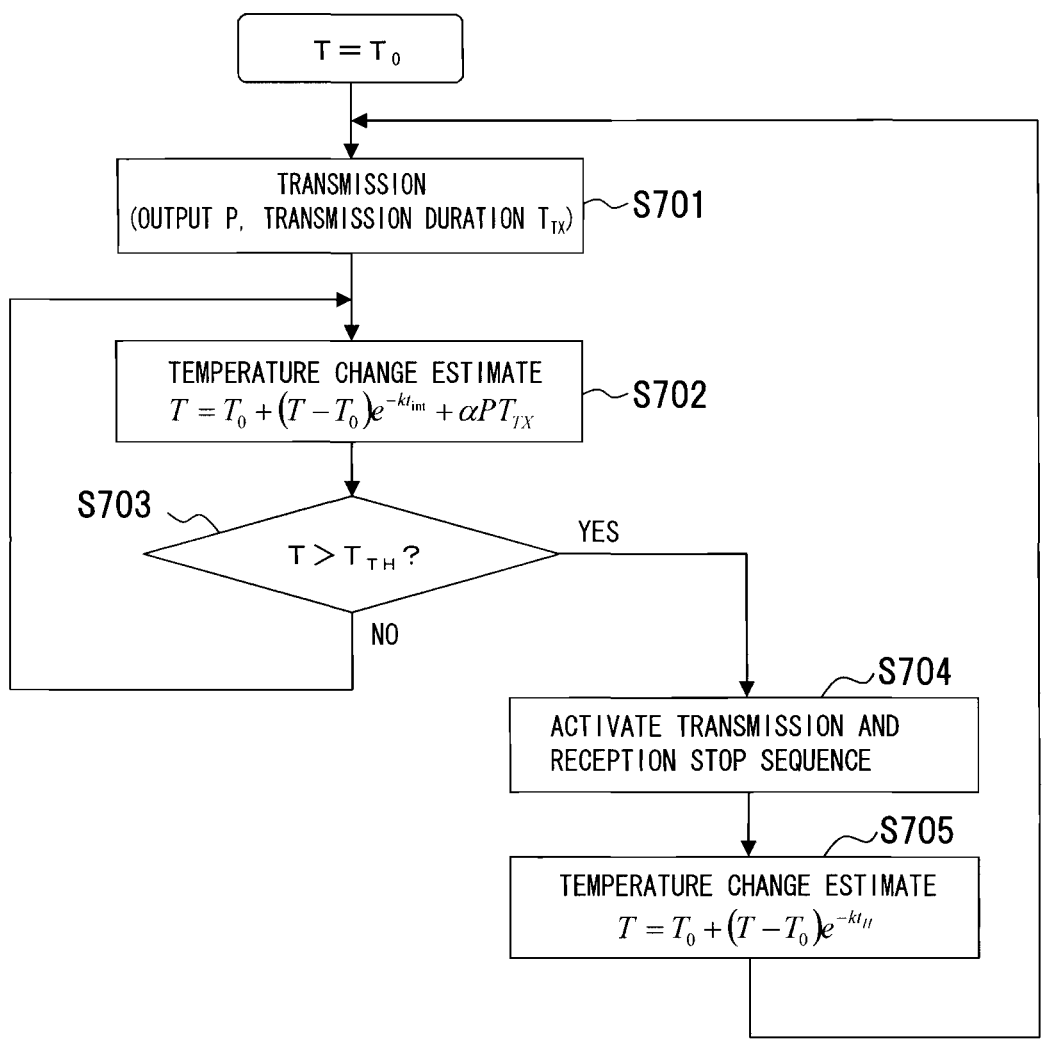
FIG. 38 is a flowchart depicting an example of a sequence based on transmit power.

In the procedure by this transmit power control, as depicted in FIG. 38, transmission of the RF unit 48 is monitored, and an output P and transmission duration $T_{TX}$ acquired from the RF unit 48 are obtained (step S701). This transmission duration $T_{TX}$ may be obtained by including the timer unit 162 (FIG. 36) of the above ninth embodiment.

A first temperature change estimate is executed using these transmitted output P and transmission duration $T_{TX}$ (step S702). In this temperature change estimate, an estimated temperature T may be calculated from $$T=T_0+(T-T_0)e^{-kt_{int}}+\alpha PT_{TX} \qquad (1)$$

In this formula (1), $T_0$: temperature reference value;

$t_{int}$: passage of time since the last transmission;

k: heat loss coefficient decided according to temperature resistance; and

α: heat capacity.

The estimated temperature T that is calculated is compared with an overheating detection threshold value $T_{TH}$, and whether to be $T>T_{TH}$ is determined (step S703). In the case of not $T>T_{TH}$ (NO of step S703), the overheating state does not exist, so the process returns to step S702. The temperature change estimate is executed, and whether to reach the overheating state is monitored.

In the case of $T>T_{TH}$ (Yes of step S703), the overheating state exists, so the above sequence for transmission and reception stop is activated (step S704), a second temperature change estimate is executed (step S705), and the process returns to step S701.

In this temperature change estimate, the estimated temperature T is calculated by $$T=T_0+(T-T_0)e^{-kt_H} \qquad (2)$$

In this formula (2), $t_H$ is transmission suspending duration.

According to such a procedure, if the estimated temperature T is over the overheating detection threshold value $T_{TH}$, an instruction output of a scan request is supplied from the timer control unit 164 to the MAC layer control unit 116. It is as described above that the MAC layer control unit 116 receives such an instruction output, generates the above scan request, and moves the process to a scanning process based on this scan request.

According to such a structure, since it can be supposed that an overheating state exists by transmit power and time passage, the MS 4 can be protected from the continuation of overheating, and the deterioration of transmission characteristics and components can be prevented.

[k] List of Features of Above Embodiments, and Other Embodiments

Features of each embodiment described above, and other embodiments will be listed.

(1) State Monitoring, Detection and Estimate of Temperature of Overheating, and Transmission and Reception Stop In the third embodiment, an overheating state is detected using the temperature detection unit 56, and transmission and reception suspending duration is ensured by the scan request in order to avoid the continuation of the overheating state. During the scan duration, an MS temporarily stops transmission and reception with a BS during connection, and by utilizing this duration, the operation of each circuit block at the MS side is suspended or a power consumption reduction measures such that the power thereof is turned off is executed. If temperature does not sufficiently drop for the scan duration of once, transmission and reception may be suspended by repeating a scanning process. Temperature information may be used for monitoring the overheating state. The temperature information can be obtained from a sensor for temperature correction of a transmit power amplifier (PA) of the amplifier 72 etc., and a temperature detection means in the RF unit 48 instead of the temperature detection unit 56. It may also be supposed that the overheating state exists by totaling up the degree of the rise in temperature based on the above transmit power, transmission slot duration or a transmit history, and this estimate may be used for a trigger of a scanning process.

In the above embodiments, both the transmitter and receiver are suspended. The present disclosure is not limited thereto. That is, suspension of only the transmitter may be executed in a time that is set for the scan duration.

(2) Adjustment of Scan Duration

As to the scan request that is executed for ensuring communication suspending duration, as described above, the scan duration may be adjusted according to the degree of overheating. When the degree of overheating is high according thereto, the transmission and reception suspending duration can be made long for cooling down. In this case, when an instruction of the wireless base station is an instruction of a smaller value than requesting duration, or when the transmission and reception suspending duration of once is taken longer, there is possibility that time-out of an upper protocol etc. is executed together. If so, the upper limit may be set for the scan duration or the transmission and reception suspending duration in order to avoid time-out. Also, a request that the maximum scan duration is provided may be issued in addition to a condition like the above. The transmission and reception duration may be shortened by repeating the scan request if overheating may not be sufficiently avoided in the scan duration of once.

(3) Adjustment of Scan Duration When Data during Communication is TCP

If communication data is TCP (for example, IETF RFC793), the scan duration for avoiding overheating may be a fixed value of short duration, for example, 0.2 (sec). Or, by a monitoring means such as the session monitoring unit 134, a sequence number of TCP and an acknowledgment may be monitored, and a Timestamp option provided under IETF RFC1323 may be monitored. Thereby, Ack time-out duration of a TCP layer may be estimated from a round trip time, and a value adjusted with real implementation may be used. In this case, when sufficient scan duration for moderating overheating may not be ensured, the scan request may be repeated again after communication is resumed to extend this scan duration gradually.

In the case of TCP, since response time-out from a communication destination is calculated based on a round trip time, time-out occurs before an Ack packet is delivered to the destination when the round trip time suddenly extends by temporal stop of communication due to a scanning process. Then, resending is executed at the transmission side, and the upper limit of transmission data which does not respond, which is called a congestion window, is narrowed to a small value about 1 to 2 packets by packet length to extremely reduce a transmission throughput. In this case, if the scan duration is gradually extended from a shorter value, the scan duration can be extended while the Ack time-out is avoided, and escape from the overheating state is possible by the adjustment of the scan duration.

(4) Intermittent Transmitter and Receiver when Data during Communication is TCP

If data is TCP (IETF RFC793), the transmitter is intermittently executed before moving to the scan request by the detection of overheating. In this case, if a communication system is that whether to be transmission can be adjusted autonomously, transmission suspending duration may intermittently be provided simply during transmission duration. If the communication system uses a band request procedure, a timing of executing the band request may be slightly delayed. This transmission suspending duration may be a fixed value, for example, 0.2 (sec) or so. Or, by a monitoring means such as the session monitoring unit 134, a sequence number of TCP and Ack may be monitored, or a Timestamp option provided under IETF RFC1323 may be monitored. Thus, Ack time-out duration of a TCP layer may be estimated from a round trip time, and intermittent duration may be gradually extended. After the intermittent duration is extended equal to the scan duration that the scan request wants, a scan may be requested. Thereby, since the transmission and reception suspending duration is gradually extended, the Ack time-out duration of TCP may be gradually extended. As a result, response time-out of TCP can be avoided even if there is delay increase due to the generation of communication suspending duration by a scan, the drop of a communication throughput by narrowing of a congestion window can be made minimum, and transmission duration can be shortened by a transmission intermittent process to suppress heat generation by the transmission.

Structure of Wireless Communication Module

The above I/F 42 may be realized as the form of a block of a module, an adaptor or the like. In such a structure, a wireless terminal function can be provided for the MS 4 by inside or outside attachment, that is, components or an enhancement module can be constituted. This structure of a wireless communication module may be built-in the above structure of the BB unit 50 including the receiver unit 66 and the transmission unit 74 of the I/F 42, and the RF units 46 and 48. According to such a structure, the wireless communication module can be attached to a personal computer (PC), a handheld terminal apparatus, etc., to be able to make them a wireless terminal apparatus.

(6) The functions of a program etc. described in the above embodiments can be constituted as software separated from hardware, and can be distributed by storing the software in a magnetic media and an optical media or by the download from a network. Functions of the above embodiments are not limited to be made integrally with hardware.

(7) Avoidance of Overheating State

In the above embodiments, in order to avoid the overheating state of an MS, power consumption is reduced by suppressing the operation of a circuit selectively to reduce the amount of heat generation. The disclosure is not limited thereto. Another mechanism for avoiding an overheating state such as rotating a cooling fan in overheating may be used together. Furthermore, measures for avoidance such as the stop of the operation of a circuit itself may be used together if the overheating state is not moderated.

(8) WiMAX

In the above embodiments, WiMAX (IEEE 802.16e) is exemplified as a communication protocol of a wireless section. The disclosure is not limited thereto. The protocol can be used that can provide a scan procedure and can stop communication with a BS during connection for some time, and is not limited to WiMAX.

(9) Wireless Communication Terminal Apparatus and Program

In the above embodiments, an MS is exemplified. The disclosure is not limited thereto. In the above embodiments, a program for controlling the wireless communication terminal apparatus is encompassed. This program may be executed by an application or driver software that controls a wireless interface in a terminal apparatus having a wireless function or in hardware of mounting an interface module having a wireless function, for example, a personal computer. Therefore, the wireless communication terminal apparatus may be constituted as software enable to execute a function or control equivalent to the above MS.

Figure 39:
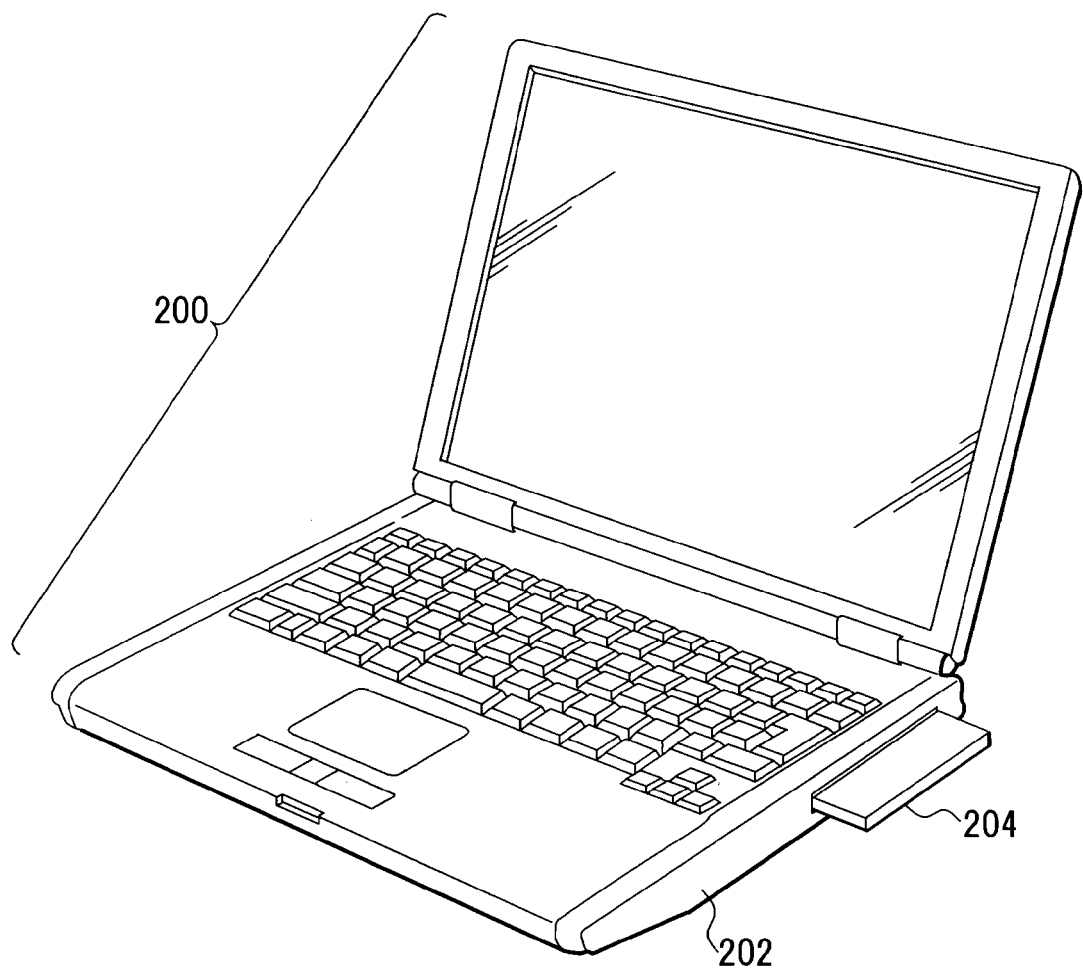
FIG. 39 depicts a personal computer and a communication module according to another embodiment.

(10) In the above embodiments, a PC (FIG. 5) is exemplified as the MS 4. This PC may be constituted so that, for example, as depicted in FIG. 39, a wireless module 204 that mounts the above I/F 42 is attached and/or detached to/from a housing 202 of a PC 200. In this case, the control unit 52 may be mounted on the wireless module 204, or on the PC 200 side along with the host 44.

Figure 40:
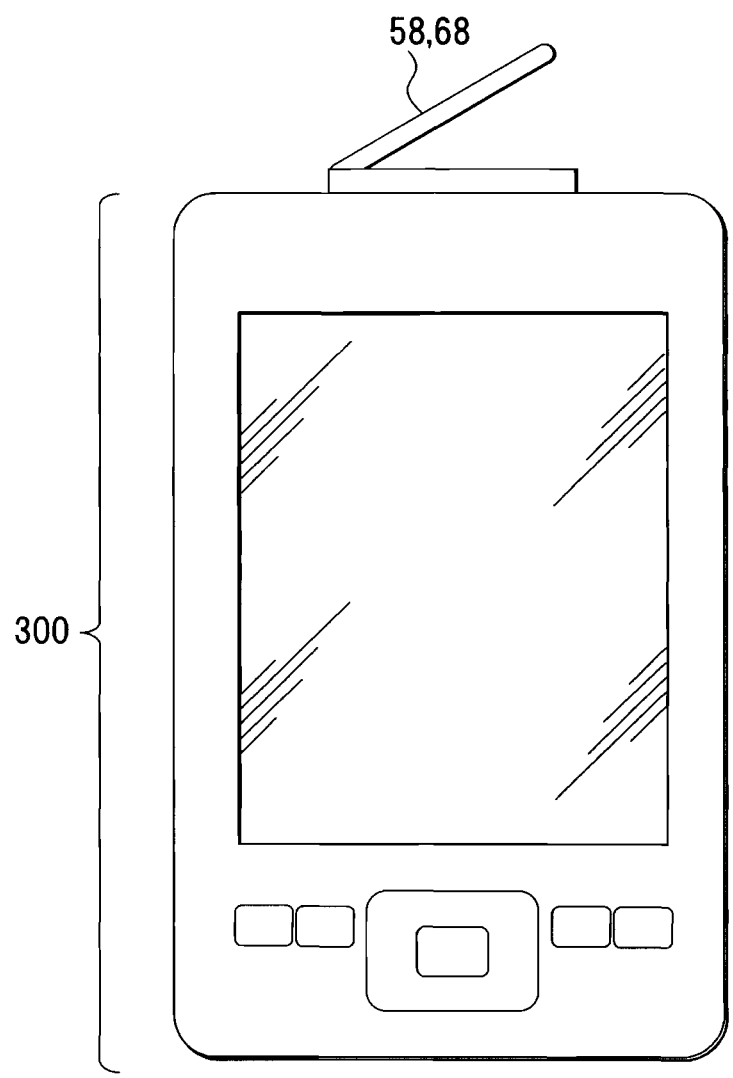
FIG. 40 depicts a PDA according to another embodiment.
Figure 41:
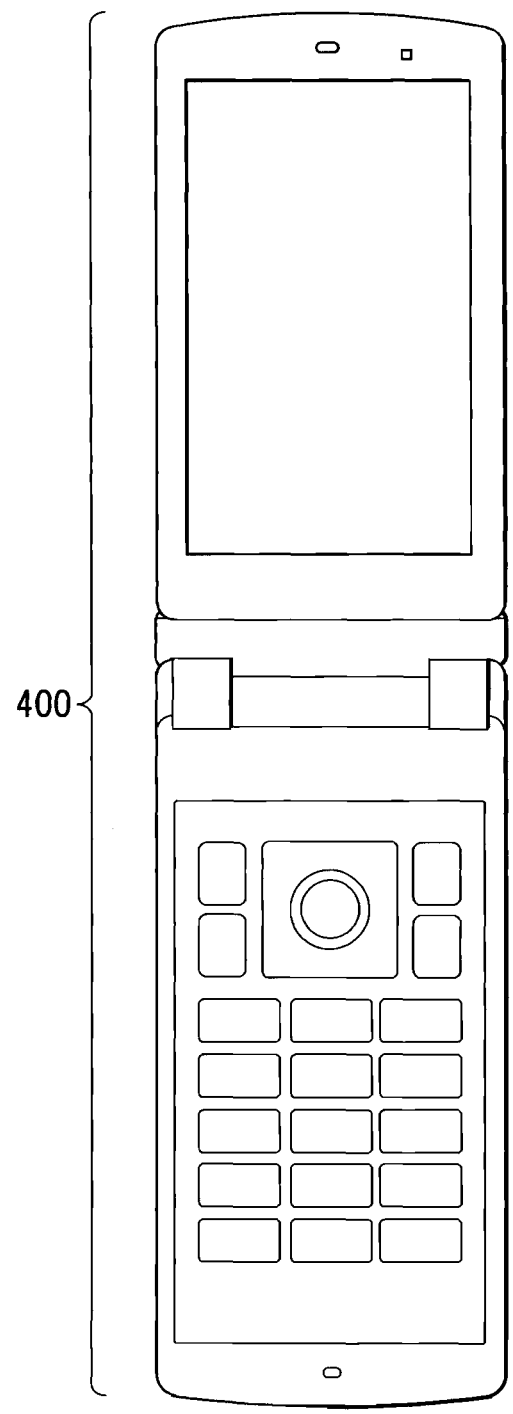
FIG. 41 depicts a portable telephone according to another embodiment.

(11) As an example of the structure of the above MS 4, as depicted in FIG. 40, the MS 4 may be constituted by a PDA (personal digital assistant) 300, or as depicted in FIG. 41, by a portable telephone 400.

(12) As described above, an MS stops the operation of at least a transmission unit as operation stop of a wireless unit while keeping connection with a BS. Thereby, an overheating state at the MS side, specifically, the overheating state of the I/F 42 is moderated to avoid the continuation of the overheating state. Moreover, wireless communication can be used without stopping communication application during execution.

(13) In the above embodiments, the structure may be constituted that transmit duration when transmit power is reduced may be included in the transmission and reception suspending duration that is set in a part or all of the scan duration.

[1] Comparison Example

As a comparison example of the above, in the above described broadband wireless service, a wireless system that uses mobile wireless communication technology utilizing a relatively high frequency band such as a gigahertz-band (GHz-band) is put to practical use. In a wireless communication terminal apparatus used for this wireless system, problems are the decrease of power conversion efficiency and the generation of overheating in a transmission unit. For example, high transmitting power like +23 (dBm) in order to realize reliable mobile access in the outside or to get a larger coverage area increases heat generation. An MS in the overheating state makes its communication characteristics deteriorate, and damages components and a circuit thereof. Also for an MS, to downsize its wireless interface and to minimize the volume thereof are desired.

It is as described above that for recovering an MS from its overheated state, the operation of its wireless interface may be suspended (its power may be turned off); however, the stop of operation causes connection between the base station (BS) to be disconnected etc., and thus is not preferable.

An overheating state occurs due to transmission with the maximum transmit power. However, the maximum transmit power is not kept all the time. The transmission with the maximum transmit power is for the case when the distance between the wireless communication terminal apparatus and a wireless BS is far and there is transmission data continuously. Therefore, it is effective to shift a process to a heat generation avoidance process such as temporal suspension of a transmitter and decreasing of transmission power when the overheating occurs under the maximum power transmission.

In this case, heat generation can be avoided by stopping the transmission. However, a receiver is still activated. Thus, current consumption in a receiver circuit is not suppressed. Power consumption in the receiver circuit is large in a communication system with a sophisticated modulation method, and power consumption and heat generation are not suppressed without suspending the receiver circuit. From such an aspect, it is also important to suspend the receiver circuit.

However, a BS basically expects that the wireless communication terminal apparatus connected to the BS continues receiving all the time except the case of stopping receiving due to an error factor of transmission. Thus, when MS's reception is stopped due to the affairs at the MS side, the BS may cut off the connection with the MS that stops receiving due to the invalid receiving data or its anomaly detection.

A wireless communication protocol includes a function of stopping transmission and reception to the BS for reducing power consumption of MS or BS. For example, in a mobile WiMAX (IEEE 802.16e), an idle mode in which the transmitter and receiver can be suspended except duration for the wireless communication terminal apparatus periodically checking information designated to the apparatus at the BS and a sleep mode for executing a communication process periodically are provided. The idle mode is used when there is no transmitting or receiving data, but it cannot be used during active communication. The sleep mode is effective for the use of suppressing power consumption in order to execute transmission and reception at a timing predetermined with the BS. However, the sleep mode is not suitable for controlling the suspending duration according to a condition of the wireless communication terminal apparatus.

The above example is for comparison with the above embodiments, and the problems to be solved by the apparatus, the module, the program and the method used for a wireless communication of the present disclosure are not limited to the problems disclosed in the comparison example. However, according to the above embodiments of the present disclosure, the above problems can be solved. In short, since in the above embodiments, transmission and reception are suspended in search duration used for wireless base station search, the overheating of the wireless communication terminal apparatus can be prevented along with power saving while connection with a BS is kept. That is, communication connection is not damaged due to the prevention of overheating.

Following effects can be obtained from the apparatus, the module, the program and the method used for wireless communication of the above embodiments.

(1) Since at least the transmitter is suspended in the limited search duration that is assigned for the wireless base station search while connection with the wireless base station is kept, an apparatus can be protected from the continuation of an overheating state without damage to the continuity of communication.

(2) Since at least the transmitter is suspended in a part or all of the search duration, a communication application during execution can be continued without stop.

(3) The overheating state is monitored, a function of protecting the wireless communication terminal apparatus from the overheating state can be automatically performed, and the wireless communication apparatus of high convenience can be obtained without requesting a user to operate.

Technical ideas extracted from the embodiments including the example described above will then be listed. The technical ideas of the present disclosure may be comprehended at various levels and variations ranging from higher to lower conceptions and the present invention is not limited to the following description.

A wireless communication terminal apparatus that communicates with a wireless base station wirelessly includes a wireless communication unit that communicates wirelessly; and a control unit that transmits a search request, in which search duration for searching a wireless base station is included, from the wireless communication unit to a wireless base station during connection, and when a search response is received in the wireless communication unit from the wireless base station during connection, suspends at least a transmitter in the transmitter and a receiver of the wireless communication unit in all or a part of the search duration.

In the above wireless communication terminal apparatus, preferably, the control unit may suspend the transmitter and the receiver of the wireless communication unit in all or a part of the search duration.

The above wireless communication terminal apparatus may preferably include a state monitoring unit that monitors a processing state, wherein based on an output of the state monitoring unit, the control unit makes a search request to be sent out from the wireless communication unit to the wireless base station.

In the above wireless communication terminal apparatus, preferably, the search duration may be duration that duration for suspending at least the transmitter, in the transmitter and the receiver, is added to duration for search, and the search duration may be requested to the wireless base station.

In the above wireless communication terminal apparatus, preferably, the control unit may adjust the search duration or the duration for suspending at least the transmitter, in the transmitter and the receiver, according to a degree of overheating of the wireless communication terminal apparatus.

In the above wireless communication terminal apparatus, preferably, the control unit may change the search duration, that is requested by the search request, or the duration for suspending at least the transmitter, in the transmitter and the receiver, according to upper protocol information used by data during communication.

In the above wireless communication terminal apparatus, preferably, the control unit may include a detection unit that detects whether data during communication is TCP (transmission control protocol), and if the data during communication is TCP, may gradually extend the search duration to be requested longer.

In the above wireless communication terminal apparatus, preferably, the control unit may include a detection unit that detects whether data during communication is TCP, and if the data during communication is TCP, may change the transmitter to intermittent transmission in advance of the search request.

In the above wireless communication terminal apparatus, preferably, the state monitoring unit may further include temperature detection means that detects temperature, and if detected temperature over a predetermined temperature, the control unit, may make a search request to be sent out from the wireless communication unit to the wireless base station.

In the above wireless communication terminal apparatus, preferably, the state monitoring unit may further include timer means that monitors at least transmission duration, and if the transmission duration is equal to or over a predetermined time, the control unit may generate the search request.

In the above wireless communication terminal apparatus, preferably, if the state monitoring unit is means that monitors estimated temperature by transmit power and by transmission duration and the estimated temperature is over a predetermined value, the control unit may generate the search request.

A wireless communication module that is mounted on a wireless communication terminal apparatus that communicates with a wireless base station wirelessly includes a wireless communication unit that communicates wirelessly; and a control unit that transmits a search request, in which search duration for searching a wireless base station is included, from the wireless communication unit to a wireless base station during connection, and when a search response is received in the wireless communication unit from the wireless base station during connection, suspends at least a transmitter in the transmitter and a receiver of the wireless communication unit in all or a part of the search duration.

A wireless communication program executed by a computer that is mounted on a wireless communication terminal apparatus that communicates with a wireless base station wirelessly includes executing wireless communication; and transmitting a search request, in which search duration for searching a wireless base station is included, from a wireless communication unit to a wireless base station during connection, and when a search response is received from the wireless base station during connection in the wireless communication unit, suspending at least a transmitter in the transmitter and a receiver of the wireless communication unit in all or a part of the search duration.

A wireless communication control method of a wireless communication terminal apparatus that communicates with a wireless base station wirelessly includes executing wireless communication; and transmitting a search request, in which search duration for searching a wireless base station is included, from a wireless communication unit to a wireless base station during connection, and when a search response is received from the wireless base station during connection in the wireless communication unit, suspending at least a transmitter in the transmitter and a receiver of the wireless communication unit in all or a part of the search duration.

The program implementing the embodiments may be recorded on computer-readable media comprising computer-readable recording media. The program implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

While the embodiments of the apparatus, the module, the program and the method used for wireless communication of the present disclosure have been described hereinabove, the present invention is not limited to the above description, and it is a matter of course that various variations and modifications can be made by those skilled in the art within the scope of the claims without departing from the spirit of the embodiments disclosed herein, and needless to say, such variations and modifications are also encompassed in the scope of the present invention.

What is claimed is:

1. A wireless communication terminal apparatus that communicates with a wireless base station wirelessly, the wireless communication terminal apparatus comprising:
   a wireless communication unit that communicates wirelessly with a wireless base station, which is connected to the wireless communication terminal apparatus; and
   a control unit that transmits a search request, which includes information on search duration for searching a wireless base station, from the wireless communication unit to the wireless base station, which is connected, and after a search response is received by the wireless communication unit from the wireless base station, which is connected, suspends at least a transmitter, in the transmitter and a receiver of the wireless communication unit, for all or a part of the search duration, which is requested by the search request, to prevent the wireless communication unit from overheating.

2. The wireless communication terminal apparatus of claim 1,
   wherein the control unit suspends the transmitter and the receiver of the wireless communication unit for all or a part of the search duration.

3. The wireless communication terminal apparatus of claim 1, further comprising:
   a state monitoring unit that monitors a processing state,
   wherein based on an output of the state monitoring unit, the search request is sent out.

4. The wireless communication terminal apparatus of claim 3,
   wherein the state monitoring unit further includes temperature detection means that detects temperature, and when detected temperature is over a predetermined temperature, the control unit makes the search request to be sent out from the wireless communication unit to the wireless base station, which is connected.

5. The wireless communication terminal apparatus of claim 3,
wherein the state monitoring unit further includes timer means that monitors at least transmission duration, and when the transmission duration is equal to or over a predetermined time, the control unit generates the search request.

6. The wireless communication terminal apparatus of claim 3,
wherein the state monitoring unit is means that monitors estimated temperature by transmit power and by transmission duration, and when the estimated temperature is over a predetermined value, the control unit generates the search request.

7. The wireless communication terminal apparatus of claim 1,
wherein the search duration includes duration for search and duration for suspending at least the transmitter, in the transmitter and the receiver, and the search duration is requested to the wireless base station, which is connected, by the search request.

8. The wireless communication terminal apparatus of claim 1,
wherein the control unit adjusts the search duration or duration for suspending at least the transmitter, in the transmitter and the receiver, according to a level of overheating of the wireless communication terminal apparatus.

9. The wireless communication terminal apparatus of claim 1,
wherein the control unit changes the search duration, or duration for suspending at least the transmitter, in the transmitter and the receiver, according to upper protocol information used by data during communication.

10. A wireless communication terminal apparatus that communicates with a wireless base station wirelessly, the wireless communication terminal apparatus comprising:
a wireless communication unit that communicates wirelessly with a wireless base station, which is connected to the wireless communication terminal apparatus; and
a control unit that transmits a search request, which includes information on search duration for searching a wireless base station, from the wireless communication unit to the wireless base station, which is connected, and after a search response is received by the wireless communication unit from the wireless base station, which is connected, suspends the wireless communication to suspend at least a transmitter, in the transmitter and a receiver of the wireless communication unit, for all or a part of the search duration,
wherein the control unit includes a detection unit that detects whether a type of the wireless communication is a transmission control protocol, repeatedly transmits the search request after the wireless communication is resumed by expiration of the search duration, and when the type of the wireless communication is the transmission control protocol, gradually extends search duration of the search request, which is repeatedly transmitted.

11. A wireless communication terminal apparatus that communicates with a wireless base station wirelessly, the wireless communication terminal apparatus comprising:
a wireless communication unit that communicates wirelessly with a wireless base station, which is connected to the wireless communication terminal apparatus; and
a control unit that transmits a search request, which includes information on search duration for searching a wireless base station, from the wireless communication unit to the wireless base station, which is connected, and after a search response is received by the wireless communication unit from the wireless base station, which is connected, suspends at least a transmitter, in the transmitter and a receiver of the wireless communication unit, for all or a part of the search duration,
wherein the control unit includes a detection unit that detects whether a type of the wireless communication is a transmission control protocol, and when the type of the wireless communication is the transmission control protocol, changes transmission from the transmitter to intermittent transmission in advance of the search request.

12. A wireless communication module that is mounted on a wireless communication terminal apparatus that communicates with a wireless base station wirelessly, the wireless communication module comprising:
a wireless communication unit that communicates wirelessly; and
a control unit that transmits a search request, which includes information on search duration for searching a wireless base station, from the wireless communication unit to a wireless base station during connection, and after a search response is received the wireless communication unit from the wireless base station during connection, suspends at least a transmitter, in the transmitter and a receiver of the wireless communication unit, for all or a part of the search duration, which is requested by the search request, to prevent the wireless communication unit from overheating.

13. A wireless communication control method of a wireless communication terminal apparatus that communicates with a wireless base station wirelessly, the wireless communication control method comprising:
executing wireless communication; and
transmitting a search request, which includes information on search duration for searching a wireless base station, from a wireless communication unit to a wireless base station during connection, and after a search response is received from the wireless base station during connection by the wireless communication unit, suspending at least a transmitter, in the transmitter and a receiver of the wireless communication unit, for all or a part of the search duration, which is requested by the search request, to prevent the wireless communication unit from overheating.

* * * * *